US012554924B2

(12) United States Patent
Plotkin

(10) Patent No.: US 12,554,924 B2
(45) Date of Patent: Feb. 17, 2026

(54) COMPUTER-IMPLEMENTED METHODS AND SYSTEMS FOR GENERATIVE TEXT PAINTING

(71) Applicant: Quabbin Patent Holdings, Inc., Marlborough, MA (US)

(72) Inventor: Robert Plotkin, Manalapan, NJ (US)

(73) Assignee: Quabbin Patent Holdings, Inc., Marlborough, MA (US)

( * ) Notice: Subject to any disclaimer, the term of this patent is extended or adjusted under 35 U.S.C. 154(b) by 0 days.

(21) Appl. No.: 19/054,800

(22) Filed: Feb. 15, 2025

(65) Prior Publication Data

US 2025/0190693 A1 Jun. 12, 2025

Related U.S. Application Data

(63) Continuation of application No. PCT/US2024/050403, filed on Oct. 9, 2024.
(Continued)

(51) Int. Cl.
G06F 40/284 (2020.01)
G06F 3/04842 (2022.01)
(Continued)

(52) U.S. Cl.
CPC ........ *G06F 40/186* (2020.01); *G06F 3/04842* (2013.01); *G06F 40/30* (2020.01)

(58) Field of Classification Search
CPC ..... G06F 40/186; G06F 3/04842; G06F 40/30
See application file for complete search history.

(56) References Cited

U.S. PATENT DOCUMENTS

| 5,493,606 A | 2/1996 | Osder |
| 2006/0203980 A1 | 9/2006 | Starkie |

(Continued)

FOREIGN PATENT DOCUMENTS

| CN | 116700839 A | 9/2023 |
| CN | 116795973 A | 9/2023 |

(Continued)

OTHER PUBLICATIONS

"How do I add a Ghostwriter prompt?" Cloze Help Center, 9 pages, printed Oct. 10, 2023, URL: https://help.cloze.com/article/2680-how-do-i-add-a-ghostwriter-prompt.
(Continued)

*Primary Examiner* — Hassan Mrabi
(74) *Attorney, Agent, or Firm* — Blueshift IP; Robert Plotkin

(57) ABSTRACT

A system and method for transforming text within documents using, such as by using large language models (LLMs). Users can select source text from a source document, in response to which a painting configuration is identified or generated based on the source text, such as by providing the source text and a source prompt to a large language model to produce source output, and selecting or generating the painting configuration based on the source output. The user can select destination text, in response to which the painting configuration is applied to the destination text, such as by selecting or generating a destination action definition based on the painting configuration and the destination text, and providing the destination action definition to a large language model to produce destination output. The destination text may be replaced with the destination output, or output derived therefrom. In this way, the system can extract a variety of sophisticated properties, such as style or tone, from user-selected text source text, and apply those
(Continued)

properties to user-selected destination text, with minimal user input.

19 Claims, 6 Drawing Sheets

Related U.S. Application Data

(60) Provisional application No. 63/719,137, filed on Nov. 12, 2024, provisional application No. 63/715,666, filed on Nov. 4, 2024, provisional application No. 63/712,475, filed on Oct. 27, 2024, provisional application No. 63/711,078, filed on Oct. 23, 2024, provisional application No. 63/708,233, filed on Oct. 16, 2024, provisional application No. 63/588,835, filed on Oct. 9, 2023.

(51) Int. Cl.
*G06F 40/186* (2020.01)
*G06F 40/30* (2020.01)

(56) References Cited

U.S. PATENT DOCUMENTS

| | | | |
|---|---|---|---|
| 2014/0379615 A1 | 12/2014 | Brigham | |
| 2020/0153687 A1 | 5/2020 | Ayyagari | |
| 2021/0042662 A1 | 2/2021 | Pu | |
| 2022/0229832 A1 | 7/2022 | Li | |
| 2023/0075884 A1* | 3/2023 | Jakobsson | H04L 9/50 |
| 2023/0316006 A1* | 10/2023 | Tunstall-Pedoe | G06N 3/0442 704/9 |
| 2024/0112394 A1* | 4/2024 | Neal | G06T 15/10 |
| 2024/0338860 A1* | 10/2024 | Trzyna | G06F 40/44 |
| 2024/0419907 A1* | 12/2024 | Laprise | G01C 21/34 |
| 2024/0420418 A1* | 12/2024 | Wu | G06F 40/30 |
| 2025/0007870 A1 | 1/2025 | Kyun | |
| 2025/0013438 A1 | 1/2025 | Goodman | |
| 2025/0118022 A1 | 4/2025 | Fitzmaurice | |

FOREIGN PATENT DOCUMENTS

| | | | | |
|---|---|---|---|---|
| CN | 117313746 A | * | 12/2023 | G06F 40/30 |
| CN | 117409109 A | * | 1/2024 | G06N 20/00 |
| EP | 1006452 A2 | | 6/2000 | |

OTHER PUBLICATIONS

"Word GPT Plus—a useful add-in to use chatGPT in Microsoft Word," Apr. 27, 2023, 3 pages.
AI-Writer.com, "Use AI to your advantage, without sacrificing on quality," 2023, Product Guide, 22 pages.
Cohen, Reuven, "The Future of AI Infused Documents: The Intelligent Document Format," LinkedIn, Feb. 5, 2024. 2 pages.
Coyer, Cassandre, "LexisNexis Brings Lexis Create to U.S., Announces New Gen AI Capabilities Ahead," Aug. 2, 2023, 2 pages. URL: https://www.law.com/legaltechnews/2023/08/02/lexisnexis-brings-lexis-create-to-u-s-announces-new-gen-ai-capabilities-ahead/.
Coyer, Cassandre, "LexisNexis Publicly Releases Generative AI-Powered Lexis+AI, With New Functionalities," Oct. 25, 2023, 2 pages. URL: https://www.law.com/legaltechnews/2023/10/25/lexisnexis-publicly-releases-generative-ai-powered-lexis-ai-with-new-functionalities/.
Dipshan, Rhys, "LexisNexis Expands Generative AI Offerings With Lexis Snapshot and Lexis Create Integration," Nov. 14, 2023, 2 pages. URL: https://www.law.com/legaltechnews/2023/11/14/lexisnexis-expands-generative-ai-offerings-with-lexis-snapshot-and-lexis-create-integration/.
Gao, Andrew Kean, "Prompt Engineering for Large Language Models," A brief guide with examples for non-technical readers, 8 pages.
Gemini, "Supercharge your creativity and productivity," Release updates, 2024, 12 pages. URL: gemini.google.com/updates.
Ghostwriter-AI, Solving insight problems with clarity, simplicity and innovation, "Ghostwriter Add-ins for Microsoft Office," printed Oct. 10, 2023, 30 pages. URL: https://www.ghostwriter-ai.com/.
Guerra, Marci, "Chat GPT for Microsoft Word: A Guide to Integration and Usage," Brandalytics, Apr. 14, 2023. 11 pages.
International Search Report and Written Opinion issued in App. No. PCT/US2024/050403, dated Jan. 15, 2025, 10 pages.
Jasper, "Meet Jasper. On-brand AI content wherever you create." Product Guide, printed Oct. 1, 2023, 49 pages.
Kowalczyk, Mikolaj, "A Step-by-step Guide to Prompt Engineering: Best Practices, Challenges, and Examples," printed Oct. 1, 2023, 16 pages.
Lago, Juan Pablo, "Guiding LLM Behavior: The Art of Prompt Engineering," Aug. 15, 2023, 13 pages. URL: https://blog.marvik.ai/2023/08/15/prompt-engineering-guide/.
Li, Abner, "Gemini now lets you tune and modify responses with a prompt," Mar. 6, 2024, 3 pages. URL: 9to5google.com/2024/03/06/gemini-modify-tune-response/.
OpenAI, "A New Way of Working With ChatGPT to Write and Code," Introducing Canvas, Oct. 3, 2024, 8 pages. openai.com/index/introducing-canvas/.
OpenAI, Blog, "New models and developer products announced at DevDay," GPT-4 Turbo with 128K context and lower prices, the new Assistants API, GPT-4 Turbo with Vision, DALL-E 3 API, and more. Nov. 6, 2023 announcements, 13 pages.
Peppercontent "Peppertype just got better!" Introducing the all-new AI-powered Content Marketing Platform, printed Oct. 1, 2023, 10 pages.
Sha, Arjun, "How to Integrate ChatGPT Into Microsoft Word," last updated Jun. 19, 2023. 17 pages. URL: https://beebom.com/how-add-chatgpt-microsoft-word/.
Shi, F. et al. "Prompt Space Optimizing Few-shot Reasoning Success with Large Language Models," Jun. 6, 2023, 25 pages.
Spataro, Jared, "Introducing Microsoft 365 Copilot—your copilot for work," Mar. 16, 2023, CVP Modern Work & Business Applications, Official Microsoft Blog, 14 pages.
Stanojevic, Milan, "How to Integrate ChatGPT With Word [Quickest Ways]," To use ChatGPT in Word, you need to rely on third-party add-ons, Windowsreport, updated Oct. 4, 2023, 19 pages.
What's New in Copilot, techcommunity.microsoft.com/blog/microsoft365copilotblog/whats-new-in-copilot--august-2024/4226565, Aug. 30, 2024, 5 pages.
Woodie, Alex, "DSPy Puts 'Programming Over Prompting' in AI Model Development", Datanami, Aug. 25, 2023. 4 pages.
Www.microsoft.com, "Introducing Microsoft 365 Copilot—your copilot for work." 2023, 12 pages.
Yeh, C. et al. "GhostWriter: Augmenting Collaborative Human-AI Writing Experiences Through Personalization and Agency," Feb. 13, 2024, 29 pages.
Office Action dated Jun. 17, 2025 for U.S. Appl. No. 18/995,049 (pp. 1-9).
Office Action (Notice of Allowance and Fees Due (PTOL-85)) dated Oct. 16, 2025 for U.S. Appl. No. 18/995,049 (pp. 1-7).

* cited by examiner

COMPUTER-IMPLEMENTED METHODS AND SYSTEMS FOR GENERATIVE TEXT PAINTING

BACKGROUND

In an age where technology intertwines with every facet of our lives, the domain of writing is no exception. Traditional pen-and-paper narratives are being augmented and, in some instances, replaced by digital counterparts. With a surge in innovation, various apps have emerged, promising to ease the writing process and enrich the quality of content. But, as with all innovations, while they offer unprecedented advantages, they also come with their own set of challenges.

Modern writing tools encompass a vast spectrum—from basic word processors that mimic the age-old process of manual writing, to advanced AI-driven platforms that can draft entire documents based on a few keywords. These AI platforms, often taking the form of chatbots built on large language models (LLMs), promise to deliver content that is both relevant and coherent, simulating the nuances of human writing. However, their approach often follows a one-size-fits-all methodology, which can miss capturing the unique voice and intent of the individual writer.

While the thrill of getting an entire draft from a chatbot sounds enticing, it often throws writers into a passive role, distancing them from their original vision. Revisions, a cornerstone of the writing process, turn into a cumbersome ordeal, either making writers rewrite vast portions of AI-generated content or revert to demanding a complete rewrite from the bot. Furthermore, chatbots typically follow an "append-only" structure, which limits the dynamic editing and interactive capabilities that writers often seek.

As a result of these constraints, writers find themselves at a crossroads. On one hand, they have access to powerful AI tools that can significantly enhance productivity and inspiration. On the other, they risk losing the personal touch, authenticity, and intricate control over their craft. The available platforms, while useful, tend to box writers into specific workflows, stifling the fluidity and flexibility that the art of writing often demands.

With this backdrop, it becomes evident that while we have made leaps in integrating technology with writing, there is a tangible gap between what is available and what is truly desired and needed.

SUMMARY

A system and method for transforming text within documents using, such as by using large language models (LLMs). Users can select source text from a source document, in response to which a painting configuration is identified or generated based on the source text, such as by providing the source text and a source prompt to a large language model to produce source output, and selecting or generating the painting configuration based on the source output. The user can select destination text, in response to which the painting configuration is applied to the destination text, such as by selecting or generating a destination action definition based on the painting configuration and the destination text, and providing the destination action definition to a large language model to produce destination output. The destination text may be replaced with the destination output, or output derived therefrom. In this way, the system can extract a variety of sophisticated properties, such as style or tone, from user-selected text source text, and apply those properties to user-selected destination text, with minimal user input.

Other features and advantages of various aspects and embodiments of the present invention will become apparent from the following description and from the claims.

DETAILED DESCRIPTION

Computer-implemented methods and systems interface with a language model (e.g., a Large Language Model (LLM)) to assist in document revision. The methods and systems allow text to be selected within a document and an action definition to be selected from an action definition library. The text and/or the action definition may be selected using a graphical user interface (GUI). An action defined by the selected action definition is applied to the selected text to generate text. For example, the selected action definition may include a prompt, and the prompt may be combined with the selected text to generate a combined prompt. The combined prompt may be provided as an input to the LLM, which may generate the generated text. The generated text may be integrated into the document.

Figure 1:
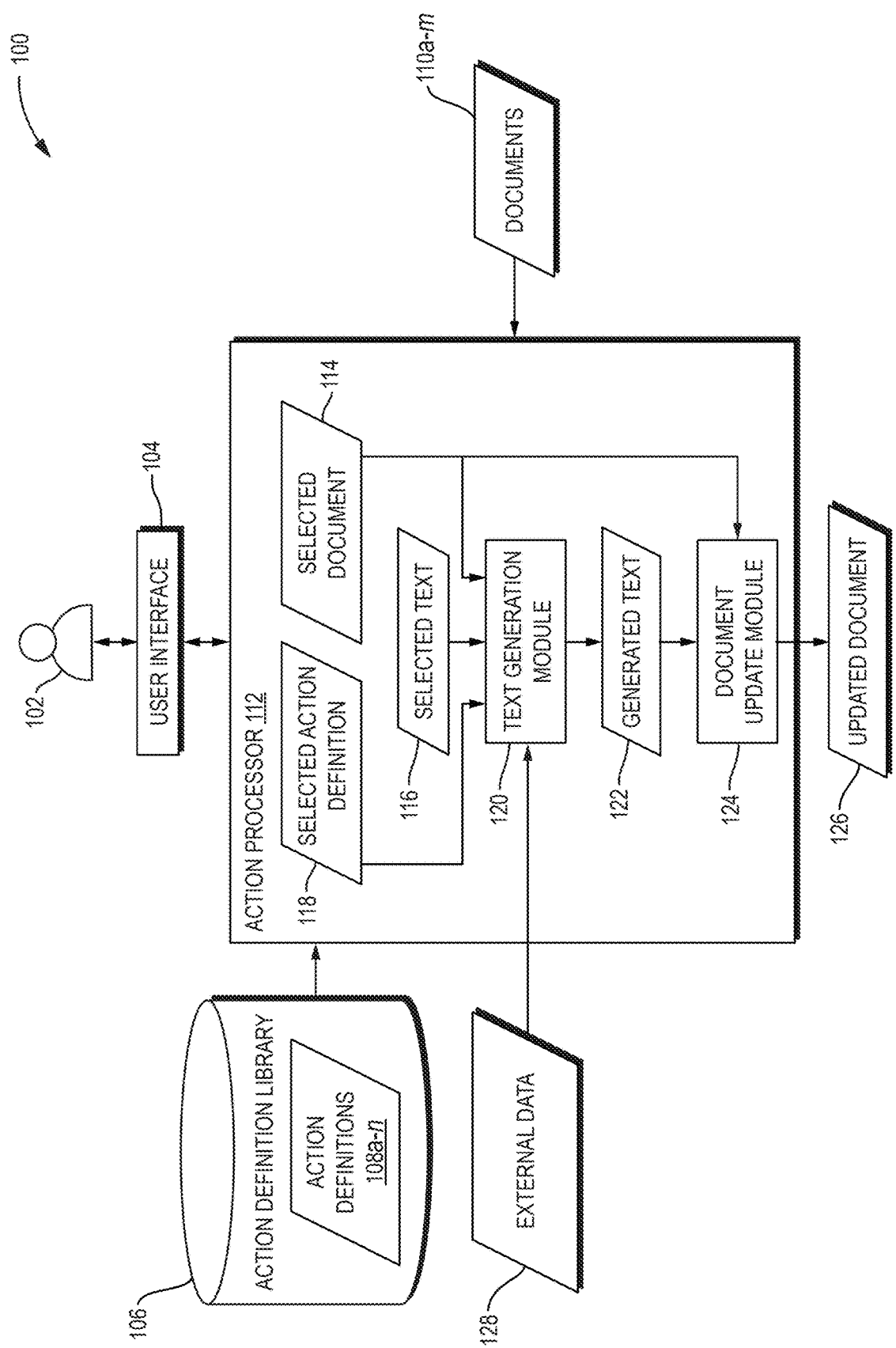
FIG. 1 is a dataflow diagram of a system for generating text based on a selected document, text, and action definition, and for updating the selected document based on the generated text according to one embodiment of the present invention.
Figure 2:
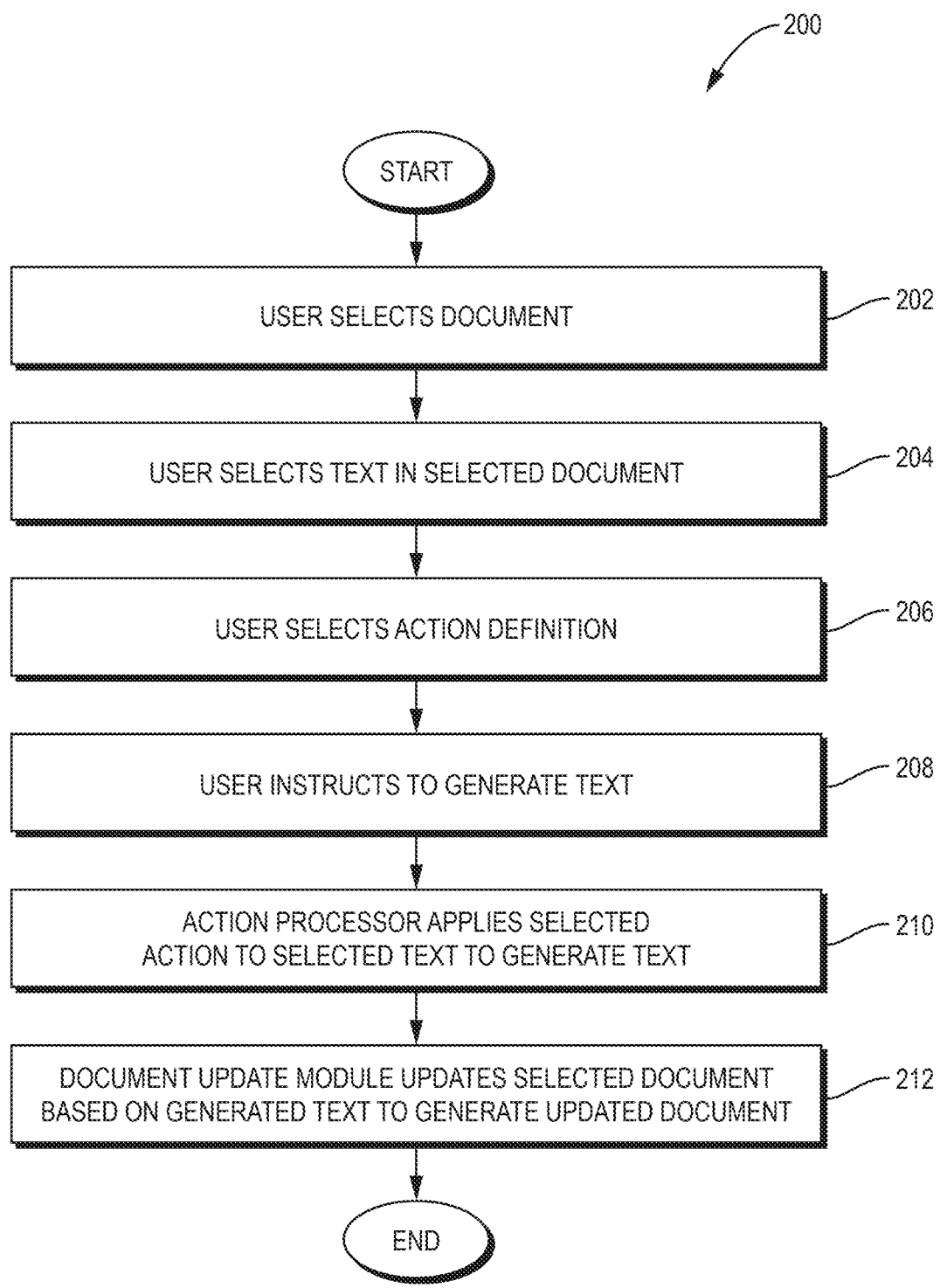
FIG. 2 is a flowchart of a method performed by the system of FIG. 1 according to one embodiment of the present invention.

Referring to FIG. 1, a dataflow diagram is shown of a system 100 for generating text based on a selected document, text, and action definition, and for updating the selected document based on the generated text according to one embodiment of the present invention. Referring to FIG. 2, a flowchart is shown of a method 200 performed by the system 100 of FIG. 1 according to one embodiment of the present invention.

The system 100 includes a user 102, who may, for example, be a human user, a software program, a device (e.g., a computer), or any combination thereof. For example, in some embodiments, the user 102 is a human user. Although only the single user 102 is shown in FIG. 1, the system 100 may include any number of users, each of whom may perform any of the functions disclosed herein in connection with the user 102. For example, the functions disclosed herein in connection with the user 102 may be performed by multiple users, such as in the case in which one user performs some of the functions disclosed herein in connection with the user 102 and another user performs other functions disclosed herein in connection with the user 102.

The system 100 also includes a user interface 104, which receives input from the user 102 and provides output to the user 102. The user interface 104 may, for example, include a textual interface (which may, for example, receive textual input from the user 102 and/or provide textual output to the user 102), a graphical user interface (GUI), a voice input interface, a haptic interface, an Application Program Interface (API), or any combination thereof. Although only the single user interface 104 is shown in FIG. 1, the system 100 may include multiple user interfaces, in which case some of the functions disclosed herein in connection with the user interface 104 may be performed by one user interface, and other functions disclosed herein in connection with the user interface 104 may be performed by another user interface.

Although the disclosure herein provides certain examples throughout of inputs that may be received from the user 102 via the user interface 104, such examples are merely provided as illustrations and do not constitute limitations of the present invention. It should be understood for example, that any particular example of an input from the user 102 that is in a particular mode (e.g., text input or interaction with a graphical element in a GUI) may alternatively be implemented by an input from the user 102 in a different mode (e.g., voice).

Because the user 102 may be non-human (e.g., software or a device), the user interface 104 may receive input from, and provide output to, a non-human user. As this implies, the user interface 104 is not limited to interfaces, such as graphical user interfaces, that are conventionally referred to as "user" interfaces. For example, if the user 102 is a computer program, the user interface 104 may provide receive input from and provide output to such a computer program using an interface, such as an API, that is not conventionally referred to as a user interface, and that may not even manifest any output to a human user or that is perceptible directly by a human user.

The term "manifest," as used herein, refers to generating any output to the user 102 via the user interface 104 in any form based on any data, such as any of the data shown in FIG. 1. The result of manifesting any particular data is referred to herein as a "manifestation" of that data. Manifesting data may include, for example, generating visual (e.g., textual, image, and/or video) output, audio output, and/or haptic output, in any combination. Therefore, any reference herein to generating output to the user 102 via the user interface 104 should be understood to include manifesting that output in any way, even if such a reference refers only to a particular kind of manifesting/manifestation (e.g., "displaying" or "showing" the output to the user 102).

The system 100 includes a plurality of documents 110*a*-*m*. Although the system 100 may include only a single document, the plurality of documents 110*a*-*m* is shown and described herein for the sake of generality. It should be understood, however, that features disclosed herein may be applied to a single document, rather than to the plurality of documents 110*a*-*m*.

The term "document" as used herein refers to any data structure that includes text. For example, a document may include, but is not limited to: text within social media interfaces, such as post composition windows, comment/reply interfaces, and profile editors; text entry fields in communication platforms, including email composition interfaces, messaging applications, and collaboration tools; web-based content creation interfaces, such as content management systems, blog editors, online forms, and wiki page editors; text fields within professional and productivity tools, including documentation interfaces, project management tools, and code editor comment sections; mobile application text interfaces, such as note-taking applications, mobile browser input areas, and form entry fields.

These examples illustrate some of the many contexts in which the systems and methods disclosed herein may be applied, though the term "document" is not limited to these examples. As described above, a document may be or be part of a file in a file system, a record, a database table, or a database. A document may include data in addition to text, such as audio and/or visual data.

The user interface 104 may take various forms appropriate to the particular text-based interface being used. For example, when implemented within a social media platform, the user interface 104 may integrate with the platform's existing text composition window. When implemented within a messaging application, the user interface 104 may be integrated directly into the message composition field. These implementations leverage the system's ability to provide textual interfaces, graphical user interfaces, voice input interfaces, haptic interfaces, Application Program Interfaces (APIs), or any combination thereof, as appropriate to the specific use case.

This flexible approach to implementation enables embodiments of the present invention to be adapted to a wide variety of text-based environments and use cases. For instance, in a social media platform, the system might integrate directly with the platform's post composition interface. In a messaging application, the system may integrate with the message composition field. In a web-based email client, the system may be implemented as a browser extension. In a mobile note-taking app, the system may leverage the device's native text input capabilities. These examples demonstrate how the system's flexible architecture supports deployment across diverse text-based interfaces while maintaining the core capabilities described herein.

The system 100 also includes an action processor 112. As will be described in more detail below, the action processor 112 may perform a variety of functions. Although the action processor 112 is shown as a single module in FIG. 1, this is merely an example and does not constitute a limitation of the present invention. More generally, any of the functions disclosed herein as being performed by the action processor 112 may be performed by any one or more modules in any combination, which may include, for example, one or more software applications. As merely one example, selection of text within a document by the action processor 112 may be performed by one software application or module (e.g., a word processing application), while generation of text by the action processor 112 may be performed by another software application or module (e.g., a plugin to the word processing application). As this example illustrates, some functions performed by the action processor 112 may be performed by or in cooperation with one or more conventional components (e.g., a conventional word processing application), while other functions performed by the action processor 112 may be performed by one or more non-conventional components that have been implemented in accordance with the disclosure herein.

The user 102 selects a particular document (referred to herein as the selected document 114) within the plurality of documents 110*a*-*m* (FIG. 2, operation 202). For example, the user 102 may provide document selection input to the action processor 112 via the user interface 104, in response to which the action processor 112 may select the selected document 114 from among the plurality of documents 110a-m. The user 102 may select the selected document 114 in any of a variety of ways, such as by opening the selected document 114 in any known manner (e.g., double-clicking on an icon representing the selected document 114 in a GUI) or by selecting a window displaying the selected document 114 in a GUI. Although the selected document 114 is shown as a distinct element in FIG. 1, the selected document 114 may be implemented using a pointer, reference, or other data that identifies the selected document 114 within the plurality of documents 110a-m or which otherwise enables the action processor 112 to perform the functions disclosed herein in connection with the selected document 114.

Operation 202 is optional in the method 200. For example, operation 202 may be omitted if there is only one document in the system 100, if the action processor 112 itself has already selected a document, or if the selected document 114 is implicit or automatically-selectable by the action processor 112 without the user 102's input. Furthermore, even if operation 202 is performed, it may, for example, be performed once to select the selected document 114, and then not be performed again during subsequent instances of the method 200, in which case the original selected document 114 may be used during each such instance without being re-selected.

The user 102 selects text (referred to herein as the selected text 116) within the selected document 114 (FIG. 2, operation 204). For example, the user 102 may provide text selection input to the action processor 112 via the user interface 104, in response to which the action processor 112 may select the selected text 116 within the selected document 114. The user 102 may select the selected text 116 in any of a variety of ways, such as by selecting the selected text 116 in any known manner (e.g., dragging across the selected text 116 within a manifestation of the selected document 114 in a GUI) or by typing or speaking some or all of the selected text 116. The selected text 116 may or may not be in the selected document 114 before the user 102 selects the selected text 116. As an example of the latter, the selected document 114 may not contain the selected text 116, and the user 102 may "select" the selected text 116 by inputting (e.g., typing or speaking) the selected text 116, such as by inputting the selected text 116 into the selected document 114 or elsewhere (e.g., into a text field that does not cause the selected text 116 to be added to the selected document 114).

The user 102 may select the selected text 116 in a variety of other ways, such as by uploading a file containing the selected text 116, selecting a file containing the selected text 116, pasting the selected text 116 from a clipboard, or sending a message (e.g., a text message or an email message) containing the selected text 116.

Although the selected text 116 is shown as a distinct element in FIG. 1, the selected text 116 may be implemented using a pointer, reference, or other data that identifies the selected text 116 within the selected document 114 or which otherwise enables the action processor 112 to perform the functions disclosed herein in connection with the selected text 116. For example, the selected text 116 may be implemented using any known techniques for representing selected text within a document in a word processing application or other text editing application.

The selected text 116 may consist of less than all of the text in the selected document 114. As some examples, the selected text 116 may consist of a single character in the selected document 114 (which may include multiple characters), a single word in the selected document 114 (which may include multiple words), a single sentence in the selected document 114 (which may include multiple sentences), or a single paragraph in the selected document 114 (which may include multiple paragraphs). As another example, the selected text 116 may include all of the text in the selected document 114. In any of these cases, the selected text 116 may include or consist of a single contiguous block of text in the selected document 114.

The selected text 116 may include or consist of a plurality of non-contiguous blocks of text (also referred to herein as "text selections") in the selected document 114, where each such text selection is contiguous within the selected document 114. For example, if the selected document 114 includes contiguous text blocks A, B, and C (i.e., if the selected document 114 includes text block A, followed immediately by text block B, followed immediately by text block C), then the selected text 116 may include text block A and text block C, but not text block B. The selected text 116 may implement such non-contiguous text selections using, for example, any known method for doing so. Similarly, the system 100 may enable the user 102 to select such non-contiguous text selections within the selected text 116 using, for example, any known method for doing so, such as by enabling the user to drag across a first such text selection in a manifestation of the selected document 114 in a GUI and then to drag across a second such text selection in the manifestation of the selected document 114 in the GUI while holding a predetermined key (e.g., CTRL or SHIFT).

The system 100 includes an action definition library 106, which may include one or a plurality of action definitions 108a-n.

The user 102 selects a particular action definition (referred to herein as the selected action definition 118) within the plurality of action definitions 108a-n (FIG. 2, operation 206). For example, the user 102 may provide action definition selection input to the action processor 112 via the user interface 104, in response to which the action processor 112 may select the selected action definition 118 from among the plurality of action definitions 108a-n. The user 102 may select the selected action definition 118 in any of a variety of ways, such as by selecting the selected action definition 118 from a manifested list of some or all of the action definitions 108a-n in any known manner (e.g., clicking or double-clicking on an icon representing the selected action definition 118 in a GUI) or by typing some or all of a label (e.g., short name) associated with the selected action definition 118. Although the selected action definition 118 is shown as a distinct element in FIG. 1, the selected action definition 118 may be implemented using a pointer, reference, or other data that identifies the selected action definition 118 within the plurality of action definitions 108a-n or which otherwise enables the action processor 112 to perform the functions disclosed herein in connection with the selected action definition 118.

As one particular example, the user 102 may select a manifestation of the selected text 116, and the action processor 112 may manifest a list of some or all of the plurality of action definitions 108a-n, such as in the form of a contextual menu. The action processor 112 may, for example, manifest such a list directly in response to the user 102's selection of the selected text 116, or in response to some additional input (e.g., right-clicking on the selected manifestation of the selected text 116) received from the user 102. The user 102 may then select one of the plurality of action definitions 108a-n from the list in any of the ways disclosed herein, thereby selecting the selected action definition 118. In response to that selection, or in response to some additional input from the user 102, the action processor 112 may perform operation 210. More generally, the action processor 112 may perform operation 210 in connection with any kind of selected text 116 disclosed herein.

In some embodiments, operation 206 may be performed once to select the selected action definition 118, and then not performed again during subsequent instances of the method 200, in which case the original selected action definition 118 may be used during each such instance without being re-selected.

The action definitions 108*a-n* may not take a form that is amenable to being manifested in ways that are conducive to being understood easily or quickly by users, especially users who are not technically sophisticated. For example, as will be described in more detail below, the action definitions 108*a-n* may include scripts and/or LLM prompts. Embodiments may facilitate user input for selecting the selected action definition 118 in operation 206 in any of a variety of ways. For example, the action processor 112 may manifest, for each of some or all of the action definitions 108*a-n*, a corresponding action definition label (also referred to herein as an "action definition short name" or merely as a "short name") which contains less information than the corresponding action definition itself. For example, an action definition that includes an LLM prompt having 500 characters may have a short name that contains fewer characters (e.g., "Summarize" or "Rephrase"). The action processor 112 may, in operation 206, manifest only the short name of each manifested action definition and not the entire action definition. As an example, the action processor 112 may manifest a list (e.g., a menu or set of buttons) containing a plurality of short names corresponding to some or all of the action definitions 108*a-n*, such as "Summarize|Rephrase|Expand". As this example illustrates, different ones of the action definitions 108*a-n* may have different short names.

The user 102 may select the selected action definition 118 in operation 206 by providing input, via the user interface 104, to the action processor 112, which specifies the selected action definition 118. Such input may take any of a variety of forms. For example, the user 102 may provide that input by selecting the selected action definition 118 from a set of manifestations (e.g., short names) representing some or all of the action definitions 108*a-n*. For example, if the action processor 112 has manifested a plurality of manifestations of some or all of the action definitions 108*a-n* (e.g., in the form of a menu or a plurality of buttons), the user 102 may provide the input selecting the selected action definition 118 by selecting (e.g., clicking on, tapping on, or speaking a short name of) one of the plurality of manifestations which corresponds to the selected action definition 118.

In some embodiments, the user 102 may provide input selecting the selected action definition 118 in operation 206 even if the action processor 112 has not manifested any manifestations of the plurality of action definitions 108*a-n*. For example, the user 102 may select the selected text 116 and then provide input selecting the selected action definition 118 even if the action processor 112 has not manifested any manifestations of the plurality of action definitions 108*a-n*, such as by speaking or typing input that selects the selected action definition 118 (e.g., a short name of the selected action definition 118).

The user 102 instructs the action processor 112 to generate text that is referred to herein as the generated text 122 (FIG. 2, operation 208). The user 102 may provide this instruction by providing input, via the user interface 104, to the action processor 112, which instructs the action processor 112 to generate the generated text 122. Such input may take any of a variety of forms, such as speaking a voice command, typing a textual command, or providing any kind of input in connection with a GUI element, such as pressing a button or selecting a menu item.

In some embodiments, operation 208 may be omitted or combined with operation 206. For example, the action processor 112 may interpret the user 102's selection of the selected text 116 and/or the user 102's selection of the selected action definition 118 as an instruction to generate the generated text 122, or may otherwise generate the generated text 122 in response to the user 102's selection of the selected text 116 and/or the selected action definition 118, as a result of which the user 102 may not provide any distinct input instructing the action processor 112 to generate the generated text 122. For example, in response to the user 102 selecting the selected text 116 and selecting a short name of one of the action definitions 108*a-n*, the action processor 112 may generate the generated text 122 (operation 208) without receiving any additional input from the user 102 representing an instruction to generate the generated text 122.

In some embodiments, operation 208 may be performed once to receive an instruction from the user 102 to generate the generated text 122, and then not be performed again during subsequent instances of the method 200. For example, if the selected document 114 and the selected action definition 118 have been selected, the user 102 may provide input, via the user interface 104, to the action processor 112, instructing the action processor 112 to enter an "action mode." While in the action mode, the action processor 112 may, in response to any text in the selected document 114 being selected as an instance of the selected text 116, perform an action represented by the selected action definition 118 on that instance of the selected text 116 to generate a corresponding instance of the generated text 122, without the user 102 providing an instruction to generate each such instance of the generated text 122. Such an action mode enables the user to select the selected document 114 and selected action definition 118 once, and then to apply an action represented by the selected action definition 118 to a plurality of instances of the selected text 116 in the selected document 114 quickly and easily, without having to select the selected action definition 118 each time and without having to issue an instruction to perform an action represented by the selected action definition 118 each time.

Although certain operations are shown in a particular order in the method 200 of FIG. 2, this order is merely an example and does not constitute a limitation of the present invention. Operations in the method 200 may be performed in other orders. As some examples:

The user 102 may select the selected text 116 (operation 204) after selecting the selected action definition 118 (operation 206).

The user 102 may select the selected action definition 118 before selecting the selected text 116 (operation 204).

The user 102 may select the selected action definition 118 before selecting the selected document 114 (operation 202).

The system 100 includes a text generation module 120, which applies an action defined by the selected action definition 118 (referred to herein as the "selected action" or a "corresponding action" of the selected action definition 118) to the selected text 116 to generate the generated text 122 (FIG. 2, operation 210). The generated text 122 may include at least some text that is not in the selected text 116. For example, none of the text in the generated text 122 may be in the selected text 116. As another example, the generated text 122 may include some text that is in the selected text 116 and some text that is not in the selected text 116. For example, if the selected text 116 includes text A followed immediately by text B, the generated text 122 may include text A followed immediately by text C, where text B differs from text C. As another example, if the selected text 116 includes text A followed immediately by text B, the generated text 122 may include text C followed immediately by text B, where text A differs from text C. The generated text 122 may include (e.g., consist of) text that is not in the selected document 114.

The system 100 may also include a variety of external data 128. The external data may be external in the sense that it is not contained in the documents 110*a-m* or in the selected document 114. The external data 128 may, however, be contained within the action processor 112 and/or be outside the action processor 112. The external data 128 may, for example, include data stored in any combination of the following: one or more data structures, files, records, databases, and/or websites. The external data 128 may include static data and/or dynamically-generated data, such as data that is generated dynamically in response to a request from the system 100 (e.g., the action processor 112).

The text generation module 120 may receive some or all of the external data 128 as input and apply the action corresponding to the selected action definition 118 to both the selected text 116 and to some or all of the external data 128. For example, as described in more detail below, the text generation module 120 may modify and/or generate a prompt based on the external data 128, such as by including some or all of the external data 128 in the prompt (e.g., by using some or all of the external data 128 as a value for one or more tokens in the prompt). As another example, the text generation module 120 may include some or all of the external data 128 in the generated text 122, whether or not the text generation module 120 includes that data in a prompt that is used to generate the generated text 122. As an example, the text generation module 120 may use a prompt (which does not include any of the external data 128) to generate the generated text 122 and then update the generated text 122 based on some or all of the external data 128, such as by including some or all of the external data 128 in the generated text 122.

The system 100 may utilize Retrieval Augmented Generation (RAG) to enhance its ability to generate and process text. RAG is a technique that combines the power of large language models with the ability to retrieve and incorporate relevant information from external sources. For example, when creating a prompt based on the selected text 116 and the selected action definition 118, the text generation module 120 may use RAG to retrieve relevant information from the documents 110*a-m* and/or external data 128. The text generation module 120 may incorporate such retrieved information incorporated into the prompt to provide additional context or guidance to the language model.

As another example, when processing the output generated by the text generation module 120 (e.g., the generated text 122), the text generation module 120 may use RAG to fact-check, augment, and/or refine such output based on information retrieved from trusted sources. The results of such processing may be used to modify the generated text 122 before providing the generated text 122 as output to the user 102. As yet another example, the document update module 124 updates the selected document 114 based on the generated text 122, the document update module 124 may use RAG to ensure consistency with other parts of the document or to incorporate relevant information from related documents.

RAG is merely one example of a variety of techniques that the system 100 may use to improve the output of language models, such as for the purpose of making the generated text 122 as relevant to the user 102 as possible. These techniques aim to customize and enhance the operation of language models to better suit the specific needs of the user 102 and the context of the document being edited. Some examples of such techniques include:

Fine-tuning: The system 100 may use fine-tuned language models that have been further trained on domain-specific data or the user 102's own writing style. The system 100 itself may perform such fine-tuning.

Few-shot learning: By providing the language model with a few relevant examples within the prompt, the system 100 can guide the model to generate more appropriate and contextually relevant text.

LARA (Light and Anti-overfitting Retraining Approach): The system 100 may employ LARA to fine-tune language models in a way that reduces overfitting and maintains the model's general knowledge while adapting it to specific tasks or domains. This can help produce more reliable and contextually appropriate generated text 122.

Prompt engineering: The system 100 may employ advanced prompt engineering techniques, such as chain-of-thought prompting or self-consistency, to elicit more coherent and relevant responses from the language model.

Ensemble methods: The system 100 may combine outputs from multiple language models or multiple runs of the same model to produce more robust and diverse generated text 122.

Context windowing: For longer documents, the system 100 may use sliding context windows to provide the language model with the most relevant surrounding text, ensuring that the generated text 122 maintains coherence with the broader document.

These techniques, either individually or in combination, may be applied by the text generation module 120 and the system 100 more generally to enhance the relevance and quality of the generated text 122. The specific techniques used may depend on factors such as the selected action definition 118, the nature of the selected document 114, and user preferences.

The system 100 includes a document update module 124, which updates the selected document 114 based on the generated text 122 to generate an updated document 126 (FIG. 2, operation 212). The document update module 124 may perform operation 212 in any of a variety of ways. For example, the document update module 124 may perform operation 212 by:

replacing the selected text 116 in the selected document 114 with the generated text 122;

modifying the selected text 116 in the selected document 114 based on the generated text 122; or adding the generated text 122 to the selected document 114, without modifying the selected text 116 in the selected document 114.

As the above implies, as a result of operation 212, the updated document 126 may include some or all of the generated text 122, even if the selected document 114 did not include the generated text 122.

The system 100 may enable the user 102 to select the update mode of the document update module 124 from among a plurality of update modes (e.g., from the "replace," "modify," and "add" modes described above). This feature allows the user 102 to choose how the generated text 122 will be integrated into the selected document 114.

To implement such a user-selectable document update mode, the system 100 may receive document update mode selection input from the user 102, e.g., via the user interface 104. As one example, the system 100 may manifest output, via the user interface 104, representing a plurality of available document update modes, and the user 102 may provide document update mode selection input selection one of the available document update modes (the "selected document update mode"). At any later time, the document update module 124 may perform operation 212 using the selected document update mode.

As another example, the action definitions 108a-n in the action definition library 106 may include a parameter specifying the default update mode for each action definition. The user 102 may be able to override this default setting when selecting an action definition. In any case, when the document update module 124 performs operation 212, the document update module 124 may identify the update mode (e.g., the default update mode or user-overridden update mode) associated with the selected action and perform operation 212 using the identified update mode. As yet another example, the system 100 may include a global setting that determines the default update mode, which the user 102 can override, such as by using a settings menu in the user interface 104. In any case, when the document update module 124 performs operation 212, the document update module 124 may identify the system-wide update mode (e.g., the default system-wide update mode or user-overridden system-wide update mode) and perform operation 212 using the identified update mode.

The document update module 124 may perform operation 212 directly or indirectly on the selected document 114 in any of a variety of ways. For example, the document update module 124 may directly update the selected document 114 in any of the ways disclosed herein to generate the updated document 126, which may be an updated version of the selected document 114, such as in embodiments in which the user 102 edits the selected document 114 in a software application via the user interface 104, and in which the document update module 124 has direct access to the selected document 114. Alternatively, for example, the document update module 124 may provide output (not shown), which specifies modifications to be made to the selected document 114, to another component (not shown), such as a text editing application (e.g., word processing application), which has direct access to the selected document 114, in which case that other component (e.g., text editing application) may update the selected document 114 in the manner specified by the output from the document update module 124 to generate the updated document 126.

Although the updated document 126 is shown distinctly from the selected document 114 in FIG. 1 for ease of illustration, the updated document 126 may be an updated version of the selected document 114, such that no document separate from the selected document 114 is generated by operation 212. Alternatively, for example, operation 212 may generate the updated document 126 as a document that is distinct from the selected document 114, such that, as a result of operation 212, the selected document 114 and the updated document 126 both exist simultaneously (e.g., as distinct documents in a file system), and the selected document 114 may remain unchanged by operation 212.

Regardless of how operation 212 is performed, once the updated document 126 has been generated, the user interface 104 may generate manifest some or all of the updated document 126, thereby generating a manifestation of the updated document 126, which may be provided to the user 102 via the user interface 104. For example, the user interface 104 may manifest (e.g., display) some or all of a portion of the updated document 126 containing the generated text 122 to the user 102.

As mentioned above, operation 212 may include inserting some or all of the generated text 122 into the selected document 114. More generally, the action processor 112 may identify a location (referred to herein as "the selected output location"), whether in the selected document 114 or in another one of the documents 110a-m, and insert the generated text 122 at the selected output location, or otherwise update the selected document 114 at the selected output location based on the generated text 122. The action processor 112 may identify the selected output location in any of a variety of ways, such as automatically or by receiving input from the user 102 via the user interface 104, which specifies the selected output location.

The action processor 112 may receive such input from the user 102 specifying the selected output location in any of a variety of ways. For example, the user 102 may specify the selected output location, such as by clicking or tapping on a manifestation of the selected output location (e.g., in a manifestation of the selected document 114 or another one of the documents 110a-m). The user 102 may provide input specifying the selected output location at any of a variety of times, such as before operation 202; after operation 202 and before operation 204; after operation 204 and before operation 206; after operation 206 and before operation 208; after operation 208 and before operation 210; or after operation 210 and before operation 212. As a particular example, the action processor 112 may perform operation 210 to generate the generated text 122 and then receive input from the user 102 specifying the selected output location. The action processor 112 may, for example, manifest a preview of the updated document 126 to the user 102, showing how the updated document 126 would appear if it were updated based on the user 102's selected output location, and enable the user 102 to accept or reject that version of the updated document 126. If the user 102 rejects that version of the updated document 126, the system 100 may enable the user 102 to select an alternative selected output location, in response to which the action processor 112 may manifest a preview of the updated document 126 to the user 102 based on the alternative selected output location and repeat the process just described. This process may repeated any number of times until the user 102 accepts an output location, at which point the latest version of the updated document 126 is output by the action processor 112 in operation 212.

The selected output location may, but need not be, within the selected document 114 or within any of the documents 110a-m. As another example, the selected output location may be in a new document/window/panel, in which case the action processor 112 may, as part of or after operation 212, generate a new document/window/panel and insert the generated text 122 into the new document/window/panel, which is an example of the updated document 126.

In some embodiments, the document update module 124 uses a language model (e.g., a large language model (LLM)) in the performance of operation 212. For example, each of some or all of the action definitions 108a-n may include, refer to, or otherwise specify one or more corresponding prompts suitable for being provided as input to a language model. Different ones of the action definitions 108a-n may include, refer to, or otherwise specify different corresponding prompts. For any particular action definition, the prompt(s) that the particular action definition includes, refers to, or otherwise specifies is referred to herein as the particular action definition's "corresponding prompt" (even if there are a plurality of such prompts). The selected action definition 118 may have a particular corresponding prompt. Applying the selected action definition 118 to the selected text 116 may include, for example, providing the selected action definition 118's corresponding prompt as an input to a language model to generate some or all of the generated text 122, or otherwise to generate output which the action processor 112 processes to generate some or all of the generated text 122 (whether or not the generated text 122 includes any of the output of the language model).

Before providing input to a language model, the action processor 112 may, for example, generate a prompt based on the selected action definition 118 and the selected text 116 (and, optionally, the selected document 114 and/or the external data 128). Although more examples of how the action processor 112 may generate such a prompt will be described in more detail below, the action processor 112 may, for example, generate a prompt (referred to herein as a "combined prompt") which includes both some or all of the selected action definition 118's corresponding prompt and some or all of the selected text 116, such as by concatenating the selected action definition 118's corresponding prompt with some or all of the selected text 116. As a particular example, the combined prompt may include or consist of the selected action definition 118's corresponding prompt followed immediately by the selected text 116, or the selected text 116 followed immediately by the selected action definition 118's corresponding prompt. The action processor 112 may provide such a combined prompt to a language model to generate output (e.g., the generated text 122) in any of the ways disclosed herein.

More generally, the action processor 112 may perform any of a variety of actions to generate the combined prompt based on the select action definition 118's corresponding prompt and (optionally) additional data, such as any one or more of the selected text 116, the selected document 114, the documents 110a-m, or the external data 128. As described in more detail below, the actions that the action processor 112 performs to generate the combined prompt may include one or more actions other than "combining" the selected action definition 118's corresponding prompt. As a result, although the resulting prompt is referred to herein as the "combined prompt," this prompt may also be understood as a "processed prompt" or "final prompt," meaning that it results from processing the selected action definition 118's corresponding prompt and (optionally) additional data, whether or not such processing is characterizable as "combining" the selected action definition 118's corresponding prompt with other information. Merely one example of such processing is to use a trained model, such as an LLM, to generate the combined prompt based on the selected action definition 118's corresponding prompt and (optionally) additional data.

As implied by the description herein, embodiments of the system 100 may enable the user 102 to cause the action processor 112 to provide the combined prompt to the language model without the user 102 typing or otherwise inputting the combined prompt (or at least the entirety of the combined prompt) to the action processor 112. The action processor 112 may not even manifest the combined prompt (or at least the entirety of the combined prompt) to the user 102. For example, the user 102 may select the selected text 116 and select a short name of the selected action definition 118, which may contain only a small amount of text (e.g., "Summarize"), without inputting (e.g., typing or speaking) the corresponding prompt of the selected action definition 118 (which may contain a large amount of text that is not manifested by the action processor 112 to the user 102), and thereby cause the action processor 112 to: (1) generate a combined prompt based on the corresponding prompt of the selected action definition 118 and the selected text 116; (2) provide the combined prompt as input to a language model to generate output (e.g., the generated text 122); and (3) generate the updated document 126 based on output (e.g., the generated text 122) generated by the language model. Such a process enables the user 102 to leverage the power of a language model to generate the generated text 122, and to generate the updated document 126 based on the generated text 122, without having to manually create or input a prompt to the language model based on the selected text 116, and without having to manually update the selected document 114 based on the output of the language model. Instead, the action processor 112 may perform these operations automatically, thereby not only saving the user 102 manual time and effort, but also increasing the processing efficiency of the system 100 as a whole by enabling it to generate the generated text 122 and to generate the updated document 126 in fewer operations, and more quickly, than would be possible using a conventional chatbot-based approach.

Any language model referred to herein may be of any type disclosed herein. Any language model referred to herein may be contained within the system 100 (e.g., within the action processor 112) or be external to the system 100 (e.g., external to the action processor 112), in which case the system 100 (e.g., the action processor 112) may provide input to and receive output from the language model using a suitable interface, such as an API.

Although the disclosure herein may refer to "a language model," it should be understood that embodiments of the present invention may use a plurality of language models. As a result, any disclosure herein of performing multiple operations using a language model (e.g., generating a first instance of the generated text 122 using a language model and generating a second instance of the generated text 122 using a language model) should be understood to include either using the same language model to perform those multiple operations or to using different language models to perform those multiple operations. Embodiments of the present invention may select a particular language model to perform any operation disclosed herein in any suitable manner, such as automatically or based on input from the user 102 which selects a particular language model for use.

Any language model disclosed herein may (unless otherwise specified) include one or more language models, such as any one or more of the following, in any combination: a unigram language model; an n-gram language model; an exponential language model; a generative language model; an autoregressive language model; a neural network language model.

Any language model disclosed may, unless otherwise specified, include at least 1 billion parameters, at least 10 billion parameters, at least 100 billion parameters, at least 500 billion parameters, at least 1 trillion parameters, at least 5 trillion parameters, at least 25 trillion parameters, at least 50 trillion parameters, or at least 100 trillion parameters.

Any language model disclosed herein may, unless otherwise specified, have a size of a least 1 gigabyte, at least 10 gigabytes, at least 100 gigabytes, at least 500 gigabytes, at least 1 terabyte, at least 10 terabytes, at least 100 terabytes, or at least 1 petabyte.

Any language model disclosed herein may, for example, include one or more of each of the types of language models above, unless otherwise specified. As a particular example, any language model disclosed herein may, unless otherwise specified, be or include any one or more of the following language models, in any combination:

- Any language model in the GPT-n series of language models (such as any language model in the GPT-1, GPT-2, GPT-3, or GPT-4 families) available from OpenAI Incorporated of San Francisco, California;
- any version of the Language Model for Dialogue Applications (LaMDA), Generalist Language Model (GLaM), Pathways Language Model (PaLM), or Gemini, available from Google LLC of Mountain View, California;
- any version of the Gopher language model, available from DeepMind Technologies of London, United Kingdom;
- any version of the Turing-NLG (Turing Natural Language Generation) language model, available from Microsoft Corporation of Redmond, Washington;
- any version of the Megatron Language Model (Megatron-LM), available from Nvidia Corporation of Santa Clara, California; and
- any version of the Large Language Model Meta AI (LLaMA), available from Meta Platforms, Inc. of Menlo Park, California.

The action definitions 108a-n may take any of a variety of forms, some of which will now be described. Different ones of the action definitions 108a-n may be of different types. In other words, the types of action definitions 108a-n disclosed herein may be mixed and matched within the action definition library 106. Any particular embodiment of the present invention may implement some or all of the action definition types disclosed herein. Types of action definitions 108a-n may include, for example, any one or more of the following, in which the examples of prompts and user interfaces are merely examples and do not constitute limitations of embodiments disclosed herein:

Simple Text Prompts:
- Description: These are plain text prompts with no dynamic content (e.g., tokens or scripts). Examples are: "Expand on the following text:", "Summarize the following text:", and "Rewrite the following text to be understandable by a five year-old:".
- UI/UX Approach: Each simple text prompt may, for example, be displayed as a corresponding UI element (e.g., list item or button) with a distinct label, such as the corresponding action definition's short name. Clicking such a UI element causes the corresponding action definition to be selected as the selected action definition 118.
- Selection: Single-click.
- Viewing: Hovering over the UI element may display a tooltip with details (e.g., a description of the corresponding prompt and/or the full text of the corresponding prompt).
- Editing: Right-click or a small adjacent "edit" icon opens a simple text box, which enables the user 102 to edit the corresponding prompt and then save the edits.

Tokenized Prompts:
- Description: Prompts that contain placeholders (tokens) that can be dynamically replaced with content from any of a variety of sources, such as the selected text 116, the selected document 114, the documents 110a-m, input from the user 102 via the user interface 104, and/or external data 128.
- UI/UX Approach: Displayed similarly to simple text prompts, but with indications (e.g., colored/italicized) to suggest dynamic content.
- Selection: Single-click.
- Viewing: Tokens highlighted or underlined. Hovering over them shows a tooltip with details.
- Editing: Clicking on the token allows the user to select an alternative or input their own.

Alternative Take Prompts (an Example of "Compound Prompts"):
- Description: Multiple prompts, bundled in one prompt, representing alternatives for producing varied outputs. Each prompt within an alternative take prompt is an example of what is referred to herein as a "component prompt." Each component prompt within an alternative take prompt may be of any of the prompt types disclosed herein (e.g., simple, tokenized, compound, or scripted). When the action processor 112 executes an alternative take prompt, the action processor 112 performs operation 210 once for each of some or all of the alternative take prompt's component prompts in connection with the selected text 116, thereby generating a plurality of instances of the generated text 122 (one for each of some or all of the alternative take prompt's component prompts). The action processor 112 then enables the user 102 to select one or more of the plurality of instances of the generated text 122, in response to which the action processor 112 performs operation 212 on each instance of the generated text 122 selected by the user 102.
- UI/UX Approach: Displayed as a dropdown or expandable list.
- Selection: Clicking the compound prompt reveals components.
- Viewing: Expandable sections allow users to see each alternative.
- Editing: Users can add, remove, or modify each component prompt.

Chained Prompts (an Example of "Compound Prompts"):
- Description: Multiple prompts, bundled in one prompt, which are sequenced to execute in a specific order. Each prompt within a chained prompt is an example of a component prompt. Each component prompt within a chained prompt may be of any of the prompt types disclosed herein (e.g., simple, tokenized, compound, or scripted). When the action processor 112 executes a chained prompt, the action processor 112 performs operation 210 on the first of the chained prompt's component prompts in connection with the selected text 116, thereby generating a first instance of the generated text 122. The action processor 112 then performs operation 210 again, but uses the first instance of the generated text 122 to play the role of the selected text 116, thereby generating a second instance of the generated text 122. In other words, the action processor 112 uses the output of one instance of operation 210 as an input to the next instance of operation 210. This continues for all of the chained prompt's component prompts in order, at which point the most recent instance of the generated text 122 is used as the generated text 122 in operation 212.

UI/UX Approach: Displayed as a list with visual indications of the sequence (numbers/arrows).
  Selection: Single-click to apply the sequence.
  Viewing: Steps could be expandable or displayed with details on hover.
  Editing: Drag-and-drop for rearranging. Individual step editing similar to simpler prompt types.
Scripted Prompts:
  Description: Prompts, written in a scripting language, which may contain any one or more of the following, in any combination: prompts of any of the types disclosed herein, conditions, loops, and multifaceted logic. A scripted prompt may include at least one instruction to apply a corresponding action of the selected action definition 118 to the selected text 116, and may include: any number of instructions that perform actions other than the corresponding action of the selected action definition 118; and any number of instructions that perform actions that do not apply to the selected text 116. More generally, a scripted prompt may include instructions for performing any arbitrary action, whether or not related to the selected document 114, the selected text 116, or the selected action definition 118. As this implies, if the selected action definition 118 includes or otherwise specifies a scripted prompt, then operation 210 may include executing the script in that scripted prompt. As this implies, operation 210 is not limited to providing a prompt as input to a language model, but may include executing a script, which may include performing operations other than providing a prompt as input to a language model and operations other than performing inferencing using a language model.
  UI/UX Approach: These may, for example, be represented with unique icons or visuals to distinguish their complexity.
  Selection: Single-click, but with warnings or confirmations due to their complexity.
  Viewing: A dedicated "view mode" that expands the script in a readable, perhaps even flowchart-like format.
  Editing: A specialized script editor, potentially with hints, autofill, or predefined logic blocks to assist less technically inclined users.

What is described herein as an "alternative take prompt" may be implemented in any of a variety of ways. For example, a plurality of component prompts may be stored within a single action definition, in which case the action processor 112 may perform operation 210 once for each of some or all of the plurality of stored component prompts. As another example, the system 100 may enable the user 102 to select a plurality of component prompts using any of the techniques disclosed herein for selecting the selected action definition 118. The action processor 112 may perform operation 210 once for each of the plurality of component prompts selected by the user 102, whether or not those component prompts are stored within an action definition or the action definition library 106. Such an "on the fly" or "one time use" alternative take prompt may provide the user 102 with convenience and flexibility in executing alternative take prompts without the need to define and store such prompts in the action definition library 106 in advance.

An alternative take prompt may be implemented by executing even a single instance of the selected action definition 118, in any of the ways disclosed herein, a plurality of times to produce a plurality of instances of the generated text 122. Such instances of the generated text 122 may differ from each other because, for example, of the stochastic nature of LLMs and other models that may be used by the text generation module 120 to perform operation 210. As this example illustrates, an alternative take prompt may, but need not, include a plurality of prompts in order to achieve the effect of alternative takes.

The system 100 may handle the multiple outputs generated by an alternative take prompt in at least two different ways. As another example, the system 100 may provide all of the outputs to the user 102 for review via the user interface 104. The user 102 may then select one or more of these outputs, and the system 100 may use the selected output(s) to update the selected document 114 in operation 212. This approach allows for maximum user control and decision-making in the document revision process.

Alternatively, for example, the text generation module 120 may process the plurality of outputs generated using an alternative take prompt internally to produce a single instance of the generated text 122. The text generation module 120 may employ various methods to process multiple outputs internally, such as any one or more of the following:
  Concatenation: The text generation module 120 may combine all outputs sequentially to create a single, comprehensive instance of the generated text 122.
  Best Output Selection: The text generation module 120 may use one or more predefined criteria or machine learning algorithms to evaluate and select the "best" output among the alternatives. This may, for example, be based on factors such as relevance, coherence, or alignment with the user 102's writing style.
  Synthesis: The text generation module 120 may analyze the multiple outputs and create a new, synthesized text that incorporates the most relevant and/or high-quality elements from each alternative.
  Voting or Consensus: If the alternative take prompt generates similar ideas across multiple outputs, the text generation module 120 may identify common themes or phrases and construct a single output based on the most frequently occurring elements.

Any of the methods described above for generating a single instance of the generated text 122 based on multiple outputs of an alternative take prompt may, for example, include using an language model (e.g., an LLM) to generate that single instance of the generated text 122.

The method for handling multiple outputs of an alternative take prompt may, for example, be configured as a system-wide setting, specified within individual action definitions, or selected by the user 102 on a case-by-case basis through the user interface 104. This flexibility allows the system 100 to adapt to different user preferences and document revision scenarios, maintaining a balance between automated efficiency and user control.

As the types of prompts disclosed above illustrate, the text generation module 120 may act as a function which takes the selected text 116 as an input to the function, and which evaluates the function on the selected text 116 to generate the generated text 122. Such a function may have, as inputs, not only the selected text 116 but also one or more other inputs, such as any of the other values disclosed herein. For example, the selected text 116 may include or consist of a plurality of non-contiguous text selections in the selected document 114. Each of those non-contiguous text selections may be inputs to a single functions that is evaluated by the text generation module 120 to generate the generated text 122. As a particular example, if a tokenized prompt includes two tokens, then a first of the text selections in the selected text 116 may serve as the value for a first one of the two tokens in the tokenized prompt, and a second one of the text selections in the selected text 116 may serve as the value for a second one of the two tokens in the tokenized prompts. The text generation module 120 may generate the generated text 122 based on the resulting tokenized prompt (with the first and second text selections substituted into it).

As used herein, the term "prompt" includes not only prompts that are suitable to be provided to a language model, but more generally to any kind of action definition described herein, whether or not such an action definition includes or consists of content (e.g., text) that is suitable for being provided to a language model. For example, as used herein, the term "prompt" includes not only literal text prompts that are suitable to be provided directly to a language model, but more generally encompasses any form or representation of an action definition that can be used to generate output from a language model or other text generation system. This includes, but is not limited to:

Vector representations or embeddings derived from or representing prompts

Transformed or processed versions of prompts

Numerical or mathematical representations of prompts

Compressed or encoded forms of prompts

Any intermediate representations generated during processing

Any combination of the above forms

Embodiments of the present invention may, for example, transform prompts into any such alternative representations before using them to generate output. Such transformations may occur at any stage of processing, whether during action definition creation, storage, or execution. The system may store and use prompts in their original form, in transformed forms, or both.

This broad definition of prompts aligns with the system's support for sophisticated processing approaches, including multi-stage transformations, hybrid processing combining language model and non-language model stages, and various technical implementations across distributed systems. The system may process prompts using any combination of: traditional language model interactions, vector/embedding-based processing, fine-tuned model approaches, few-shot learning techniques, ensemble methods, context-aware processing, and/or any other suitable technical approach for generating output based on prompts in any form.

As mentioned above, a tokenized prompt may include one or more tokens. Similarly, a compound prompt or scripted prompt may include one or more tokens. Any particular prompt may include one or more tokens of any type(s), in any combination. Examples of token types include the following:

Selected Text Token:
  Represents the selected text 116.
  An example of a prompt that includes a selected text token is: "Summarize the following text: {selected_text}."

Contextual Tokens:
  Pulls from a broader context within or related to the selected document 114, such as the paragraph before/after the selected text, a specified portion (e.g., sentence, paragraph, or section) of the selected document 114, a specified feature (e.g., title) of the selected document 114, or specified metadata (e.g., creation date, last modified date, owner) of the selected document 114.
  An example of a prompt that includes a contextual token is: "Considering the following: {previous_paragraph}, elaborate on {selected_text}."

Date & Time Tokens:
  Automatically fetches a date and/or time, such as the current date and/or time.
  An example of a prompt that includes a date and time token is: "In the context of {selected_text}, what have been its impacts until {today}?"

User Profile Tokens:
  Refers to user's stored information, such as name, preferences, or writing style.
  An example of a prompt that includes a user profile token is: "Rephrase {selected_text} in the following writing style: {user writingstyle}."

Document Metadata Tokens:
  Refers to metadata of the selected document 114 and or the documents 110a-m, such as document title, author, or word count. Such metadata may, for example, include any metadata that may be defined, generated, and accessed via a Document Object Model (DOM) or similar structure(s) that represent document data and metadata in an accessible and modifiable form.
  An example of a prompt that includes a document metadata token is: "Incorporate {selected_text} into the theme of {document_title}."

Genre/Style Tokens:
  Offers a tone or style shift based on genres such as humor, academic, journalistic, or romance.
  An example of a prompt that includes a user genre/style token is: "Rewrite {selected_text} in a {genre} tone."

Reference Tokens:
  For cases where users want to correlate selected text with external references or sources.
  An example of a prompt that includes a reference token is: "Compare {selected_text} with known literature on {reference_topic}."

Numeric Tokens:
  For representing specific numbers or numerical ranges.
  An example of a prompt that includes a numeric token is: "Summarize {selected_text} in no more than {max_words} words."

Language Tokens:
  For representing identifiers of particular languages.
  An example of a prompt that includes a language token is: "Translate {selected_text} into {specified_language}."

Location Tokens:
  Refers to specific locations or regions, potentially useful for location-based content.
  An example of a prompt that includes a location token is: "Adapt {selected_text} for an audience in {specified_location}.

Historical/Temporal Tokens:
  For referencing specific historical periods or future predictions.
  An example of a prompt that includes a historical/temporal token is: "How might {selected_text} have been written in the {specified_era}κ"

Feedback Loop Tokens:
  A token that allows users to refer to previous outputs or iterations in the current session/chat/iteration of the method 200.
  An example of a prompt that includes a feedback loop token is: "Considering my last request, refine {selected_text}.

Emotion Tokens:
  Adjusts content based on specified emotions or feelings.
  An example of a prompt that includes an emotion token is: "Describe {selected_text} in a {mood} mood."

As the above examples of token types imply, embodiments of the present invention may employ any of a wide variety of token types. A token may appear at any location within a prompt. For example, a token may appear after an instance of plain text in the prompt, before an instance of plain text in the prompt, or between two instances of plain text in the prompt. As another example, two tokens may appear contiguously within a prompt. As these examples indicate, a prompt may include plain text and tokens in sequences such as "<token><plaintext>", "<plaintext><token>", "<token><plaintext><token>", "<plaintext><token><plaintext>", "<token><token>", or "<plaintext><token><token>", merely as examples. The user 102 may use any of the techniques disclosed herein to insert one or more tokens at any desired location(s) within a prompt. These features of tokens are applicable not only to the "tokenized prompt" action definition type disclosed herein, but to any type of action definition that is capable of including one or more tokens.

When performing operation 210, the action processor 112 may, for each token in the prompt to be provided as input to the language model, obtain a value for that token and replace the token with the obtained value in the prompt. The action processor 112 may then provide the resulting resolved prompt (which is an example of a "combined prompt" as that term is used herein) to the language model in operation 210.

In addition to simple tokens that are replaced with a single value, the system 100 may support tokens with multiple replaceable parameters. These multi-parameter tokens allow for more complex and flexible token replacement within prompts. A multi-parameter token may take the following general form:

{token_name(param1, param2, . . . , paramN)} where "token_name" is the identifier for the token, and "param1" through "paramN" are individual parameters that can each be replaced with their own values.

For example, a date range token might look like this:

{date_range(start_date, end_date, format)}

When processing such a token, the text generation module 120 may replace each parameter with its corresponding value. The action processor 112 may obtain values for each parameter using any of the methods described for single-value tokens, including automatic retrieval, user input, or derivation from other data sources.

The action processor 112 may obtain such token values in any of a variety of ways. For example, the action processor 112 may obtain a value of any particular token automatically, such as by using any of a variety of known techniques. For example, certain tokens, such as the user's preferred genre, may be stored in a variable of a data structure, from which the action processor 112 may retrieve the token's value automatically. As another example, certain tokens, such as a token representing the current date, may have values that the action processor 112 may obtain by executing a function associated with the token. As another example, the action processor 112 may generate a token's value using a trained model, such as a large language model (LLM). The model used to generate a token's value may be the same as or different from the model used by the text generation module 120 to generate the generated text 122. Once the action processor 112 has obtained or generated the token's value, it may substitute the token with the resulting value.

As yet another example, certain tokens may be designated as having a "manual input" property, while other tokens may be designated as having an "automatic input" property. A single prompt may include both one or more "manual input" tokens and one or more "automatic input" tokens. When the action processor 112 encounters a token that has the manual input property in operation 210, the action processor 112 may elicit input from the user 102, such as by displaying a popup window or dialog box requesting a value for the token from the user 102. In response, the user 102 may provide input representing or otherwise specifying such a value in any manner (such as by typing, speaking, or selecting such a value from a list). The action processor 112 may then use the value received from the user 102 as the value for the token, or may derive a value for the token from the value received from the user 102, and may then use that value in any of the ways disclosed herein in connection with operation 210.

Assigning properties such as "manual input" and "automatic input" to tokens is merely one way to implement the system 100 and is not a limitation of the present invention. Alternatively, for example, the action processor 112 may, at the time of performing operation 210, ask the user 102 to indicate, for each token in the prompt to be provided to the language model, whether the value for that token should be obtained automatically by the action processor 112 or be input manually by the user 102, in response to which the action processor 112 may obtain each token value in accordance with the user's indications.

As yet another example, however the action processor 112 generates the prompt to be provided to the language model, including obtaining initial values for any tokens within that prompt, the action processor 112 may manifest the prompt to the user 102 via the user interface 104, thereby providing the user 102 with an overridable preview of that prompt, which is referred to herein as an "initial prompt." The user 102 may then provide, via the user interface 104, any of a variety of input to revise the initial prompt and thereby generate a final prompt, such as by revising token values in the initial prompt and/or revising non-token text in the initial prompt. The action processor 112 may then provide the final prompt to the language model within operation 210.

Prompts of the various kinds disclosed herein may be created to perform a wide range of functions. Some particular, non-limiting examples of use cases for tokenized prompts include:

Rewrite Sentence as a Question:
  Tokenized Prompt: "Rewrite the following sentence as a question: {sentence}"
  Use Case: This is particularly useful when writers are framing research questions or looking to introduce more interactive or engaging language in their writing. It can help transform declarative statements into questions for effect.

Summarize Paragraph:
  Tokenized Prompt: "Summarize the following paragraph: {paragraph}"
  Use Case: Useful for condensing information, this prompt would benefit academic writers, journalists, or anyone who needs to distill long pieces of text into shorter versions without losing essential meaning.

Generate Title:
  Tokenized Prompt: "Create a title for the following blog post: {first_sentence_of_post}"
  Use Case: Bloggers or content creators could use this to come up with catchy, relevant titles for their articles based on the opening sentence or thesis.

Compare and Contrast:
  Tokenized Prompt: "Compare and contrast {entity1} with {entity2}"
  Use Case: Students writing essays or analysts preparing reports can use this prompt to generate comprehensive compare-and-contrast analyses. It could help structure arguments or evaluations in an organized manner.

Thesaurus Substitute:
Tokenized Prompt: "Provide synonyms for the following word: {word}"
Use Case: For any writer looking to diversify vocabulary in their text, this prompt can offer alternate word choices to replace repetitive or simplistic terms.

Generate Conclusion:
Tokenized Prompt: "Based on the following arguments, generate a conclusion: {arguments_list}"
Use Case: Academic writers or report writers who have outlined their primary points can use this to generate a compelling conclusion that ties all arguments together.

Elaborate Idea:
Tokenized Prompt: "Elaborate on the following idea: {idea}"
Use Case: Writers who have a basic concept or notion can use this prompt to flesh out more details, perspectives, or examples to better express and expand upon their initial thought.

Suggest Next Steps:
Tokenized Prompt: "What are the next steps after {action}?"
Use Case: Helpful in both project planning and narrative construction, this prompt can guide the writer through logical sequels or action points.

Some particular, non-limiting examples of use cases for tokenized prompts having multiple tokens include:

Context-Aware Style Suggestions:
Multi-Token Prompt: "Based on {genre} and {audience}, suggest an appropriate writing style."
Use Case: Writers who are creating a story that spans multiple genres or addresses multiple audiences may need nuanced advice on how to modulate their style. For example, a young adult sci-fi novel would have a different tone than an academic sci-fi analysis.

Dialog Consistency Check:
Multi-Token Prompt: "Check if character {character_name} in scene {scene_number} maintains a consistent tone and language."
Use Case: Consistency is key in storytelling. This prompt can help ensure that a character's dialogue remains consistent across different scenes, aiding in character development and narrative coherence.

Revision Helper:
Multi-Token Prompt: "Revise this {paragraph/sentence} to match a {formal/informal} tone, limit to {word_count} words, and incorporate {keyword}."
Use Case: This prompt can be a lifesaver during revisions, helping writers efficiently refine their text based on several constraints.

Structured Brainstorming:
Multi-Token Prompt: "Generate {x} ideas for plot points involving {character_name} in a {setting}."
Use Case: Writers often need to brainstorm multiple elements simultaneously. This prompt could help them generate plot points specifically focused on a character and a setting.

Summary and Expansion:
Multi-Token Prompt: "If the paragraph is shorter than {min_word_count}, expand it. If it's longer than {max_ word_count}, summarize it."
Use Case: Different writing projects have different length requirements. This prompt helps writers lengthen or condense their work as needed.

Visual Elements Incorporation
Multi-Token Prompt: "Based on {theme} and {mood}, suggest some visual elements to include."
Use Case: Some writers like to incorporate visuals like pictures, graphs, or doodles. This prompt helps them identify what types of visual aids would best suit their work's theme and mood.

Some particular, non-limiting examples of uses of prompts that include conditional statements include:

Genre-Based Style Suggestions:
Conditional Prompt: "If the genre is {genre}, suggest a writing style."
Use Case: This prompt would help writers adapt their language and tone to fit different genres, such as academic, fiction, or journalistic styles.

Audience-Based Language:
Conditional Prompt: "If the audience is {audience type}, adapt the following sentence: {sentence}"
Use Case: Tailoring the language based on the audience (e.g., general public, experts, children) can help make the content more engaging and appropriate.

Length-Based Summary:
Conditional Prompt: "If the paragraph is longer than {word_count}, summarize it."
Use Case: This prompt would automatically trigger a summary for longer paragraphs, aiding in brevity and readability.

Tense Correction:
Conditional Prompt: "If the tense in the sentence is {tense}, correct it to {desired_tense}."
Use Case: Useful for writers who need to maintain consistent tense throughout their document, especially academic or formal writing.

Emotional Tone Suggestions:
Conditional Prompt: "If the tone is {current_tone}, suggest a way to make it {desired_tone}."
Use Case: This can be especially useful for writers who need to adapt the emotional tone of their message, such as switching from a casual tone to a more formal one, or vice versa.

Verbosity Reduction:
Conditional Prompt: "If the sentence has more than {word_count} words, simplify it."
Use Case: For academic or technical writers who may tend to be verbose, this prompt can help simplify sentences to improve readability.

Context-Based Character Actions:
Conditional Prompt: "If the setting is {setting}, suggest an action for the character {character_name}."
Use Case: For fiction writers, this can help in generating context-appropriate actions or dialogues for characters, adding to story depth.

Citation Reminder:
Conditional Prompt: "If a fact or statistic is mentioned, suggest adding a citation."
Use Case: Useful for academic and research writers to ensure that all factual statements are properly cited, maintaining the document's credibility.

Some particular, non-limiting examples of uses of prompts that include loops include the following. Some of these examples leverage the non-deterministic nature of at least some language models, which is expected to result in generating different outputs by applying the same language model multiple times to the same input. Although each example prompt below is phrased as a single, non-looped, statement, it should be assumed that a suitable prompt could be written with a loop syntax (e.g., using a "for" or "do while" construction, including a loop termination criterion) to form a prompt that defines a loop over the example prompt:

Idea Generation Loop:
  Looped Prompt: "Generate a plot idea based on the genre {genre}."
  Use Case: Writers often struggle with coming up with unique and engaging plot ideas. This looped prompt could generate multiple plot ideas within a specific genre, allowing the writer to choose the most compelling one.

Dialogue Refinement Loop:
  Looped Prompt: "Improve this line of dialogue: {dialogue_line}."
  Use Case: Dialogue can make or break a story. A looped prompt that iteratively refines dialogue could help writers achieve more natural and engaging exchanges between characters.

Thesaurus Loop:
  Looped Prompt: "Find synonyms for the word {word}."
  Use Case: When a writer overuses a particular word, it can make the work monotonous. This loop could provide a list of suitable synonyms for a repetitive word, enhancing the writer's vocabulary and the quality of the writing.

Sentence Complexity Loop:
  Looped Prompt: "Rewrite this sentence to make it more complex: {sentence}."
  Use Case: Some writing, such as academic papers, requires a more complex sentence structure. Looping this prompt can take a simple sentence and make it more nuanced, adding depth to the paper.

Feedback Loop:
  Looped Prompt: "Provide constructive feedback on this paragraph: {paragraph}."
  Use Case: Writers need to revise and improve constantly. A loop that provides ongoing feedback can give insights into the strengths and weaknesses of a piece, allowing for iterative improvements.

Some particular, non-limiting examples of uses of chained prompts include:

Research Assistant Chain:
  Chained Prompts:
    "Search for articles related to {topic}."
    "Summarize the top 3 articles."
    "Provide citation formats for these articles in {citation_style}."
  Use Case: This would be highly useful for academic writers or journalists who are required to back their points with credible sources. It automates the process from finding sources to summarizing them and even formatting citations.

Character Development Chain:
  Chained Prompts:
    "Generate a basic character profile for {character name}."
    "Suggest three key moments in the character's backstory."
    "Write a dialogue scene that reveals one of these key moments."
  Use Case: Fiction writers could utilize this chain to create well-rounded characters and integrate them seamlessly into the narrative.

Editing and Refinement Chain:
  Chained Prompts:
    "Identify passive voice in this {paragraph}."
    "Rewrite sentences in active voice."
    "Check for readability and suggest improvements."
  Use Case: Many writers struggle with editing, particularly when it comes to style and readability. This chained prompt sequence could make the editing process more systematic and effective.

Blog Post Creation Chain:
  Chained Prompts:
    "Generate a list of trending topics in {niche}."
    "Suggest 3 blog post titles for one chosen topic."
    "Create an outline for the chosen blog post."
  Use Case: Bloggers or content marketers could use this chain to streamline the initial stages of content creation, from topic selection to outlining.

Screenplay Structuring Chain
  Chained Prompts:
    "Break down the screenplay into three acts."
    "List key scenes for each act."
    "Outline a dialogue sequence for one key scene."
  Use Case: Screenwriters often have to balance complex narratives within the confines of screenplay structure. This chain could guide them through the process, ensuring that key elements are included in each act.

Some particular, non-limiting examples of use cases for scripted prompts include:

Automated Formatting:
  Scenario: A writer is preparing a technical manual with specific formatting requirements.
  Scripting Use: A script could auto-format the document by adjusting headings, inserting table of contents, organizing footnotes, or managing citations, all based on the writer's predefined or selected specifications.

Data Integration & Visualization:
  Scenario: A writer is composing a market research report and wants to integrate live financial data.
  Scripting Use: A script could fetch live market data and integrate it into the document, potentially even producing charts or graphs on the fly.

Content Personalization:
  Scenario: A content creator wants to send personalized emails or newsletters to their subscribers.
  Scripting Use: A script could adjust the content based on subscriber information, personalizing greetings, recommendations, or other content pieces.

Language Translation:
  Scenario: A novelist wants to provide a sample translation of their work for international publishers.
  Scripting Use: With integration to a translation API, a script could auto-translate sections or the entirety of the document to a selected language.

Automated Summary and Metadata Generation:
  Scenario: A researcher is uploading several of their papers to a repository and needs summaries and metadata for each.
  Scripting Use: A script could auto-generate concise summaries, keyword lists, or other metadata based on the content of each paper.

Interactive Elements for Digital Publishing:
  Scenario: A writer is creating an interactive e-book or digital guide.
  Scripting Use: Scripts could embed interactive elements like quizzes, animations, or clickable maps directly within the document.

Document Security:
  Scenario: A business professional is preparing a sensitive report and wants to ensure it's encrypted or watermarked.
  Scripting Use: The app could execute a script that encrypts the document, adds a watermark, or integrates other security measures.
Document Analytics:
  Scenario: A writer wants insights into how readers engage with their digital document.
  Scripting Use: Embedded scripts can track reading time, most engaged sections, or even feedback submissions from readers.
Real-time Collaboration Tools:
  Scenario: Multiple authors are collaborating on a shared document.
  Scripting Use: A script could highlight recent changes, show who is currently viewing or editing the document, or even enable a chat feature within the app.
Grammar & Style Enhancement:
  Scenario: A writer is looking for advanced grammar and style checks beyond the basic ones.
  Scripting Use: Integration with advanced linguistic tools or APIs could provide deeper insights, suggestions, and corrections.
Some particular, non-limiting examples of uses of scripted prompts include:
Character Development Script:
  Scripted Prompt: "If {character_age} is less than 18, suggest 'childhood trauma'. Else, suggest 'adult experiences'."
  Use Case: This script could help writers deepen their character development by providing age-appropriate backstory ideas.
Setting Generation Script:
  Scripted Prompt: "If {genre} is 'fantasy', generate a medieval setting. If {genre} is 'sci-fi', generate a futuristic city."
  Use Case: This can help writers quickly generate settings that are appropriate to their story's genre, saving time on research and brainstorming.
Conflict Resolution Script:
  Scripted Prompt: "If {conflict type} is 'man vs man', suggest a duel. If {conflict type} is 'man vs nature', suggest a natural disaster."
  Use Case: Determining how a conflict resolves in a story can be challenging. This script provides suggestions based on the type of conflict, helping to move the story forward.
Emotional Arc Script:
  Scripted Prompt: "If {character_emotion} starts at 'happy', chart an are that leads to 'sadness', then 'redemption'."
  Use Case: Emotional arcs are crucial for engaging readers. This script could help plan out a character's emotional journey throughout a story.
Editing and Proofreading Script:
  Scripted Prompt: "Scan {text} for common grammar mistakes. If found, suggest corrections."
  Use Case: This can be a final check for writers to ensure their work is grammatically sound before publishing or submission.
The action definition library 106 may or may not be fixed. The system 100 may, for example, enable the user 102 to add, modify, and/or delete action definitions 108a-n within the action definition library 106 in any of a variety of ways.

For example, in the case of simple text prompts, the system 100 may enable the user 102 to add, modify, and delete one or more of the action definitions 108a-n by, for example, using a text editor-style interface to add, modify, and delete the text of such prompts and associated metadata, such as descriptions and short names of such prompts. Once the user 102 has added or modified one of the action definitions 108a-n, such an action definition may be used by the system 100 in any of the ways disclosed herein.

The system 100 may enable the user 102 to add, modify, and delete tokenized prompts within the action definition library 106 in any of the ways disclosed herein in connection with simplified text prompts. In addition, the system 100 may facilitate adding, modifying, and deleting tokens within tokenized prompts in the action definition library 106 in any of a variety of ways, such as in any manner that is known from systems for performing such functions using tokens, e.g., in software Integrated Development Environments (IDEs) and source code editors. Merely as one example, the system 100 may manifest to the user 102 a list of available tokens and enable the user 102 to select any of those tokens for inclusion in the action definition currently being edited by the user 102, in response to which the system 100 may insert the selected token into that action definition, e.g., at the current cursor location/insertion point within that action definition. As another example, the system 100 may provide an auto-complete feature that manifests suggested auto-completions for tokens to the user 102 as the user 102 is editing an action definition, in response to which the user 102 may accept an auto-completion by performing a particular action (e.g., hitting the Tab or Enter key), in response to which the system 100 may insert the accepted token into the action definition at the current cursor location/insertion point within that action definition. As the definition of tokenized prompts implies, the prompt editor may enable the user 102 to insert a token at any position within a prompt, such as immediately before non-tokenized (e.g., plain) text and/or immediately after non-tokenized (e.g., plain) text.

The system 100 may enable the user 102 to add, modify, and delete compound prompts (e.g., chained prompts and/or alternative take prompts) within the action definition library 106 in any of the ways disclosed herein in connection with simplified text prompts and tokenized prompts. In addition, the system 100 may facilitate adding, modifying, and deleting compound prompts in any of a variety of ways. For example, the action definition of a compound prompt may include both the compound prompt's component prompts and metadata/settings that define how the compound prompt will be executed in operation 210, and the system 100 may enable the user 102 to add, modify, and delete both the compound prompt's component prompts and such metadata/settings. Some examples of user interface elements that the system 100 may implement to facilitate editing of compound prompts include the following:
  Visual Flow Diagrams: The system 100 may use flow diagrams or visual nodes to represent the compound prompt structure. Chained prompts may be visualized as linked nodes in a linear manner, while alternative take prompts may branch out from a common node.
  Toggle Modes: When creating or editing a compound prompt, the system 100 may enable the user 102 to toggle between "Chaining Mode" and "Alternative Take Mode," which will adjust the UI to guide the user 102 in setting up the compound prompt's component prompts according to the user's preferred execution style.

Drag and Drop Interactivity: The system 100 may enable the user 102 to craft compound prompts by dragging individual component prompts into a workspace. Depending on the arrangement or connectors used, the system 100 may recognize the desired execution style.

Descriptive Tooltips: Hovering over a compound prompt in the action definition library 106 may cause the system 100 to show tooltips or brief descriptions of the compound prompt's behavior, making it clear to the user 102 whether the prompt is set up for chaining, alternative takes, or both.

The system 100 may enable the user 102 to add, modify, and delete scripted prompts within the action definition library 106 in any of the ways disclosed herein in connection with simple text prompts, tokenized prompts, and compound prompts. In addition, the system 100 may facilitate adding, modifying, and deleting scripted prompts in any of a variety of ways. For example, the system 100 may provide the user 102 with a script editor having any of the features of a conventional script editor, source code editor, and/or IDE, in combination with any of the features disclosed above in connection with simplified text prompts, tokenized prompts, and compound prompts, to add, modify, and delete action definitions 108*a-n* in the action definition library 106.

Such scripts may be written using an existing scripting language, using a custom-designed scripting language, or any combination thereof. Non-limiting examples of such languages include JavaScript, Python, Ruby, Lua, TypeScript, Bash, Perl, and PowerShell. The term "scripting language" is used broadly herein to include both languages that are commonly referred to as "scripting languages" and languages that are commonly referred to as "programming languages." Such a scripting language may, for example, include the use of variables and other data structures, function definitions and function calls, conditional statements, loops, and any other constructs known within scripting languages.

The system 100 may enable the user 102 to utilize the prompt editor feature to add, edit, or delete action definitions at any time relative to the performance of other actions disclosed herein. This flexibility enables a dynamic and iterative process of creating, applying, and refining action definitions.

For example, the user 102 may use the prompt editor to create a new action definition and then, at a later time, apply the created action definition to selected text using the techniques disclosed herein. Subsequently, the user 102 may return to the prompt editor to revise the previously created action definition. At a later time, the user 102 may apply this revised action definition to other selected text within the same document or a different document.

The user 102 is not limited to applying only the action definitions they have personally created or edited. The user 102 may select and apply any action definition available in the action definition library 106 to selected text, regardless of whether the user 102 created that particular action definition.

Furthermore, the system 100 may enable the user 102 to manually edit the text of the selected document 114 at any time, providing complete flexibility in the document creation and revision process. For example, the user 102 may manually edit the text of the selected document 114 before creating or editing an action definition, after creating or editing an action definition, before applying an action definition to the selected text 116, and/or after applying an action definition to the selected text 116. This flexibility allows the user 102 to seamlessly integrate manual editing with the automated assistance provided by the action definitions 108*a-n*, creating a highly customizable and efficient document revision process.

Although not shown in FIG. 1, the system 100 may store and use any of a variety of settings that may be used within the system 100 and method 200. Furthermore, system 100 may manifest any such settings to the user 102 via the user interface 104 and enable the user 102 to modify any such settings by providing input to the system 100 via the user interface 104, in response to which the system 100 may modify the settings as indicated by the user 102. Some examples of such settings include:

Language model Parameters Configuration: The user 102 may modify settings related to one or more language models used by the system 100. This may include, for example, settings such as the language model's response length, temperature (which affects the randomness of the model's responses), and other parameters that influence the behavior and output of the language model.

Chat Context Selection: The user 102 may have the option to determine how context is managed during interactions with the language model, such as:
　No History: Every prompt is executed without any prior chat history. This ensures each interaction is standalone and not influenced by prior inputs.
　Ongoing History: An ongoing chat context is maintained. This means that consecutive prompt executions can be influenced by previous interactions, allowing for more context-aware responses from the language model.

Prompt Contextualization: The user 102 may configure how prompts are enriched with context during execution:
　Prompt & Selected Text: The language model executes prompts based solely on the content of the prompt itself and any text selected by the user.
　Additional Context: Users may add further context to prompts, either by incorporating more portions of the document or by including text from other sources. This may include, for example, any one or more of the following:
　　Manually provided context by the user.
　　Context from external data 128, such as one or more databases, files, or web resources.

Some embodiments of the present invention include features related to "track changes" and commenting features found in word processors and text editors. Such features are collectively referred to herein as the "generative track changes" feature, merely for ease of reference and without limitation. In general, by applying one or more of the system 100's action definitions, text generation, and context-aware processing to tracked changes and comments, the track changes feature transforms the typically passive and cumbersome revision process into an intelligent, automated workflow. For example, the system 100 may analyze comment threads, suggest and implement improvements to tracked changes, and/or provide automated explanations of modifications while maintaining document coherence and quality. This approach significantly reduces the cognitive burden on users while preserving their control over the revision process, enabling more efficient and effective document collaboration.

The system 100 may enable automated analysis and implementation of comment threads. For example, when processing one or more comments within a document, the action processor 112 may identify one or more applicable action definitions based on the comment content and context. The text generation module 120 may then apply the identified action definition(s) to generate one or more specific revision suggestions that address the intent of the comments while maintaining document coherence.

For example, the system 100 may analyze a comment thread within a document to identify one or more appropriate revisions for implementing the comment(s) in the comment thread. For example, when processing a comment thread containing one or more comments from one or more users, the action processor 112 may provide a specialized prompt to a language model to identify specific revisions that should be made. For example, the prompt may instruct the language model to analyze the comment thread and identify one or more appropriate modifications to the associated document content.

Based on the output of the language model, the system 100 may identify one or more applicable action definitions from the action definition library 106 that may be used to implement the identified revision(s). The text generation module 120 may then apply the identified action definition(s) to the document text associated with the comment thread using any of the processing techniques disclosed herein.

For each comment or comment thread, the system 100 may analyze the surrounding document context to identify (e.g., generate) one or more appropriate transformations. This context-aware processing ensures that generated revisions integrate seamlessly with existing content while preserving document structure and formatting. The system 100 may process multiple document elements simultaneously, enabling efficient handling of complex comment threads that span different sections.

The system 100 may support both automated and interactive refinement paths, enabling users to review generated changes before implementation. Through real-time preview capabilities and/or side-by-side comparisons, users can evaluate potential improvements and make informed decisions about content updates. When a user approves a suggestion, the document update module 124 may implement the refined change(s) while preserving document coherence and quality. This approach combines the efficiency of automated content generation with the control of manual oversight.

The system 100 may leverage any of the external data 128 to enhance comment analysis and revision generation. Using a distributed processing architecture, computationally intensive operations may be performed on dedicated servers while maintaining responsive performance. The state-based revision management approach enables efficient tracking of suggested changes while preserving the original document content.

The system 100 may provide capabilities for refining tracked changes through its text generation and processing architecture. When processing tracked changes within a document, the text generation module 120 may apply a selected action definition to improve the integration and quality of modifications. This may enable complex transformations while preserving document structure, formatting, and overall coherence.

The action processor 112 may support multi-stage refinement of tracked changes through sequential processing steps. Initial transformations may be further enhanced through subsequent action definitions, enabling compound improvements that build upon previous refinements. This sequential approach allows for sophisticated content transformations while maintaining precise control over document updates.

The system 100 may enable automated generation of explanations for tracked changes through its text generation capabilities. For example, the text generation module 120 may apply selected action definitions to analyze modifications and generate clear explanations that provide context for the changes. This automated documentation helps users understand the rationale and impact of tracked changes while maintaining document coherence.

When processing tracked changes, the system 100 may consider document-wide context and relationships between different content elements. The action processor 112 may analyze both the modified content and surrounding document context (e.g., one or more surrounding words, paragraphs, and/or sections) to generate contextually appropriate explanations. This context-aware processing ensures that generated explanations accurately reflect how changes integrate with and affect the broader document.

The system 100 may support flexible explanation generation through both automated and interactive workflows. For example, the system 100 may enable the user 102 to review generated explanations and request refinements through the user interface 104. Through state-based revision management, the system 100 may maintain clear relationships between tracked changes and their corresponding explanations.

Embodiments of the present invention have a variety of advantages, such as the following.

In the traditional writing process, every thought is developed and every word is written manually by the writer. This process, while deeply personal, can be slow and often lead to writer's block. Embodiments of the present invention preserve the essence and benefits of manual writing while bypassing the occasional blockades. Embodiments of the present invention use the action definition library 106 (e.g., language model prompts) for brainstorming, refining, and elaborating on the writer's text without replacing the human touch.

Although certain AI-based writing tools exist, such as those that use LLMs to draft entire documents, the resultant piece may not fully capture the writer's voice or intent. Post-creation, the writer often must manually revise word-by-word, which can be cumbersome. In contrast, instead of a one-size-fits-all approach, embodiments of the present invention enable the writer to seamlessly blend his or her own words with AI-generated content. The writer is empowered to decide where to obtain assistance from the system 100 and to what extent, ensuring the final piece resonates with the writer's unique voice.

Although chatbot-based AI tools, such as ChatGPT, may be used to assist writers in generating written works, such tools are useful primarily for creating an entire draft of such works. If the writer then wants to revise a chatbot-generated work, the writer must either revise the entire work manually, or request that the chatbot generate an entire new draft of the work. Chatbots do not, in other words, facilitate editing of works. In contrast, embodiments of the present invention provide writers with granular control over the revision process, enabling them to modify specific sections without overhauling the entire piece, allowing for efficient iterations that take maximum advantage of language models and other computer automation, while preserving the core of the writer's content. In this way, embodiments of the present invention combine the best of computer-automated writing with manual human writing.

Although some LLM-based writing apps, such as Jasper, provide limited features that enable writers to leverage LLMs to revise a draft document, such apps are limited to providing a fixed set of opaque revision commands, such as "summarize," "shorten," "lengthen," and "rephrase." Such apps do not enable the user to see how such commands operate, to modify those commands, or to add commands of their own. In contrast, embodiments of the present invention enable users to customize prompts to reflect the writer's own writing preferences and style.

In short, embodiments of the present invention do not dictate the writer's writing process. Instead, they collaborate with the writer, enabling the writer to write, refine, expand, and restructure documents using whatever mixture of human writing and computer-automated writing and revising the writer prefers, including computer-automated writing and revising defined by the writer.

Although the advantages mentioned above focus primarily on the benefits to the writer, embodiments of the present invention also include a variety of technical innovations that have a variety of technical benefits. For example, embodiments of the present invention are able to merge user-selected text (e.g., the selected text 116) with pre-defined action definitions 108*a-n* (e.g., prompts), which represents a particular way of implementing prompt optimization that represents a technical advancement over existing techniques for generating prompts that do not incorporate user-selected text. Furthermore, by enabling the user 102 to create and modify action definitions (e.g., prompts) in the action definition library 106, to store those action definitions for future use, and to select those stored action definitions for use in connection with the user-selected text 116, embodiments of the present invention enable the generated text 122 to be generated more efficiently than existing solutions that do not enable pre-stored components of a prompt to be selected (e.g., without typing them manually) and then combined with user-selected text (e.g., without requiring such text to be typed manually).

The ability of embodiments of the present invention to enable the user 102 to select multiple non-contiguous selections of text within the selected document 114 provides a variety of advantages. For example, embodiments of the present invention may apply a multi-token prompt to such multi-selections to generate a combined prompt that is based on some or all of the multiple selections. This enables embodiments of the present invention to generate prompts and to perform operations, e.g., using language models (e.g., LLMs), that would either not be possible using existing systems, or that could not be performed as efficiently using existing systems. For example, by enabling multiple non-contiguous text selections to be used to generate the generated text 122 (e.g., by generating a single prompt that incorporates all of the multiple non-contiguous text selections), embodiments of the present invention allow for more intricate interactions with a language model than existing systems by facilitating compound queries or task to be performed using the multiple non-contiguous text selections, such as comparing, contrasting, or merging the multiple non-contiguous text selections and/or concepts represented by those multiple non-contiguous text selections. In contrast, systems that are limited to using contiguous text selections are limited to performing simpler operations on the selected text only, such as rephrasing, summarizing, or expanding the selected text.

As another example, by enabling the user 102 to select multiple non-contiguous text blocks, the system 100 enables richer context to be provided to a language model, thereby enabling the language model to generate more informed and nuanced outputs. In contrast, operations performed on single contiguous text selections tend to lack such broader context, thereby leading to outputs that may not fully capture the intended essence.

As yet another example, by enabling the user 102 to select multiple non-contiguous text blocks, the system 100 may execute complex tasks in a single step (e.g., by providing a single prompt to a language model to generate a single output), rather than performing multiple steps (e.g., by sequentially providing multiple prompts to the language model to generate multiple outputs). As a result, embodiments of the present invention provide an increase in processing efficiency compared to systems that can only be applied to single contiguous text selections.

The ability of embodiments of the present invention to generate, store, modify, and execute compound prompts (e.g., chained prompts and/or alternative take prompts) provides a variety of advantages. For example, the ability to execute compound prompts (e.g., to provide a compound prompt as an input to a language model to generate the generated text 122) enables the system 100 to perform multi-stage content processing. For instance, using a chained prompt, the system 100 may first simplify a complex paragraph (using Component Prompt A in a chained prompt) and then summarize the simplified version (with Component Prompt B in the chained prompt), thereby ensuring the essence is captured in a concise manner. Because the system 100 may execute both component prompts of the chained prompted automatically in sequence, the system 100 enables such sequential processing to be performed more efficiently and effectively than systems that require the user 102 to manually instruct such systems to execute each such component prompt manually.

The ability to apply multiple component prompts within an alternative take compound prompt to generate alternative outputs from the same text selection provides a variety of benefits. For writers, this ability may assist in content brainstorming, assisting in decision-making about plot development, evaluation of multiple hypotheses, and crafting a message for multiple audiences. This feature also provides technical benefits, such as providing the ability to generate a larger amount of text based on the same input as conventional systems that lack the ability to process alternative take prompts automatically.

Yet another technical feature of embodiments of the present invention is that it may be implemented using an event-based design that can perform any of a variety of functions disclosed herein at any time, particularly in response to input received from the user 102 via the user interface 104 at any time. For example, the user 102 may provide first input via the user interface 104 (e.g., input which selects a first instance of the selected action definition 118 and a first instance of the selected text 116), in response to which the action processor 112 may execute a first instance of the method 200 to generate a first instance of the generated text 122. At any subsequent time, the user 102 may provide second input via the user interface 104 (e.g., input which selects a second instance of the selected action definition 118 and a second instance of the selected text 116), in response to which the action processor 112 may execute a second instance of the method 200 to generate a second instance of the generated text 122. Even within such scenarios, the system 100 may receive individual inputs from the user 102, such as inputs selecting the first instance of the selected action definition 118 and the first instance of the selected text 116, at any time, and take action in response to such inputs whenever they are received.

Such event-based processing may be implemented, for example, using object-oriented programming (OOP) techniques in connection with a GUI. As is well-known, the rise of GUIs in the history of software development represented a significant shift in software design paradigms. Earlier software, designed for terminal-style interfaces, operated in a more linear fashion, waiting for a single text-based input from the user. However, the advent of GUIs introduced a far more interactive and dynamic user experience, where multiple types of inputs could be triggered at any time. Event-based OOP emerged as an effective way to design software that could respond flexibly to these multi-faceted, asynchronous user inputs.

Today's chatbot-based writing tools, and writing tools which first receive input from a user and then produce a draft based on the user's input, have the limitations of the terminal-style interfaces of previous generations of software. In contrast, embodiments of the present invention may replace such limitations with the benefits of software that uses an OOP-based GUI, and apply such benefits to the context and generating and editing text. In particular, embodiments of the present invention may respond flexibly to multi-faceted, asynchronous inputs from the user 102.

For example, in an event-based OOP design, and in embodiments of the present invention, actions such as selecting text or choosing a prompt may be treated as events. When these events occur, specific event handlers may be triggered to execute corresponding actions, such as invoking a language model to apply a prompt. This architecture allows for real-time, dynamic interaction between the user 102 and the system 100. Given that the writing process preferred by most human writers is not linear, an event-based design allows the user 102 to make asynchronous revisions to the selected document 114. This enables the user 102 to be free to edit any part of the selected document 114 at any time, in any order, according to their creative flow.

As the above explanation illustrates, embodiments of the present invention differ from existing software applications for providing writing assistance by facilitating the process of revising the selected document 114 based on both human input and computer-generated output, rather than focusing only on the process of generating an initial draft of the selected document 114 automatically. In particular, by enabling the user 102 to apply user-definable action definitions (e.g., prompts) to user-selectable text within the selected document 114, while also enabling the user 102 to manually edit the selected document 114, and to flexibly intersperse such automatic user-configurable revisions with manual edits, embodiments of the present invention provide the user 102 with a combination of the power of computer-automated text generation and revision with the control of manual user text generation and revision, all where and when specified by the user 102, at any level of granularity within the selected document 114.

For example, consider a sequence of events in which:
the user 102 manually writes an initial draft of the selected document 114;
the user 102 then selects a first sentence within the selected document 114 as a first instance of the selected text 116 and applies a first one of the action definitions 108a-n to the first sentence to generate a first instance of the generated text 122, in response to which the document update module 124 replaces the first sentence with the first instance of the generated text 122 in the selected document 114;
the user 102 then manually adds a new paragraph to the selected document 114;
the user 102 then selects a second sentence within the selected document 114 (e.g., within the manually-added new paragraph) as a second instance of the selected text 116 and applies a second one of the action definitions 108a-n to the second sentence to generate a second instance of the generated text 122, in response to which the document update module 124 replaces the second sentence with the second instance of the generated text 122 in the selected document 114; and
the user 102 then manually revises the second instance of the generated text 122 in the selected document 114.

As the above example illustrates, the user 102 may use embodiments of the system 100 to flexibly add and revise text manually in the selected document 114 and to apply selected (and user-configurable) action definitions from the action definition library 106 to arbitrarily-selected text within the selected document 114, in any sequence and combination, including interspersing manual additions/revisions to the selected document 114 with automatic additions/revisions to the selected document 114 in any combination. This enables the user 102 to take maximum advantage of the benefits of the action processor 112's ability to generate and revise text automatically within the selected document 114, without sacrificing any ability to manually add to and revise text within the selected document 114, and without limiting the use of the action processor 112 merely to generating entire new drafts of the selected document 114 or to performing predefined and non-user-configurable actions on selected text within the selected document 114.

Most efforts on improving the ability of language models, especially LLMs, to assist in the writing process, both in academia and in commercial products, focus on achieving improvements in prompt engineering for the purpose of developing individual prompts that are better able to generate an entire draft of a document. The premise of such efforts is that the goal is to achieve a single prompt that can be used to assist a writer in producing an entire draft of a document. Such efforts fail to recognize both that many writers, especially professional writers of long-form content, prefer or require a writing process that includes making multiple revisions of the document being written, not a single draft produced from whole cloth. Furthermore, it is not even known whether it will be possible to produce written documents that are desired and needed by both writers and audiences solely through improvements in prompt engineering. What is known is that, based on the current state of the art in prompt engineering, the best output currently generated using individual prompts often lack depth, context, and the nuance required in advanced or professional writing tasks, especially when long-form content is needed. Furthermore, the content produced using the current best prompts lack the writer's unique voice, which can only be achieved by the writer manually editing the output generating using such prompts.

Furthermore, writers, especially those engaged in long-term projects like novels and screenplays, often do not have a fully formed set of their own goals at the outset. This makes it impossible to encapsulate all of the writer's requirements in a single prompt. The writing process itself is iterative and the writer's goals may change or become clearer as the draft progresses. A writer may only recognize what needs to be revised or what their true goals are after writing or seeing a draft. A single prompt approach does not offer the flexibility to adapt to these post-draft realizations, making a solely prompt-driven writing process too rigid for the needs of the professional or otherwise sophisticated writer. For this and other reasons, professional writers value and require the ability to revise small portions of their work, making a tool that offers nuanced editing features more aligned with their needs. This contrasts sharply with a model where all the goals have to be stated up front.

Figure 3:
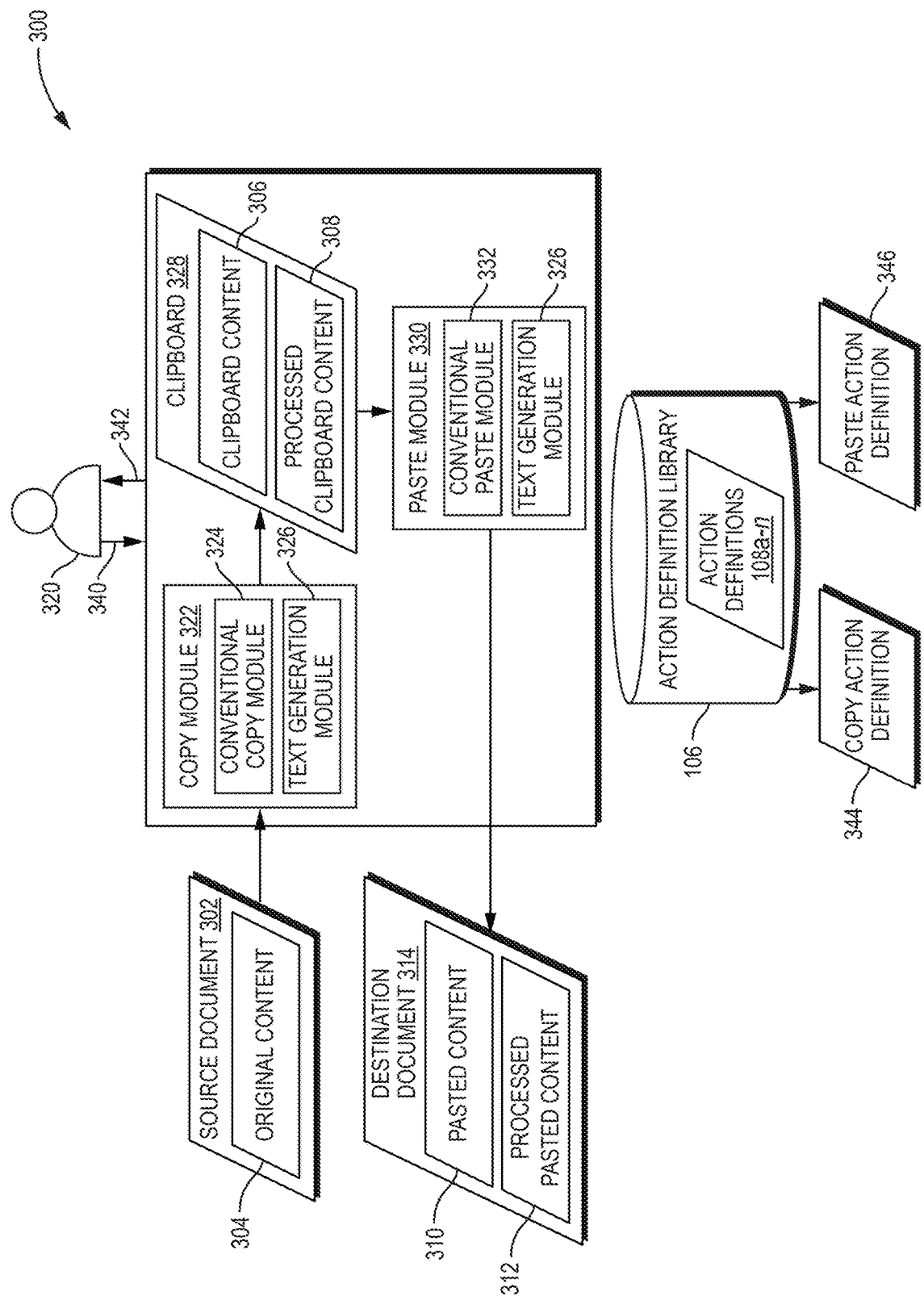
FIG. 3 is a dataflow diagram of a system for implementing a generative cut and paste feature according to one embodiment of the present invention.
Figure 4:
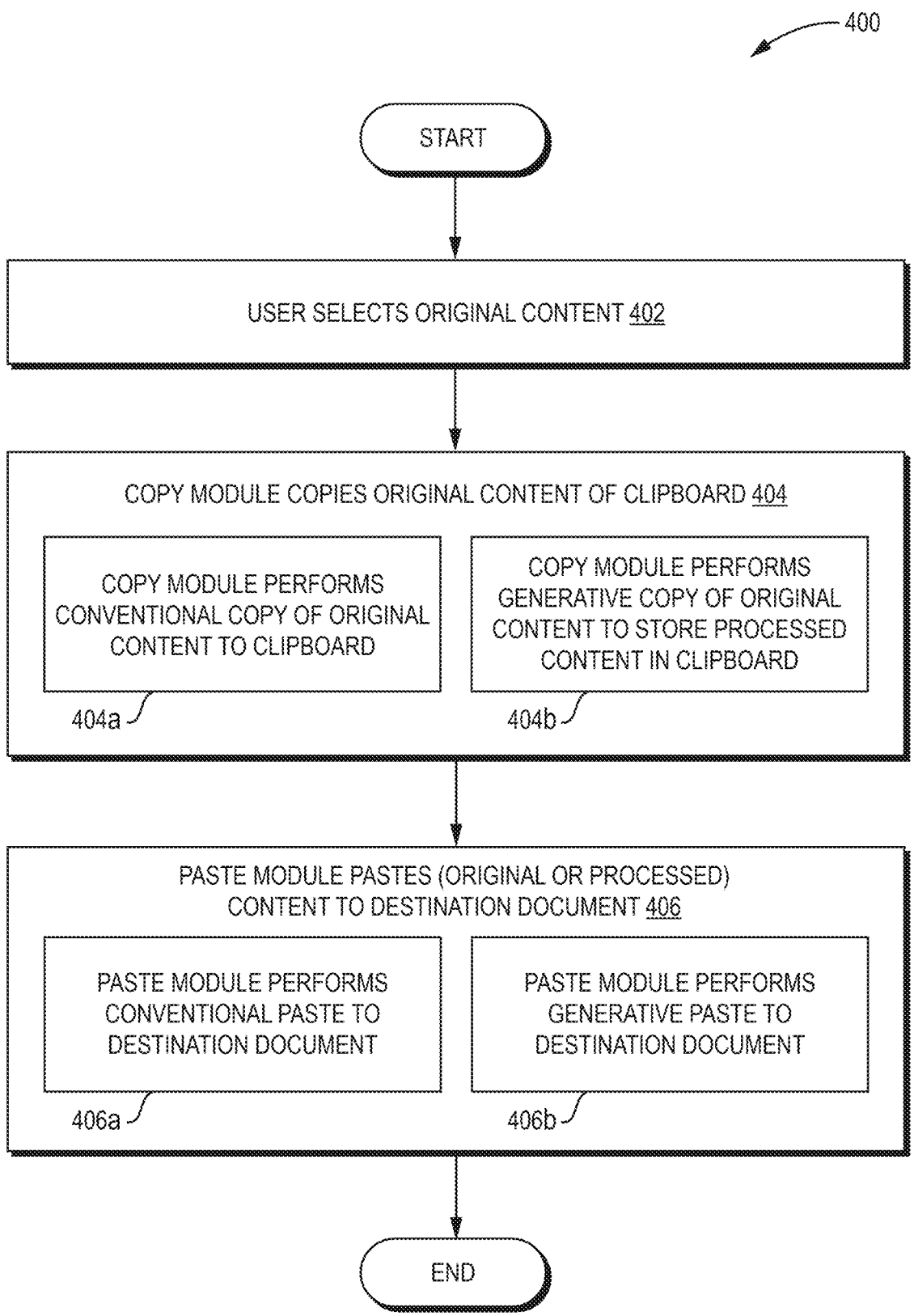
FIG. 4 is a flowchart of a method performed by the system of FIG. 3 according to one embodiment of the present invention.

In addition to the document revision capabilities described above, embodiments of the present invention also include a novel "generative cut and paste" feature. This feature extends the power of generative AI to standard clipboard operations, further enhancing the writing and editing process. Referring to FIG. 3, a dataflow diagram is shown of a system 300 for implementing the generative cut and paste feature according to one embodiment of the present invention. Referring to FIG. 4, a flowchart is shown of a method 400 performed by the system 300 of FIG. 3 according to one embodiment of the present invention. The system 300 and method 400 may, for example, be used in connection with the system 100 of FIG. 1 and the method 200 of FIG. 2 to extend the capabilities of that system 100 and method 200 to include generative AI processing during clipboard operations, further enhancing the writing and editing process.

The generative cut and paste feature may operate in either of both of two primary modes:

Generative Copy: When content (e.g., text) is copied from a document or any other source, the system 300 applies generative AI to the copied content, producing processed copied content. This processed content is then stored in the clipboard, either replacing or supplementing the original copied content.

Generative Paste: When content is pasted from the clipboard (whether that content is original content or previously processed content), the system 300 applies generative AI to the pasted content, producing processed pasted content. This processed content is then inserted into the target document, either replacing or supplementing the original clipboard content.

The generative cut and paste feature may leverage the same action definition framework described earlier herein. Any action definition, such as simple text prompts, tokenized prompts, alternative take prompts, chained prompts, and/or scripted prompts, may be applied to process copied or pasted content. This integration allows for a seamless extension of the system 100's capabilities to copy and paste operations, enabling a wide range of content transformations and enhancements during these common document editing tasks.

For the purposes of the disclosure herein, the term "copying" is used to encompass both the actions of copying and cutting content. Copying refers to the process of duplicating selected content and storing it in the clipboard without removing it from its original location. Cutting, on the other hand, involves removing the selected content from its original location and storing it in the clipboard. To streamline the description and avoid repetition, whenever "copying" is mentioned in the context of the generative cut and paste feature, it should be understood to encompass copying and/or cutting operations. This convention allows for a more concise explanation of the feature while covering both content duplication methods.

The system 300 for implementing the generative cut and paste feature comprises several elements that represent the content at various stages of the process:

Source Document 302: The document or source from which content is initially copied.

Original Content 304: The specific content that is copied from the source document 302.

Clipboard Content 306: The content as it is stored in the clipboard before any processing using an action definition occurs.

Processed Clipboard Content 308: The content after it has undergone processing by an action definition and is stored in the clipboard.

Pasted Content 310: The content after it has been pasted from the clipboard but before any action definition processing has been applied.

Processed Pasted Content 312: The content after it has been pasted from the clipboard and subsequently processed using an action definition.

Destination Document 314: The document or location where the pasted content is ultimately inserted.

While the terms "source document" and "destination document" are used throughout this description, it should be understood that these terms are not limited to traditional document formats. The term "source document" 302 is used broadly to refer to any source of original content 304, including but not limited to documents, text fields in graphical user interfaces (GUIs), web pages, databases, or any other medium from which content can be copied or extracted. Similarly, the term "destination document" 314 is used broadly to encompass any destination for pasted content 310 or processed pasted content 312, including but not limited to documents, text fields in GUIs, web applications, databases, or any other medium that can receive inserted or pasted content.

While the system 300 and method 400 may be described herein as applying generative AI to the original content 304 to produce the processed clipboard content 308, and to applying generative AI to the clipboard content 306 or processed clipboard content 308 to produce the processed pasted content 312, it should be understood that embodiments of the invention are not limited to using only generative AI for content processing. More generally, embodiments of the invention may apply any kind of action definition disclosed herein to the original content 304, clipboard content 306, or processed clipboard content 308, whether or not such action definition makes use of generative AI. For example, the system 300 may apply a scripted prompt action definition to apply formatting rules and/or data transformations to the clipboard content 306 using techniques other than, or in addition to, generative AI when generating the processed pasted content 312. As a result, any use of the term "generative" in connection with the system 300 and method 400 should be understood not to be limited to the use of generative AI or to the use of "generative" technologies, but may more generally encompass any technology or technologies that are capable of performing the functions disclosed herein, whether or not such technologies are "generative."

For ease of explanation, certain types of processing may be described as being applied to the original content 304 in a copy operation to produce the processed clipboard content 308. However, it should be understood that any such operation may be equally applicable by embodiments of the invention to the clipboard content 306 and/or the processed clipboard content 308 to produce the processed pasted content 312.

Similarly, any types of processing disclosed herein as being applied to the clipboard content 306 or the processed clipboard content 308 to produce the processed pasted content 312 may be applied by embodiments of the invention to the original content 304 to produce the processed clipboard content 308.

In some embodiments, the system 300 may copy the original content 304 and apply any kind of action definition disclosed herein to the original content 304 to produce the processed clipboard content 308. After this processing, a conventional paste operation may be applied to the processed clipboard content 308 to paste it directly to the destination document 314 without applying any further action definitions of the types disclosed herein to the processed clipboard content 308.

Alternatively, in other embodiments, the system 300 may copy the original content 304 using a conventional copy operation to produce the clipboard content 306 without applying an action definition of the types disclosed herein to the original content 304. Subsequently, as part of a paste operation, the system 300 may apply an action definition of any of the kinds disclosed herein to the clipboard content 306 to produce the processed pasted content 312.

In yet other embodiments, the system 300 may apply a first action definition to the original content 304 to produce the processed clipboard content 308, after which the system 300 may apply a second action definition (which may be the same as or different from the first action definition) to the processed clipboard content 308 to produce the processed pasted content 312.

This approach allows for multiple stages of content processing, potentially applying different types of action definitions at each stage. For example, the system 300 might first apply a summarization action definition to the original content 304 to create a concise version as the processed clipboard content 308. Then, during the paste operation, the system 300 may apply a style transformation action definition to the processed clipboard content 308 to generate the processed pasted content 312 in a specific tone or format.

The elements and operation of the system 300 and method 400 will now be described in more detail. The system 300 includes a user 320. The previous explanation of the user 102 in the system 100 of FIG. 1 is equally applicable to the user 320 in the system 300 of FIG. 3. For example, the user 320 may be a human user, a software program, a device (e.g., a computer), or any combination thereof. Although only a single user 320 is shown in FIG. 3, the system 300 may include any number of users, each of whom may perform any of the functions disclosed herein in connection with the user 320. For example, the functions disclosed herein in connection with the user 320 may be performed by multiple users, such as in the case in which one user performs some of the functions disclosed herein in connection with the user 320 and another user performs other functions disclosed herein in connection with the user 320.

The system 300 may also include the source document 302, which may include a variety of content, including the original content 304. As this implies, the source document 302 may include content in addition to the original content 304, which also implies that the original content 304 may be less than all of the content in the source document 302.

Although the original content 304 is shown as a distinct element in FIG. 3, as is well-known in the context of copy and paste functions, the original content 304 may only be designated as the original content 304 in response to input from the user 320 selecting the original content 304 within the source document 302 or otherwise providing input indicating that the original content 304 is to be copied.

Furthermore, although only a single instance of the original content 304 is shown in FIG. 3 for ease of illustration, the techniques disclosed herein may be applied to multiple instances of the original content 304 within the source document 302, which may be distinct from each other or overlap in any way. For example, the user 320 may select a first instance of the original content 304 and the system 300 may perform any of the functions disclosed herein in connection with that first instance of the original content 304. At a later time, the user 320 may select a second instance of the original content 304, which may be the same as or differ from the first instance of the original content 304 in any way, and the system 300 may perform any of the functions disclosed herein in connection with the second instance of the original content 304. As one example, the system 300 may apply a first action definition to the first instance of the original content 304 and apply a second action definition, which may be the same as or differ from the first action definition, to the second instance of the original content.

For ease of illustration, various inputs from the user 320 to the system 300 are shown in FIG. 3 as inputs 340, and various outputs from the system 300 to the user 320 are shown in FIG. 3 as outputs 342, rather than illustrating distinct types of user inputs and outputs separately in FIG. 3. In practice, the inputs 340 and outputs 342 may represent a variety of different types of inputs and outputs, respectively, examples of which will be described below.

In practice, embodiments of the system 300 and method 400 may implement some or all components and steps described herein directly. This approach allows for full control over the implementation and enables customization of all aspects of the generative cut and paste feature.

Alternatively or additionally, embodiments of the system 300 and method 400 may implement some of the components and steps described herein using pre-existing components, such as those available in the cut-and-paste library of a conventional operating system. This hybrid approach can leverage existing, well-tested functionality for standard operations while implementing novel features disclosed herein on top of this foundation.

In particular, any operations described herein as including conventional cut-and-paste operations may be implemented using pre-existing components, such as those available in a conventional operating system. For example, the initial copying of the original content 304 to create the clipboard content 306, or the final pasting of processed content into the destination document 314, may utilize standard operating system functions.

Meanwhile, the innovative operations disclosed herein, such as those involving generative AI or the application of custom action definitions, may be implemented using embodiments of the present invention. This could include the text generation module 326 and its interactions with the action definition library 106 and language model.

This flexible approach to implementation enables the invention to be adapted to a wide variety of environments and use cases. For instance:

In a standalone application, all components might be custom-implemented to provide maximum control and optimization.

In a plugin or extension for existing word processing software, the system might use the host application's clipboard functions while implementing custom logic for content processing.

In a cloud-based service, conventional copy and paste operations might occur on the client side, with generative processing happening server-side.

In a mobile app, the system might use the device's native clipboard API while implementing custom UI and processing logic.

By allowing for this flexibility in implementation, embodiments of the invention may be more easily integrated into various software ecosystems, potentially increasing its adoption and utility across different platforms and user environments. Furthermore, this approach allows for incremental adoption of the technology. Organizations or individual users may start by implementing the core generative features while relying on existing cut-and-paste functionality, then gradually replace or enhance more components as needed.

The innovative aspects of embodiments of the present invention may interact seamlessly with conventional cut-and-paste features in an operating system through a layered approach. For example, the system 300 and method 400 may leverage existing operating system APIs for basic clipboard operations while implementing custom logic for generative processing.

Communication between the operating system and the system 300 may occur through any of a variety of mechanisms, such as any one or more of the following:

Clipboard API: The system 300 may use standard operating system clipboard APIs to access and modify clipboard content. This allows the system 300 to intercept conventional copy and paste operations.

Event Listeners: The system 300 may register event listeners with the operating system to detect copy and paste actions, enabling it to trigger generative processing at appropriate times.

Custom Clipboard Format: The system 300 may define a custom clipboard format to store additional metadata about processed content, allowing for seamless integration with both conventional and generative clipboard operations.

Inter-Process Communication (IPC): For implementations where the generative processing occurs in a separate process or service, IPC mechanisms provided by the operating system may be used to communicate between the conventional clipboard and the generative components of the system 300.

System Hooks: On some operating systems, the system 300 may use system-level hooks to intercept and modify clipboard operations at a low level, providing deep integration with existing cut-and-paste functionality.

By utilizing these communication mechanisms, the system 300 may enhance conventional cut-and-paste operations with generative AI capabilities while maintaining compatibility with existing applications and user workflows.

Referring now to FIG. 4, in operation 402, the user 320 selects the original content 304 within the source document 302. Operation 402 serves as the initial step in the generative cut and paste process, allowing the user 320 to designate specific content within the source document 302 for further processing and manipulation. This operation defines the scope of content that will be subject to subsequent generative AI operations and potential transformations.

The implementation of operation 402 may vary depending on factors such as the specific environment and user interface of the system 300. Some ways in which operation 402 may be implemented include:

Mouse selection: The user 320 may use a pointing device to click and drag across the desired text or content within the source document 302, visually highlighting the selected original content 304.

Keyboard shortcuts: The user 320 may employ keyboard commands, such as Ctrl+A to select all content or Shift+Arrow keys to select specific portions of text.

Touch gestures: On touch-enabled devices, the user 320 may use finger taps, long presses, or swipe gestures to select the original content 304.

Voice commands: In systems with voice recognition capabilities, the user 320 may issue verbal instructions to select specific content or sections of the source document 302.

Programmatic selection: In automated scenarios (e.g., in which the user 320 is not human), the original content 304 may be selected through API calls or scripted commands, without direct user intervention.

Regardless of the specific implementation, the system 300 may, in operation 402, register the user 320's selection and designate the chosen content as the original content 304. This selection may be visually indicated to the user 320 through highlighting, change of text color, or other visual cues, providing feedback that the content has been successfully selected as the original content 304 for further processing.

It is important to note that while operation 402 is described as selecting content within the source document 302, the system 300 may also support selecting content from multiple documents or even non-document sources, such as web pages or system dialogs.

The method 400 includes a copy operation 404, which encompasses two potential sub-operations: operation 404a, which performs a conventional copy operation on the original content 304, and operation 404b, which performs a generative copy operation on original content 304.

Operation 404a, the conventional copy operation, follows the standard copy functionality provided by the operating system or application. When applied to the original content 304, it creates the clipboard content 306 without any modifications or generative processing.

Operation 404b, the generative copy operation, applies an action definition to the original content 304 during the copy process, resulting in the processed clipboard content 308. This type of copy operation leverages the generative AI capabilities of the system 300.

The system 300 may be configured to use either sub-operation based on, for example, user preferences, system settings, and/or contextual factors. For example:

The user 320 may explicitly choose between operations 404a and 404b through a user interface option or keyboard shortcut.

The system 300 may automatically determine which sub-operation to use based on, for example, the content type, source application, or predefined rules.

A hybrid approach may be implemented in which the system 300 performs both sub-operations 404a and 404b simultaneously, thereby generating and storing both the conventional clipboard content 306 and the processed clipboard content 308 for later use.

By supporting both conventional and generative copy operations through sub-operations 404a and 404b, the system 300 maintains compatibility with existing workflows while offering enhanced functionality through its generative AI capabilities. This flexibility allows users to seamlessly integrate the generative cut and paste feature into their existing document editing processes, choosing when to apply generative processing during the copy operation or deferring it to the paste operation as needed.

In some embodiments, the system 300 may support generative paste operations but not support generative copy operations. In these cases, operation 404 may only include operation 404a (conventional copy) and not operation 404b (generative copy). This configuration allows the system 300 to maintain compatibility with standard copy operations while still providing generative capabilities during the paste process. By limiting the copy operation to the conventional method, the system 300 ensures that the original content 304 is preserved in its unaltered form as clipboard content 306.

In such implementations, the generative processing may be deferred unless and until the paste operation is initiated. This approach can offer several advantages:

Compatibility: It ensures full compatibility with existing applications and workflows that expect conventional copy behavior.

Performance: By not performing generative processing during the copy operation, the system 300 may provide a more responsive user experience, especially for large selections of content.

Flexibility: Users have the option to use the copied content in its original form or apply generative processing at the time of pasting, depending on their needs.

Predictability: Users can rely on the copied content being an exact replica of the original, which may be preferable in certain contexts or workflows.

In these embodiments, the generative capabilities of the system 300 would be fully utilized during the paste operation, allowing for the application of action definitions and the generation of processed pasted content 312 at that stage of the process.

The copy operation 404 may be triggered by any of a variety of events, such as input 340 from the user 320 which provides an instruction to perform the copy operation 404. This input 340 may take various forms, such as any one or more of the following:

Keyboard shortcuts: The user 320 may press a combination of keys (e.g., Ctrl+C on Windows or Cmd+C on macOS) to initiate the copy operation.

Menu selection: The user 320 might choose a "Copy" option from a context menu or application menu.

Toolbar button: Clicking a dedicated "Copy" button in the application's toolbar could trigger the operation.

Touch gestures: On touch-enabled devices, the user 320 may perform a specific gesture (e.g., a long press followed by a "Copy" option) to initiate the copy.

Voice commands: In systems with voice recognition capabilities, the user 320 might issue a verbal "Copy" command.

Importantly, the user 320 may provide a single input that both selects the original content 304 and acts as the instruction to perform the copy operation 404. This may, for example, be implemented in any of a variety of ways, such as any one or more of the following:

Double-click and drag: The user 320 may double-click to select a word and then drag to extend the selection, with the release of the mouse button automatically triggering the copy operation.

Touch-based selection: On touch devices, the user 320 may perform a specific multi-touch gesture that both selects the content and initiates the copy in one fluid motion.

Voice command with content specification: The user 320 may issue a voice command like "Copy the next paragraph," which both specifies the content to be copied and initiates the operation.

Smart selection: The system 300 may implement a feature where selecting specific types of content (e.g., an entire paragraph or a code block) automatically triggers the copy operation without requiring an additional command.

These various input methods provide flexibility and efficiency in triggering the copy operation 404, allowing users to seamlessly integrate the generative cut and paste feature into their existing document editing workflows. The system 300 may be designed to recognize and respond to these different input types, initiating either the conventional copy operation 404a or the generative copy operation 404b as appropriate based on user preferences or system settings.

As part of performing the generative copy operation 404b, the system 300 may select or otherwise identify a particular action definition to apply to the original content 304 to produce the processed clipboard content in operation 404b. We will refer to this selected action definition as the "copy action definition 344", because it is applied by the system 300 to the original content 304 as part of the generative copy operation 404b. The system 300 may, for example, select or otherwise identify the copy action definition 344 from the action definitions 108a-n in the action definition library 106 previously described in connection with FIGS. 1 and 2, or from any other suitable source of action definitions.

The system 300 may implement the selection or identification of the copy action definition 344 in various ways, such as any one or more of the following:

User Selection: The user 320 may explicitly select the copy action definition 344 from a list of available action definitions presented through the user interface. This may be implemented, for example, as:
  A dropdown menu or list that appears when initiating a copy operation
  A contextual menu that appears when right-clicking selected text
  A toolbar or ribbon interface with buttons for different action definitions Default Action Definition: The system 300 may have a pre-configured default copy action definition that is automatically applied unless the user 320 specifies otherwise. This default may, for example, be:
  Set by the user 320 in a preferences or settings menu
  Determined by the system 300 based on the type of content being copied or the source application Context-Aware Selection: The system 300 may analyze the original content 304 and automatically select an appropriate copy action definition 344 based on factors such as:
  The content type (e.g., text, image, code)
  The source document type or application
  The user 320's recent usage patterns or preferences Keyboard Shortcuts: The system 300 may allow users to assign specific copy action definitions to custom keyboard shortcuts, enabling quick selection of frequently used actions.

Scripted Selection: In more advanced implementations, the system 300 may support scripted prompts that can dynamically select or generate a copy action definition based on complex logic or external factors.

Multiple Action Definitions: The system 300 may allow the application of multiple copy action definitions in sequence, creating a compound action that is applied during the generative copy operation.

API-based Selection: In scenarios where the system 300 is integrated with other applications, the copy action definition 344 may be selected programmatically through an API call from the host application.

The system 300 may include a copy module 322, which may include both a conventional copy module 324 and a text generation module 326. The conventional copy module 324 may, as part of the conventional copy operation 404a, perform a conventional copy operation on the original content 304 to produce and store the clipboard content 306 in the clipboard 328.

The text generation module 326, which may be implemented in any of the ways disclosed in connection with the text generation module 120 in FIG. 1, may, as part of the generative copy operation 404b, perform a generative copy operation on the original content 304 to produce and store the processed clipboard content 308 in the clipboard 328. The text generation module 120 may, for example, as part of the generative copy operation 404b, apply the copy action definition 344 (regardless of how the copy action definition 344 was selected) to the original content 304 to produce and store the processed clipboard content 308 in the clipboard 328.

This dual-module structure allows the system 300 to support both conventional and generative copy operations, providing flexibility and compatibility with existing workflows while offering enhanced functionality through generative AI capabilities. The conventional copy module 324 ensures that the system 300 can still perform standard copy operations when needed, maintaining compatibility with applications and scenarios that require unmodified content. It is important to note, however, that the conventional copy module 324 and the text generation module 326 may be combined into fewer modules (e.g., a single module) or divided into a more modules in any of a variety of ways.

The text generation module 326, by leveraging the capabilities described for the text generation module 120, may apply generative processing to the original content 304. This may include, for example, using language models, applying various types of prompts (e.g., simple text, tokenized, compound, or scripted), and executing complex transformations on the copied content.

By storing both the conventional clipboard content 306 and the processed clipboard content 308 in the clipboard 328, the system 300 provides users with the flexibility to choose between the original and processed versions of the copied content at paste time, depending on their specific needs and preferences. In certain embodiments, however, only the clipboard content 306 or the processed clipboard content 308 may be stored in the clipboard 328.

The method 400 includes a paste operation 406, which is responsible for inserting copied content into the destination document 314. This operation 406 allows users to integrate both conventionally copied content and content processed by generative AI capabilities into their documents.

The paste operation 406 may include two sub-operations: operation 406a, which performs a conventional paste operation, and operation 406b, which performs a generative paste operation.

Operation 406a, the conventional paste operation, follows the standard paste functionality, which may be performed by the operating system or application. When applied, it inserts the clipboard content 306 or the processed clipboard content 308 into the destination document 314 as pasted content 310 without performing any modifications (e.g., generative processing). Note, however, that if the copy module 322 previously applied an action definition to the original content 304 to produce the processed clipboard content 308, then the pasted content 310 may include content that resulted from the action definition processing (e.g., generative processing) that was performed by the copy module 322, even if the paste module 330 performs no such processing on the processed clipboard content 308.

Operation 406b, the generative paste operation, applies an action definition to either the clipboard content 306 or the processed clipboard content 308 to generate the processed pasted content 312. This type of paste operation leverages the generative AI capabilities of the system 300 to transform or enhance the content that is pasted into the destination document 314.

The system 300 may be configured to use either sub-operation 406a or 406b, based on factors such as user preferences, system settings, or contextual factors. For example:
  The user 320 may explicitly choose between operations 406a and 406b through a user interface option or keyboard shortcut.
  The system 300 may automatically determine which sub-operation to use based on the content type, target application, or predefined rules.
  A hybrid approach may be implemented, in which the system 300 presents options to the user 320 at paste time, allowing the user 320 to choose between conventional and generative paste operations for each instance.

By supporting both conventional and generative paste operations through sub-operations 406a and 406b, the system 300 maintains compatibility with existing workflows while offering enhanced functionality through its generative AI capabilities. This flexibility allows users to seamlessly integrate the generative cut and paste feature into their existing document editing processes, choosing when to apply generative processing during the paste operation as needed.

In some embodiments, the system 300 may not support generative paste operations, meaning that the generative paste operation 406b may not be implemented. In such embodiments, the generative copy operation 404b may be implemented. These embodiments offer a unique configuration where the system 300 leverages generative AI capabilities during the copy process but maintains a conventional paste operation. This approach can provide several benefits:
  Simplified Paste Workflow: By only implementing the conventional paste operation 406a, the system 300 ensures a consistent and predictable paste behavior across all applications and contexts. Users can rely on the standard paste functionality they are familiar with, reducing potential confusion or unexpected results during the paste process.
  Flexibility in Content Use: The generative copy operation 404b still allows users to create processed clipboard content 308, which may be stored alongside the conventional clipboard content 306. This gives users the option to use either the original or the processed content, depending on their needs, without introducing complexity at the paste stage.
  Compatibility: This configuration maintains full compatibility with existing applications and workflows that expect conventional paste behavior. It ensures that the paste operation 406 always inserts content in a format that is universally recognized and supported.
  Performance Optimization: By limiting generative operations to the copy process, the system 300 may potentially offer a more responsive paste experience. This can be particularly beneficial when working with large amounts of content or in performance-sensitive environments.
  User Control: This approach gives users more control over when and how generative processing is applied to their content. They can choose to generate alternative versions during the copy operation but always have the option to paste the original content if desired.

Predictability: Users can rely on the pasted content being an exact replica of what was copied (either conventionally or through generative processing), which may be preferable in certain contexts or workflows where maintaining the integrity of the copied content is crucial.

In these embodiments, the generative capabilities of the system 300 are fully utilized during the copy operation, allowing for the creation of processed clipboard content 308 through the application of action definitions. However, the paste operation remains conventional, ensuring that users always have access to a standard, predictable paste functionality while still benefiting from the generative features during the copy process.

As part of performing the generative paste operation 406b, the system 300 may select or otherwise identify a particular action definition to apply to the clipboard content 306 or the processed clipboard content 308 to produce the processed pasted content 312. We will refer to this selected action definition as the "paste action definition 346", because it is applied by the system 300 as part of the generative paste operation 406b. The system 300 may select or otherwise identify the paste action definition 346 from the action definitions 108a-n in the action definition library 106 previously described in connection with FIGS. 1 and 2.

The system 300 may implement the selection or identification of the paste action definition 346 in various ways, similar to the selection of the copy action definition 344:
  User Selection: The user 320 may explicitly select the paste action definition 346 from a list of available action definitions presented through the user interface. This may be implemented, for example, as:
    A dropdown menu or list that appears when initiating a paste operation
    A contextual menu that appears when right-clicking at the paste location
    A toolbar or ribbon interface with buttons for different action definitions
  Default Action Definition: The system 300 may have a pre-configured default paste action definition that is automatically applied unless the user 320 specifies otherwise. This default may, for example, be:
    Set by the user 320 in a preferences or settings menu
    Determined by the system 300 based on the type of content being pasted or the target application
  Context-Aware Selection: The system 300 may analyze the clipboard content 306 or processed clipboard content 308, as well as the target document or paste location, and automatically select an appropriate paste action definition based on factors such as:
    The content type (e.g., text, image, code)
    The target document type or application
    The user's recent usage patterns or preferences
  Keyboard Shortcuts: The system 300 may allow users to assign specific paste action definitions to custom keyboard shortcuts, enabling quick selection of frequently used actions.
  Scripted Selection: In more advanced implementations, the system 300 may support scripted prompts that can dynamically select or generate a paste action definition based on complex logic or external factors.
  Multiple Action Definitions: The system 300 may allow the application of multiple paste action definitions in sequence, creating a compound action that is applied during the generative paste operation.
  API-based Selection: In scenarios where the system 300 is integrated with other applications, the paste action definition may be selected programmatically through an API call from the host application.

One nuance specific to the selection of the paste action definition 346 is that the system 300 may need to consider whether to use the clipboard content 306 or the processed clipboard content 308 as input for the generative paste operation 406b. This decision may, for example, be incorporated into the paste action definition selection process, or it may be a separate step that occurs before or after the selection of the paste action definition 346.

Additionally, the system 300 may offer options to preview the results of applying different paste action definitions before finalizing the paste operation. This may help users make more informed decisions about which paste action definition to use in specific contexts.

The system 300 includes a paste module 330, which comprises both a conventional paste module 332 and the text generation module 326. This dual-module structure allows the system 300 to support both conventional and generative paste operations, providing flexibility and compatibility with existing workflows while offering enhanced functionality through generative AI capabilities.

The conventional paste module 332 may, as part of the conventional paste operation 406a, perform a standard paste operation on the clipboard content 306 or the processed clipboard content 308 to insert that content into the destination document 314 as pasted content 310 without any modifications. This ensures that the system 300 can still perform standard paste operations when needed, maintaining compatibility with applications and scenarios that require unmodified content.

The text generation module 326, which may be implemented in any of the ways disclosed in connection with the text generation module 120 in FIG. 1, may, as part of the generative paste operation 406b, perform a generative paste operation on either the clipboard content 306 or the processed clipboard content 308 to produce the processed pasted content 312. The text generation module 326 may, for example, as part of the generative paste operation 406b, apply the paste action definition 346 to the selected clipboard content to produce the processed pasted content 312.

This structure parallels the copy module 322 described earlier, allowing for a consistent approach to both copy and paste operations within the system 300. The paste module 330 may leverage the capabilities of the text generation module 326 to apply generative processing to the content in the clipboard 328, including using language models, applying various types of prompts (e.g., simple text, tokenized, compound, or scripted), and executing complex transformations on the content being pasted.

The paste action definition 346, which is applied by the text generation module 326 during the generative paste operation 406b, may be selected or identified through various methods as previously described, such as user selection, default settings, context-aware selection, or programmatic determination. This allows for customizable and context-specific generative processing during the paste operation.

By incorporating both the conventional paste module 332 and the text generation module 326 within the paste module 330, the system 300 provides users with the flexibility to choose between conventional and generative paste operations, depending on their specific needs and preferences. This structure enables seamless integration of the generative cut and paste feature into existing document editing workflows while maintaining compatibility with traditional paste functionality.

The paste operation 406 may be triggered by a variety of events, such as input 340 from the user 320 which provides an instruction to perform the paste operation 406. This input 340 may take any of a variety of forms, such as any one or more of the following:

Keyboard shortcuts: The user 320 may press a combination of keys (e.g., Ctrl+V on Windows or Cmd+V on macOS) to initiate the paste operation.

Menu selection: The user 320 may choose a "Paste" option from a context menu or application menu.

Toolbar button: Clicking a dedicated "Paste" button in the application's toolbar could trigger the operation.

Touch gestures: On touch-enabled devices, the user 320 may perform a specific gesture (e.g., a tap and hold followed by a "Paste" option) to initiate the paste.

Voice commands: In systems with voice recognition capabilities, the user 320 may issue a verbal "Paste" command.

Importantly, the user 320 may provide a single input that both specifies the paste location and acts as the instruction to perform the paste operation 406. This may be implemented in several ways, such as any one or more of the following:

Click and paste: The user 320 may click to position the cursor at the desired paste location, with the click action automatically triggering the paste operation.

Touch-based insertion: On touch devices, the user 320 may perform a specific touch gesture that both specifies the paste location and initiates the paste in one fluid motion.

Voice command with location specification: The user 320 may issue a voice command like "Paste here," which both specifies the paste location and initiates the operation.

Smart insertion: The system 300 may implement a feature where selecting a specific insertion point or area automatically triggers the paste operation without requiring an additional command.

These various input methods provide flexibility and efficiency in triggering the paste operation 406, allowing users to seamlessly integrate the generative cut and paste feature into their existing document editing workflows. The system 300 may be designed to recognize and respond to these different input types, initiating either the conventional paste operation 406a or the generative paste operation 406b as appropriate based on user preferences or system settings.

As described herein, in some embodiments, the clipboard 328 may include both the clipboard content 306 and the processed clipboard content 308. The paste operation 406 may handle the presence of both conventional clipboard content 306 and processed clipboard content 308 in the clipboard 328 in various ways, such as any one or more of the following:

User Preference: The system 300 may allow the user 320 to set a default preference for which type of clipboard content to use during paste operations. This may, for example, be configured in a system settings or preferences menu.

Context-Aware Selection: The system 300 may analyze the destination document 314 to determine which clipboard content is more appropriate, and then select and paste the determined clipboard content into the destination document 314. For example, if pasting into a plain text document, it might default to the conventional clipboard content 306, while pasting into a rich text document might favor the processed clipboard content 308.

User Prompt: When initiating a paste operation, the system 300 may present the user 320 with a choice between the conventional clipboard content 306 and the processed clipboard content 308. This may, for example, be implemented as a quick popup or context menu at the time of pasting.

Keyboard Shortcut Differentiation: The system 300 may assign different commands (e.g., keyboard shortcuts) for pasting conventional content (e.g., Ctrl+V) versus processed content (e.g., Ctrl+Shift+V), allowing the user 320 to quickly choose which version to paste by issuing the command that corresponds to the version to paste.

Application-Specific Behavior: The system 300 may maintain different paste behaviors for different applications. For instance, it may default to conventional content in certain applications and processed content in others, based on typical use cases or user history.

Hybrid Approach: The system 300 could implement a smart paste feature that combines elements from both the conventional clipboard content 306 and the processed clipboard content 308 based on the context and requirements of the destination document 314.

Preview and Select: Before finalizing the paste operation, the system 300 may offer a preview of both the conventional clipboard content 306 and processed clipboard content 308, allowing the user 320 to make an informed decision about which version to paste.

By offering these various methods for handling multiple clipboard contents, the system 300 provides flexibility and control to the user 320, allowing them to leverage both conventional and generative paste capabilities as needed. This approach ensures that the generative cut and paste feature can be seamlessly integrated into diverse workflows while maintaining compatibility with traditional clipboard functionality.

The system 300 and method 400 may implement a special case that involves applying generative copy to the original content 304 to produce the processed clipboard content 308, and then applying generative paste to the processed clipboard content 308 to produce the processed pasted content 312. This unique workflow leverages the generative capabilities of the system 300 and method 400 at both the copy and paste stages, offering a powerful and flexible approach to content manipulation.

In this special case, the generative copy operation 404b first applies a copy action definition 344 to the original content 304 during the copy process, resulting in the processed clipboard content 308. Subsequently, the generative paste operation 406b applies a (same or different) paste action definition 346 to the processed clipboard content 308, generating the processed pasted content 312 that is inserted into the destination document 314.

This double application of generative processing offers several benefits:

Enhanced Content Transformation: By applying generative processing twice, users can achieve more complex and nuanced transformations of their content, potentially producing results that would be difficult or impossible to achieve with a single generative operation.

Workflow Flexibility: Users can tailor the generative processing at both the copy and paste stages, allowing for greater control over the content transformation process. This flexibility enables users to adapt their workflow to specific document editing needs.

Iterative Refinement: The two-stage process allows for iterative refinement of the content, with the first stage (copy) potentially preparing the content for more specific processing in the second stage (paste).

Context-Aware Processing: The generative paste operation can take into account the context of the destination document 314, potentially allowing for more appropriate and seamless integration of the processed content.

Efficiency in Complex Tasks: For tasks that require multiple transformations, this special case can potentially reduce the number of manual steps required, streamlining the user's workflow.

This innovative approach to content manipulation demonstrates the power and flexibility of the generative cut and paste feature, showcasing how the system 300 can be used to perform sophisticated content transformations while maintaining an intuitive and user-friendly interface.

In this special case, where generative processing is applied during both the copy and paste operations, the copy action definition 344 and the paste action definition 346 may be the same as each other or different from each other. Both approaches offer distinct benefits. For example, when the copy action definition 344 and paste action definition 346 are the same:

Consistency: Using the same action definition for both operations ensures a consistent transformation process, which can be beneficial for maintaining coherence in the content's style or format.

Simplicity: Users only need to define or select a single action definition, simplifying the workflow and reducing the cognitive load on the user.

Reinforcement: Applying the same generative process twice may help to strengthen or refine the desired transformation, potentially producing more polished results.

When the copy action definition 344 and paste action definition 346 are different:

Flexibility: Different action definitions allow for more diverse and complex transformations, enabling users to tailor the content at each stage of the process to meet specific needs.

Context-Awareness: The paste action definition can be chosen or designed to consider the context of the destination document 314, potentially allowing for better integration of the processed content.

Multi-Stage Processing: Using different action definitions enables a two-stage transformation process, where the copy operation prepares the content for further refinement during the paste operation.

Workflow Optimization: Users can optimize their workflow by splitting complex transformations into two distinct stages, potentially improving efficiency and allowing for intermediate review or modification.

By supporting both approaches, the system 300 provides users with the flexibility to choose the most appropriate method for their specific content manipulation needs. This versatility enhances the power and utility of the generative cut and paste feature, allowing users to perform sophisticated content transformations while maintaining an intuitive and user-friendly interface.

Some specific use cases of the special case of applying generative processing during both copy and paste operations include:

Examples where the copy action 344 is different from the paste action definition 346:
Language Translation and Localization:
Copy action: Translate the original content from English to French.
Paste action: Adapt the translated content to local cultural references and idioms.
Technical Documentation Simplification:
Copy action: Summarize complex technical content.
Paste action: Rephrase the summary in simpler language for a non-technical audience.
Legal Document Analysis and Reporting:
Copy action: Extract key legal points and arguments from a lengthy document.
Paste action: Generate a structured summary report with headings and bullet points.

Examples where the copy action definition 344 is the same as the paste action definition 346:
Style Transformation:
Copy and Paste Action: Convert text to a specific writing style (e.g., academic, journalistic, or creative).
Applying the same style transformation twice can help reinforce the desired style, ensuring a more consistent tone throughout the document.
Text Simplification:
Copy and Paste Action: Simplify complex sentences and replace jargon with more common terms.
Using the same simplification process during both copy and paste can help ensure that the content becomes progressively easier to understand, which can be particularly useful when adapting technical or specialized content for a general audience.
Content Expansion:
Copy and Paste Action: Elaborate on key points and add supporting details.
Applying the same expansion process twice allows for a more thorough development of ideas, potentially uncovering new insights or connections that weren't apparent after the first application.

These examples demonstrate how the special case of applying generative processing during both copy and paste operations can be used to perform sophisticated content transformations. Whether using different action definitions for each stage or applying the same action definition twice, this approach offers users powerful and flexible tools for manipulating and refining content to meet specific needs.

Embodiments of the cut-and-paste system 300 and method 400 have a variety of advantages, such as one or more of the following.

The generative cut and paste features disclosed herein offer seamless integration with existing workflows, providing a significant advantage over conventional AI-assisted writing tools. Unlike traditional chatbots or copilots that require users to switch to separate interfaces, the generative cut and paste features disclosed herein allow users to leverage AI capabilities directly within their normal document editing process.

By incorporating AI-driven content processing into familiar copy and paste operations, the system 300 enables users to perform sophisticated content manipulations without disrupting their established writing routines. This integration may be achieved through the implementation of a copy module that includes both conventional and generative copy functionalities, as well as a text generation module that applies user-selected action definitions to the copied content.

The seamless integration is further enhanced by the system 300's ability to trigger copy operations through various user inputs, such as keyboard shortcuts, menu selections, toolbar buttons, touch gestures, or voice commands. This flexibility allows users to initiate AI-assisted content transformations using their preferred input methods, maintaining consistency with their existing document editing practices.

Moreover, the generative cut and paste features disclosed herein support both conventional and generative copy operations, allowing users to choose between standard copying and AI-enhanced processing based on their specific needs. This dual functionality ensures compatibility with existing workflows while offering enhanced capabilities when desired.

The result is a more efficient and intuitive content manipulation process. Users may apply complex AI-driven transformations to their text without the need to context-switch between their document editor and external AI tools. This streamlined approach not only saves time but also reduces cognitive load, allowing writers to maintain their focus and creative flow throughout the editing process.

The generative cut and paste features disclosed herein provide users with granular control over content transformation, offering a significant advantage over traditional AI-assisted writing tools. Unlike systems that process entire documents at once, the generative cut and paste features disclosed herein allow users to apply action definitions (e.g., generative processing) to specific selections of text within a document.

This granular approach enables more precise and targeted content manipulation. Users can select individual words, sentences, paragraphs, or any arbitrary portion of text for transformation. The system 300 supports both contiguous and non-contiguous text selections, allowing for even greater flexibility in applying generative processing.

The granular control may be implemented through the system 300's ability to receive user input selecting specific text within a document. This may be achieved through various methods, such as dragging across text in a graphical user interface, double-clicking to select a word and then extending the selection, or using touch-based gestures on compatible devices.

Furthermore, the generative cut and paste features disclosed herein allow users to apply different action definitions to different portions of text within the same document. This means that users can tailor the AI-driven transformations to the specific needs of each text selection, rather than applying a one-size-fits-all approach to the entire document.

The granular control extends to both the copy and paste operations. During copying, users can select specific text and apply a chosen action definition to generate processed clipboard content. Similarly, during pasting, users can apply another action definition to the clipboard content, allowing for multi-stage, targeted transformations.

This level of precision in content manipulation enables users to:
  Refine specific sections of a document without affecting the rest of the content.
  Apply different styles, tones, or transformations to various parts of the document as needed.
  Experiment with AI-generated alternatives for specific phrases or paragraphs without committing to changes in the entire document.
  Maintain greater control over the creative process by selectively applying AI assistance where it's most beneficial.

By providing this granular control, the generative cut and paste features disclosed herein empower users to leverage AI capabilities in a more nuanced and context-aware manner, resulting in more effective and efficient content creation and editing processes.

The generative cut and paste features disclosed herein offer a powerful advantage through their support for customizable action definitions. This feature allows users to tailor the AI's behavior to their specific needs and preferences, providing a level of flexibility that is often not possible with standard chatbots or copilots.

The system 300 supports a wide range of action definition types, from simple text prompts to complex scripted operations. These action definitions can be stored in an action definition library, allowing users to create, modify, and select from a variety of predefined or custom actions. This customizability extends to both the copy and paste operations. Users can select different action definitions for copying and pasting, or use the same definition for both operations, providing powerful tools for refining and adapting their content.

The flexibility of customizable action definitions allows users to:
  Create domain-specific prompts tailored to their particular field or writing style.
  Develop complex, multi-step content transformations that can be applied with a single action.
  Fine-tune the AI's behavior to match their specific workflow and preferences.
  Adapt the system's capabilities as their needs evolve over time.

By supporting such a wide range of customizable action definitions, the generative cut and paste features disclosed herein empower users to leverage AI capabilities in highly specific and personalized ways, going far beyond the limited, predefined operations typically available in standard chatbots or copilots.

The generative cut and paste features disclosed herein offer a powerful advantage through their two-stage processing capability, enabling separate generative processing during both copy and paste operations. This feature allows for more sophisticated content transformations and context-aware adaptations that may not be achievable with the single-step process typical of chatbots.

The system implements this two-stage processing through its copy module and paste module. During the copy operation, the user can select an action definition to apply to the original content, generating processed clipboard content. This processed content is then stored in the clipboard.

Subsequently, during the paste operation, the user can select a second action definition to apply to the processed clipboard content, generating processed pasted content. This two-stage approach allows for sequential transformations of the content, each stage potentially considering different contexts or requirements.

Key benefits of this two-stage processing include:
  Context-aware transformations: The copy operation can consider the context of the source document, while the paste operation can adapt the content to the context of the destination document.
  Flexible content manipulation: Users can apply different transformations at each stage, allowing for more nuanced and sophisticated content adaptations.
  Iterative refinement: The two-stage process enables users to refine their content in steps, potentially leading to higher quality outputs.
  Preservation of intermediate results: The system can store both the original clipboard content and the processed clipboard content, allowing users to choose between different versions at paste time.

The system supports various configurations of this two-stage processing. For example, users can:
- Apply generative processing during both copy and paste operations
- Use conventional copy with generative paste
- Use the same action definition for both operations
- Use different action definitions for copy and paste This flexibility in applying generative processing at different stages of the content manipulation process allows for a level of sophistication and adaptability that is typically not achievable with the single-step interactions common in traditional chatbots or AI writing assistants.

By enabling this two-stage, context-aware content transformation, the generative cut and paste features disclosed herein provide users with a powerful tool for creating and adapting content that goes beyond the capabilities of conventional AI-assisted writing tools.

Some embodiments of the present invention, which may (but need not) build upon the foundation of the systems 100 and 300 and methods 200 and 400 previously described herein, offers an innovative approach to text transformation and formatting within documents. These embodiments introduce the ability to apply sophisticated transformations to ("paint") existing text, thereby modifying such text in complex ways not before possible, but with the ease and intuitiveness of traditional format painting tools. For example, and as described in more detail below, such embodiments enable a user to select text (the "destination text"), such as by dragging over that text, and thereby to cause the destination text to be modified automatically, such as by causing any type of action definition disclosed herein to be applied to the destination text to produce modified text (referred to herein as "painted text"), and to further cause the destination text to be replaced automatically with the painted text. The painted text may, for example, be produced by providing a prompt as an input to a language model (e.g., a large language model), which produces the painted text in response as an output. The prompt may, for example, be selected (e.g., generated) based on the destination text.

Optionally, in addition, the particular modification that is applied to the source text to produce the painted text may be selected (e.g., generated) based on other text (the "source text"). For example, before the user selects the destination text, the user may select the source text, which may be in the same or different document as the destination text. A "painting configuration" may be selected (e.g., generated) based on the source text, and the destination text may be modified based on the selected painting configuration. The painting configuration may, for example, be selected by providing a prompt as an input to a large language model, which produces output in response. That output may be used to select the painting configuration.

In some embodiments, the steps just described are only performed if and when the system is in a "painting mode." The system may, for example, be put into the painting mode in response to user input selecting the painting mode, such as clicking on or otherwise selecting a button associated with the painting mode. Similarly, the system may be taken out of painting mode in response to user input deselecting the painting mode, such as clicking on or otherwise selecting the (toggle) button associated with the painting mode.

Figure 5:
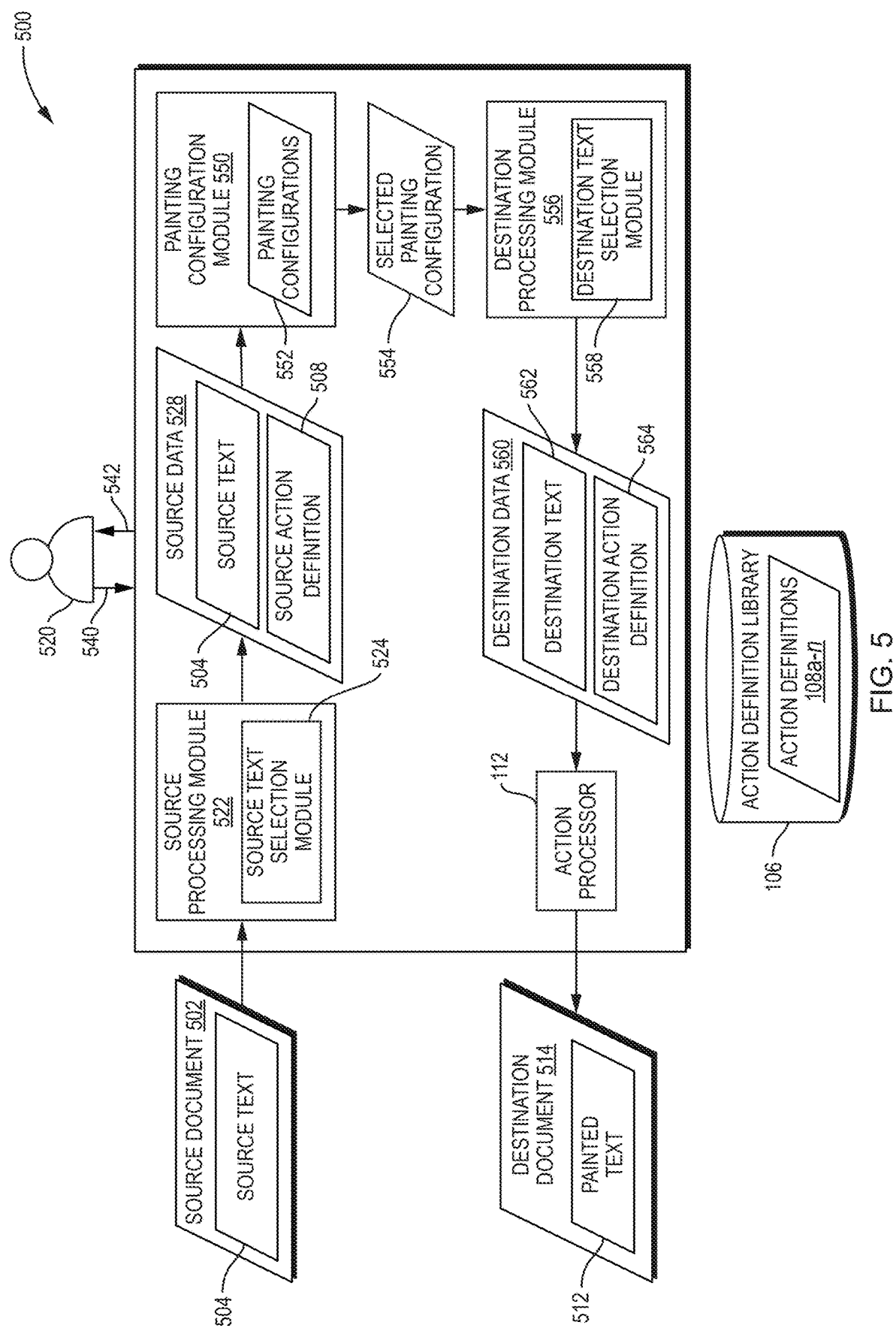
FIG. 5 is a dataflow diagram of a system for implementing various painting features according to one embodiment of the present invention.
Figure 6:
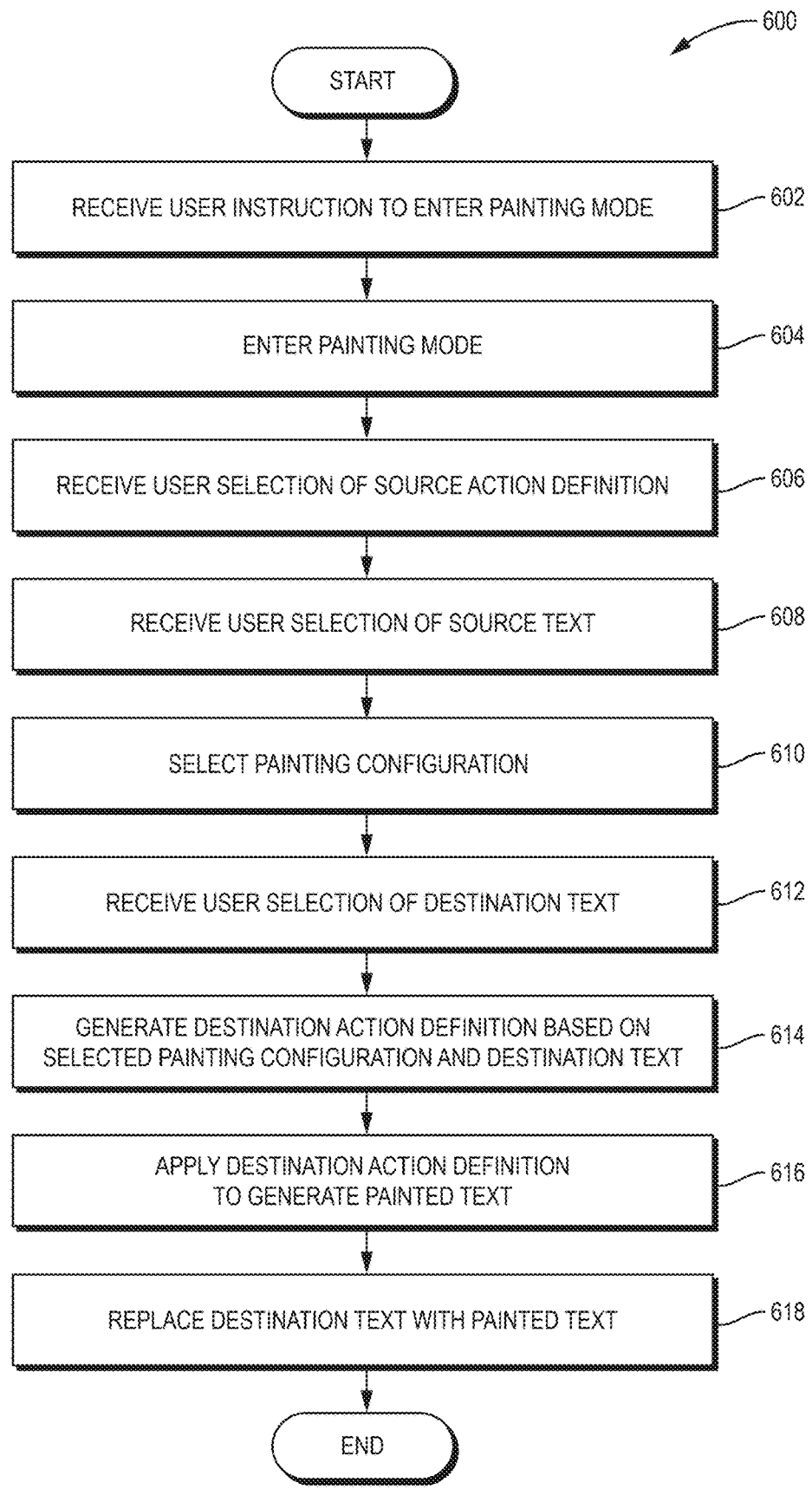
FIG. 6 is a flowchart of a method performed by the system of FIG. 5 according to one embodiment of the present invention.

Referring to FIG. 5, a dataflow diagram is shown of a system 500 for implementing various painting features according to one embodiment of the present invention. Referring to FIG. 6, a flowchart is shown of a method 600 performed by the system 500 of FIG. 5 according to one embodiment of the present invention. The system 500 illustrated in FIG. 5 shares many similarities with the system 300 shown in FIG. 3, with some elements being identical or closely related but assigned different reference numerals. For instance, the user 520 in FIG. 5 corresponds to the user 320 in FIG. 3 and may represent the same entity (e.g., person). As such, the descriptions and functionalities associated with user 320 in the system 300 are equally applicable to user 520 in the system 500, unless explicitly stated otherwise in connection with FIG. 5.

The user 520 may provide input 540 representing an instruction to enter a painting mode. The system 500 may receive the input 540 from the user 520 representing the instruction to enter the painting mode (FIG. 6, operation 602). In response to receiving the input 540 representing the instruction to enter the painting mode, the system 500 may enter the painting mode (FIG. 6, operation 604). The purpose of the painting mode within the system 500 and method 600 is to enable the application of text transformations using paint action definitions. In some embodiments, the system 500 only performs certain operations (e.g., applying action transformations to destination text to produce painted text) while the system 500 is in painting mode. The painting mode, however, is not required in all embodiments of the system 500 and method 600. For example, some embodiments allow for the application of paint action definitions without explicitly entering a designated painting mode.

The instruction to enter the painting mode may take various forms, especially in graphical user interfaces (GUIs). Here are several examples:
- Button or Toggle: The user 520 may click on or select a dedicated button or toggle switch in the GUI to enter painting mode. This may, for example, be implemented as a toolbar button or a toggle switch in a menu bar.
- Menu Selection: The painting mode may be activated by selecting an option from a dropdown menu or context menu within the application.
- Keyboard Shortcut: A specific keyboard combination (e.g., Ctrl+P or Cmd+P) may be designated to quickly toggle the painting mode on and off.
- Ribbon Interface: In applications with a ribbon-style interface, the painting mode may be activated by selecting a tab or option within the ribbon.
- Gesture-Based Activation: On touch-enabled devices, a specific gesture (e.g., a three-finger tap or swipe) may be used to enter painting mode.
- Voice Command: In systems with voice recognition capabilities, a verbal command like "Enter painting mode" could be used to activate the painting mode.
- Contextual Activation: The painting mode may be automatically entered when the user performs a specific action, such as selecting a "Format Painter" tool from a toolbox.
- Status Bar Toggle: A clickable icon or text in an application's status bar may allow the user 520 to toggle the painting mode on and off.
- Floating Palette: A floating window or palette may contain a button or checkbox to activate the painting mode, allowing for flexible positioning within the interface.
- Right-Click Context Menu: The option to enter painting mode may be included in a context menu that appears when right-clicking on selected text or a specific area of the document.

These various input methods provide flexibility and accessibility for users to enter and exit the painting mode.

The user 520 may provide input 540 representing a selection of a source action definition 508 from among a plurality of action definitions, such as the plurality of source action definitions 108a-n in the action definition library 106. The system 500 may receive the input 540 representing the selection of the source action definition 508 (FIG. 6, operation 606). The source action definition 508 may, for example, be of any of the kinds of action definitions 108a-n previously described. These may, for example, include simple text prompts, tokenized prompts, compound prompts (such as chained prompts or alternative take prompts), or scripted prompts. For example, the source action definition 508 may contain or otherwise be associated with a source action definition prompt for use with a language model (e.g., a large language model). The source action definition 508 may, however, be any kind of data and/or code for performing the functions disclosed herein in connection with the source action definition 508. The user 520 may select the source action definition 508 in any of the ways disclosed elsewhere herein in connection with selecting one of the action definitions 108a-n. The source action definition 508 is one type of source data 528 shown within the system 500 of FIG. 5.

In some embodiments, it is optional for the user 520 to provide the input 540 selecting the source action definition 508. As this implies, in some embodiments, operation 606 may be omitted from the method 600.

For example, as an alternative to the user 520 providing the input 540 selecting the source action definition 508, the system 500 and method 600 may select the source action definition 508 automatically in any of a variety of ways, such as any one or more of the following:

Context-aware selection: The system 500 may analyze the content of the source document 502 and automatically choose an appropriate source action definition 508 based on factors such as document type, content structure, and/or writing style.

User history: The system 500 may select the source action definition 508 based on the user 520's recent usage patterns and/or frequently used action definitions.

Default selection: The system 500 may have a preconfigured default source action definition that is automatically applied unless the user 520 specifies otherwise.

Machine learning-based selection: The system 500 may use a trained model to predict the most suitable source action definition 508 based on various inputs, such as the source text 504 and/or user preferences.

Even if the user 520 selects the source action definition 508, they may do so only once and then engage in the method 600 again without selecting the source action definition 508 again. In such cases, the system 500 and method 600 may, in the current iteration of the method 600, use the source action definition 508 that was selected by the user 520 in a previous iteration of the method 600.

Operation 606 may be performed while the system 500 is in painting mode. In some embodiments, operation 606 may be performed if and only if the system 500 is in painting mode.

The user 520 may provide input 540 selecting source text 504. The system 500 may receive that input 540 (FIG. 6, operation 608). The source text 504 may, for example, be contained within a source document 502. The user 520 may select the source text 504 in any of the ways disclosed above in connection with the user 320's selection of the original content 304 in the system 300 of FIG. 3.

The system 500 may include a source processing module 522, which may perform a variety of functions, such as processing the user 520's selection of the source action definition 508 and/or the source text 504. The source processing module 522 may include a source text selection module 524, which receives the user 520's input 540 selecting the source text 504, and which extracts or otherwise prepares the source text 504 for further processing. The source data 528 may include the source text 504.

The source text selection module 524 may implement various methods for receiving and processing the user's input, similar to those described for selecting the original content 304 in the system 300 of FIG. 3. These methods could include mouse selection, keyboard shortcuts, touch gestures, voice commands, or programmatic selection, depending on the specific implementation and user interface of the system 500.

The system 500 may include a painting configuration module 550. The painting configuration module 550 may include a plurality of painting configurations 552, each of which specifies a corresponding transformation to be performed on text. Some or all of the painting configurations 552 may fall within the definition of an action configuration, as that term has previously been defined. In some embodiments, the painting configurations 552 are implemented as the action definitions 108a-n. In other words, the action definitions 108a-n may play the role of the painting configurations 552. More generally, however, the painting configurations 552 may take any form that is suitable for performing the functions disclosed herein in connection with the painting configurations 552, whether or not any particular such form qualifies as an action definition. Different painting configurations may be the same as or different from each other in any of a variety of ways.

The painting configuration module 550 selects one of the painting configurations 552, referred to herein as the selected painting configuration 554 (FIG. 6, operation 610). The selected painting configuration 554 represents or otherwise specifies the transformation that is to be applied to the destination text 562, as will be described in more detail below. The painting configuration module 550 may select the selected painting configuration 554 in any of a variety of ways. For example, the painting configuration module 550 may select the selected painting configuration based on:

The source text 504: The painting configuration module 550 may analyze the content, structure, and/or characteristics of the source text 504 in any of a variety of ways to select the selected painting configuration 554.

The source action definition 508: The painting configuration module 550 may select the selected painting configuration 554 based on the source action definition 508 chosen by the user 520 or automatically selected by the system 500. As this implies, in some embodiments, operation 610 may be performed even if the no source text 504 was selected.

Both the source text 504 and the source action definition 508: The painting configuration module 550 may consider both elements in combination to make a more context-aware selection of the painting configuration.

Selecting the selected painting configuration 554 based on the source text 504 (whether alone or in combination with other data, such as the source action definition 508) enables the system 500 and method 600 to subsequently transform other text based on information that is derived from the source text 504. Unlike conventional format painters, which are limited to "painting" destination text with text formatting properties (e.g., bold, underline, italics, font), embodiments of the present invention are able to "paint" destination text with a much wider range of properties that are derived from the source text 504 (possibly in combination with other data). Some examples of the kinds of properties that embodiments of the invention can "paint" onto destination text include:

Writing style: The system 500 may analyze the writing style of the source text 504 and apply it to the destination text 562, adjusting factors like formality, tone, or voice.

Content structure: The painting configuration 554 may be used to transform the structure of the destination text 562 to match that of the source text 504, such as converting paragraphs into bullet points or vice versa.

Vocabulary level: The system 500 may adjust the complexity or simplicity of the vocabulary used in the destination text 562 based on the source text 504.

Language or dialect: The painting configuration 554 may be used to transform the destination text 562 to match the specific language or dialect used in the source text 504.

Technical jargon: If the source text 504 contains specific technical terms or industry-specific language, the system 500 may apply this to the destination text 562, effectively translating it into the appropriate technical context.

Emotional tone: The system 500 may analyze the emotional content of the source text 504 (e.g., positive, negative, neutral) and apply a similar emotional tone to the destination text 562.

Summarization or expansion: Based on the relative lengths of the source text 504 and destination text 562, the painting configuration 554 may be used to apply summarization or expansion techniques to make the destination text 562 more concise or more detailed.

Argumentation style: If the source text 504 presents arguments in a particular way (e.g., pros and cons, historical context, statistical evidence), the system 500 may use the selected painting configuration 554 to restructure the destination text 562 to follow a similar argumentation style.

Differences in the source text 504 may cause the system 500 and method 600 to generate and/or select different painting configurations 554 that specify different transformations. For example, if a first instance of the source text 504 is selected, this may cause the painting configuration module 550 to select a first selected painting configuration 554 that specifies a first transformation. If a second instance of the source text 504 (which differs from the first instance of the source text 504) is selected, this may cause the painting configuration module 550 to select a second selected painting configuration 554 that specifies a second transformation. The first and second transformations may differ from each other in any of a variety of ways. Similarly, different instances of the source action definition 508 may result in different painting configurations being selected. Similarly, different combinations of source text 504 and source action definition 508 may result in different painting configurations being selected. The ability to select different selected painting configurations based on different source text and/or action definitions enables the system 500 to tailor the transformation that is applied to the destination text 562 based on the specific nature of the source text 504, ensuring that the resulting changes are appropriate and relevant.

The painting configuration module 550 may select the selected painting configuration 554 based on the source text 504 and the source action definition 508 in a variety of ways. One approach is for the painting configuration module 550 to apply the source action definition 508 to the source text 504 to produce source action definition output. For example, the painting configuration module 550 may perform an action specified by the source action definition 508 on the source text 504 to produce the source action definition output. The painting configuration module 550 may then select the selected painting configuration 554 based on this action definition output.

For example, if the source action definition 508 specifies a prompt for use with a language model (e.g., an LLM) (a "source action definition prompt"), the process may work as follows:

Prompt Application: The system 500 may generate or select a processed source prompt based on the source action definition 508 and the source text 504, such as by using any of the techniques disclosed herein for creating or selecting a processed prompt.

Language Model Processing: The system 500 may provide the processed source prompt as an input into the language model to generate the source action definition output.

Configuration Selection: The painting configuration module 550 may select the selected painting configuration 554 based on the source action definition output. For example, the painting configuration module 550 may use the source action definition output itself as the selected painting configuration 554. As another example, the selection process may involve matching the characteristics of the source action definition output to predefined criteria associated with each of the painting configurations 552.

For example, if the source action definition 508 includes a prompt like "Identify the tone of the source text," and this prompt is applied to the source text 504 via a language model, the resulting output might be the text "informal". The painting configuration module 550 may then select a painting configuration 554 that is designed to transform text into a similar informal tone, such as the prompt, "Rewrite the following text in an informal tone."

As another example, the system 500 may store one or a plurality of action-configuration pairs, where each action-configuration pair includes a source action definition and a corresponding selected painting configuration. The action-configuration pairs may be stored in or in association with the action definition library 106 and/or the painting configuration module 550. Each source action definition within an action-configuration pair may be of any of the types of action definitions disclosed herein, such as simple text prompts, tokenized prompts, compound prompts, or scripted prompts. Different action-configuration pairs may include the same or different action definitions and/or the same or different painting configurations, in any combination.

When the user 520 or system 500 selects a particular source action definition 508, the system 500 may automatically identify the stored action-configuration pair that contains the selected source action definition 508. The system 500 may then automatically identify and use the corresponding selected painting configuration 554 that is within the identified action-configuration pair. This automatic identification eliminates the need for the system 500 to perform more complex operations to identify an appropriate selected painting configuration 554.

Alternatively, the user 520 or system 500 may directly select a stored action-configuration pair. In response to such a selection, the system 500 may: (1) use the source action definition within the selected pair to perform the functions disclosed herein in connection with the source action definition 508, such as analyzing source text 504 to identify properties to be applied to destination text; and (2) use the selected painting configuration within the selected pair to perform the functions disclosed herein in connection with the selected painting configuration 554, such as specifying how identified properties should be applied to transform destination text.

The action-configuration pairs enable the system 500 to maintain consistent relationships between how properties are extracted from source text (via the source action definition) and how those properties are applied to destination text (via the selected painting configuration). For example, an action-configuration pair may contain:
- A source action definition that extracts writing style characteristics from source text
- A corresponding selected painting configuration that applies those same style characteristics to destination text The system 500 may generate the selected painting configuration 554 in any of a variety of ways. As one example, the system 500 may implement a meta-prompting approach that leverages language models to automatically generate appropriate selected painting configuration 554 and/or destination action definition 564 based on any of the data disclosed above in connection with selecting the selected painting configuration 554 (e.g., the source action definition 508). For example, in response to the user 520 or system 500 selecting the source action definition 508, the system 500 may automatically generate a corresponding selected painting configuration 554 and/or destination action definition 564.

In one embodiment, this process begins with meta-instruction generation, in which the system 500 generates a meta-instruction for a language model, where the meta-instruction: (1) references the source action definition 508; (2) requests generation of a complementary destination action definition; and (3) specifies placeholders for incorporating results from: (a) the application of the source action definition 508 to the source text 504, and (b) the destination text 562. The system 500 provides this meta-instruction to a language model (e.g., an LLM), which generates a templated destination action definition containing one or more appropriate placeholders.

When applying the generated destination action definition 564, the system 500 executes the source action definition 508 to obtain transformation results, replaces placeholders with actual values (e.g., (a) the result of applying the source action definition 508 to the source text 504, and (b) the destination text 562), and provides the resolved prompt to the language model to generate the painted text 512.

The meta-prompting implementation provides several advantages by eliminating the need to manually define paired prompts, adapting automatically to different types of source action definitions, and maintaining semantic consistency between source and destination transformations. The system 500 may implement safeguards to ensure the quality of generated destination action definitions, such as validating that generated prompts maintain the intended transformation relationship, providing fallback options if the generated prompt does not meet quality thresholds, and allowing user review and modification of generated prompts.

The system 500 may implement a hybrid approach that combines predefined prompt templates with language model refinement to generate the selected painting configuration 554 and/or destination action definition 564. This approach builds upon both the action-configuration pairs and meta-prompting implementations described above, while providing additional reliability through structured templates.

For example, the system 500 may maintain a library of base templates for different transformation categories within the action definition library 106. These templates may correspond to common transformation types such as summarization, style adaptation, or explanation generation, similar to how the system 500 stores other types of action definitions like simple text prompts, tokenized prompts, and compound prompts.

When the user 520 provides a source action definition 508, the system 500 may analyze the source action definition 508 to determine its transformation category and select an appropriate base template. This analysis leverages the system 500's existing capabilities for processing and categorizing action definitions, as described in connection with the action processor 112.

The system 500 may then refine the selected template (e.g., using a language model) to create a painting configuration and/or destination action definition specifically tailored to complement the source action definition 508. For example, if the system 500 determines that the source action definition 508 relates to style extraction, it may select a base template for style application, then use a language model to refine that template based on the specific stylistic elements being extracted. This combines the reliability of predefined templates with the flexibility of language model-based customization.

The hybrid implementation provides several advantages over purely template-based or purely generative approaches. By starting with predefined templates, the system 500 ensures consistent and reliable base behavior while still allowing for customization through language model refinement. This approach leverages the system 500's support for both stored action definitions and dynamic prompt generation, creating a balance between structure and flexibility.

Regardless of the particular method that is used to identify or generate the selected painting configuration 554 and/or destination action definition 564, the following are some useful and non-limiting examples of action-configuration pairs:

| Title | Source Action Definition | Corresponding Painting Configuration |
|---|---|---|
| Style Extraction and Application | "Analyze the writing style, including tone, formality level, and word choice patterns in the following text" | "Transform the following text to match this writing style: [extracted style characteristics]" |
| Technical Level Adaptation | "Identify the level of technical complexity and domain-specific terminology in this text" | "Rewrite the following text to match this technical level: [identified complexity level]" |
| Summarization Pattern | "Identify the key summarization approach used in this text (e.g., bullet points, executive summary, abstract)" | "Summarize the following text using this summarization pattern: [identified pattern]" |
| Argument Structure | "Extract the argumentation style and structure (e.g., pros and cons, historical context, statistical evidence)" | "Restructure the following text to follow this argumentation approach: [extracted structure]" |

| Title | Source Action Definition | Corresponding Painting Configuration |
|---|---|---|
| Language Adaptation | "Identify the specific language or dialect characteristics in this text" | "Transform the following text to match these language characteristics: [identified language patterns]" |
| Emotional Tone Transfer | "Analyze the emotional content and tone (e.g., positive, negative, neutral)" | "Rewrite the following text to match this emotional tone: [identified tone]" |

In some embodiments, operation 610 performed if and only if the system 500 is in painting mode.

The user 520 may provide input 540 selecting destination text 562. The system 500 may receive that input 540 (FIG. 6, operation 612). The destination text 562 may, for example, be contained within a destination document 514, which may be the same document as the source document 502 or a different document or other data structure. The user 520 may select the destination text 562 in any of the ways disclosed above in connection with the user 320's selection of the original content 304 in the system 300 of FIG. 3.

The system 500 may include a destination processing module 556, which may perform a variety of functions, such as processing the user 520's selection of the destination action definition 564 and/or the destination text 562. The destination processing module 556 may include a destination text selection module 558, which receives the user 520's input 540 selecting the destination text 562, and which extracts or otherwise prepares the destination text 562 for further processing. The destination data 560 may include the destination text 562.

The destination text selection module 558 may implement various methods for receiving and processing the user's input, similar to those described for selecting the original content 304 in the system 300 of FIG. 3. These methods may include mouse selection, keyboard shortcuts, touch gestures, voice commands, or programmatic selection, depending on the specific implementation and user interface of the system 500.

The destination processing module 556 may generate the destination action definition 564 based on the selected painting configuration 554 and the destination text 562 (FIG. 6, operation 614). This generation process may be performed, for example, by selecting the destination action definition 564 from a set of existing action definitions (e.g., the action definitions 108*a-n*) or by generating the destination action definition 564.

In embodiments in which the destination action definition 564 includes, consists of, or otherwise specifies a processed destination prompt, the destination processing module 556 may generate the processed destination prompt by applying any of the techniques previously disclosed for generating a processed (final) prompt to the selected painting configuration 554 and the destination text 562. For example, if the selected painting configuration 554 includes a prompt such as "Rewrite the following text in an informal tone", the destination processing module 556 may generate the processed destination prompt by concatenating the prompt in the selected painting configuration 554 with the destination text 562. The destination action definition 564 may include or otherwise be selected or based on the such a processed destination prompt. This approach allows the system 500 to create a tailored prompt that incorporates both the transformation instructions (from the selected painting configuration 554) and the specific content to be transformed (i.e., the destination text 562).

In some embodiments, operation 614 performed if and only if the system 500 is in painting mode.

The system 500 may apply the destination action definition 564 to generate painted text 512 (FIG. 6, operation 616). For example, the system 500 may include an action processor, such as the action processor 112 previously described or another action processor implemented in the same or similar way to the action processor 112, which may apply the destination action definition 564 in any of the ways disclosed herein in connection with action definitions to produce the painted text output.

As is implied by the description above, the destination action definition 564 may include or otherwise be generated or selected based on the destination text 562. As a result, applying the destination action definition 564 in operation 616 may explicitly or implicitly operate on some or all of the destination text 562. Alternatively, if, for example, the destination action definition 564 does not include the destination text 562, then operation 616 may apply the destination action definition 564 to some or all of the destination text 562 to produce the pained text output.

In a particular example where the destination action definition 564 is a final prompt that was generated or selected based on the selected painting configuration 554 and the destination text 562, operation 616 may include:

The action processor 112 receives the destination action definition 564, which in this case is a final prompt generated by the destination processing module 556.

The final prompt is provided as an input to a language model, such as a large language model (LLM).

The language model processes the final prompt, which may include both the transformation instructions (derived from the selected painting configuration 554) and some or all of the destination text 562.

The language model generates output based on the final prompt. This output is the painted text output.

For instance, if the final prompt (destination action definition 564) is "Rewrite the following text in an informal tone: [destination text]", where [destination text] is replaced with the actual content of some or all of the destination text 562, the language model would process this prompt and generate a version of the destination text rewritten in an informal tone.

In embodiments in which the system 500 uses a language model to generate or select the selected painting configuration 554, the same or a different language model may be used to generate the painted text output.

The system 500 includes painted text 512, which may be the painted text output, or be generated by the system 500 based on the painted text output. This distinction allows flexibility in how the final painted text 512 is generated and used to replace the destination text 562, rather than requiring the raw output of the action processor 112 to be used directly. This flexibility is useful for a variety of reasons, such as the following:

Post-processing capabilities: The system 500 may apply additional transformations or refinements to the painted text output before it becomes the final painted text 512. This allows for more sophisticated and multi-step transformations that may not be achievable through a single action definition application.

Quality control: The system 500 may implement checks or filters on the painted text output to ensure it meets certain criteria before being used as the final painted text 512. This can help maintain consistency and quality in the transformed text.

User intervention: The system 500 may allow for user review or editing of the painted text output before it becomes the final painted text 512. This gives users more control over the transformation process and allows for manual adjustments and/or user approval if needed.

Integration with other systems: The painted text output may be processed by other tools or systems before becoming the final painted text 512, allowing for integration with existing workflows or additional functionality.

In some embodiments, operation 616 is performed if and only if the system 500 is in painting mode.

The system 500 replaces the destination text 562 in the destination document 514 with the painted text 512 (FIG. 6, operation 618). The system 500 may perform such replacement in any of a variety of ways, such as any one or more of the following:

Direct Replacement: The system 500 may perform a straightforward substitution, removing the destination text 562 and inserting the painted text 512 in its place. This method is simple and efficient, suitable for cases where the painted text 512 is intended to completely replace the destination text 562.

In-place Modification: Instead of a full replacement, the system 500 may modify the destination text 562 in-place, applying changes only where necessary to transform it into the painted text 512. This approach may be useful for preserving certain formatting or structural elements of the original text.

Differential Update: The system 500 may compute the differences between the destination text 562 and the painted text 512, then apply only these differences to the destination document 514. This method can be more efficient for large documents or when changes are minimal.

Staged Replacement: The system 500 may first insert the painted text 512 alongside the destination text 562, allowing for a side-by-side comparison, and then remove the original destination text 562 upon user confirmation. This approach provides an opportunity for review before finalizing the changes.

Markup-based Replacement: If the destination document 514 uses a markup language (e.g., HTML or XML), the system 500 may replace the destination text 562 with the painted text 512 while preserving or updating relevant markup tags.

Version Control Integration: In environments with version control systems, the replacement may be implemented as a new version or commit, allowing for easy tracking of changes and potential rollbacks.

Conditional Replacement: The system 500 may implement rules or conditions for replacement, such as only replacing text that meets certain criteria or preserving specific portions of the original text.

Incremental Replacement: For large documents or complex transformations, the system 500 may replace the destination text 562 in incremental steps, potentially allowing for user intervention or validation at each stage.

Regardless of how or when the destination text 562 is replaced with the painted text 512, the system 500 (or an external system, such as a word processing application) may manifest the painted text 512, such as by replacing visual output representing the destination text 562 with visual output representing the painted text 512. This manifestation may contribute to the interactive and responsive nature of the system 500 in any of a variety of ways, such as any one or more of the following:

Real-time Preview: The system 500 may provide a real-time preview of the painted text 512 as it replaces the destination text 562. This allows the user 520 to immediately see the results of the transformation, enhancing the interactive experience.

Incremental Updates: For larger text transformations, the system 500 may manifest the painted text 512 incrementally, updating portions of the visual output as they are processed. This provides immediate feedback to the user and maintains responsiveness even for complex transformations.

Side-by-Side Comparison: The system 500 may initially manifest the painted text 512 alongside the original destination text 562, allowing the user 520 to compare the two versions before finalizing the replacement. The system 500 may only implement the replacement of the destination text 562 with the painted text 512 in the destination document 514 if, and in response to, input from the user 520 that confirms such replacement. This interactive approach enables users to make informed decisions about the transformation.

Highlighting Changes: When manifesting the painted text 512, the system 500 may highlight or otherwise visually indicate the specific changes made to the destination action definition 564. This helps the user 520 quickly identify and review the transformations applied.

Animated Transitions: The system 500 may use smooth, animated transitions when replacing the visual representation of the destination text 562 with the painted text 512. This can make the transformation process more visually appealing and easier to follow.

Context-Aware Rendering: The system 500 may adapt how it manifests the painted text 512 based on the surrounding context in the destination document 514. This ensures that the painted text 512 integrates seamlessly with the existing content.

Interactive Editing: After manifesting the painted text 512, the system 500 may allow the user 520 to interactively edit or fine-tune the transformed text directly in the visual representation. This immediate editing capability enhances the system 500's responsiveness to user preferences.

Undo/Redo Visualization: The system 500 may provide visual cues for undo and redo operations related to the text transformation, allowing the user 520 to easily revert or reapply changes in the manifested painted text 512.

In some embodiments, operation 618 performed if and only if the system 500 is in painting mode.

Various operations of the method 600 of FIG. 6 may be performed in different orders than those disclosed herein. Some specific examples of such alternative sequences include:

Selecting source text before activating painting mode: The user 520 may first select the source text 504 within the source document 502, and then activate the painting mode. This sequence allows users to identify the text they want to transform before initiating the painting process.

Selecting painting configuration before source text: The user 520 may choose a painting configuration from the available painting configurations 552 before selecting the source text 504. This order may be useful when the user 520 knows the desired transformation in advance and wants to apply it to multiple sections of text.

Selecting destination text before source text: The user 520 may first select the destination text 562 in the destination document 514, then select the source text 504. This sequence might be preferable when the user 520 knows where they want to apply a transformation before deciding on the specific style or format to use.

Selecting painting configuration after destination text: The system 500 may allow the user 520 to select the destination text 562 first, then choose a painting configuration based on the context of the destination document 514. This order might lead to more context-appropriate transformations.

Iterative selection and application: The user 520 may select source text 504, apply a painting configuration, then select new destination text 562 and apply the same configuration repeatedly. This sequence allows for efficient application of the same transformation to multiple parts of a document.

Modifying painting configuration mid-process: After selecting source text 504 and destination text 562, the user 520 may modify the selected painting configuration 554 before applying it. This flexibility allows for fine-tuning of the transformation based on specific needs.

Embodiments of the system 500 and method 600 enable users to transform text with minimal input, providing significant benefits in terms of efficiency and ease of use. Here are some use cases and workflows that demonstrate this advantage:

Quick Style Transformation: A user can select a source text with a particular style, activate the painting mode, and then simply click on multiple destination text sections to apply the same style transformation. This workflow allows for rapid formatting of large documents with minimal clicks, saving time and effort compared to manual reformatting.

Tone Adjustment: If a user needs to adjust the tone of multiple sections in a document (e.g., from formal to informal), they can select a source text with the desired tone, choose the appropriate painting configuration, and then quickly apply it to various parts of the document with minimal interaction. This streamlines the process of maintaining consistent tone throughout a document.

Language Simplification: For technical documents that need to be simplified for a general audience, the user can select a well-simplified paragraph as the source text, enter the painting mode, and then easily apply this simplification to other complex paragraphs throughout the document with minimal clicks. This significantly reduces the cognitive load and time required for manual simplification.

Formatting Consistency: When working with a document that requires consistent formatting (e.g., a legal brief), the user can select a correctly formatted section, activate the painting mode, and then quickly apply the same formatting to other sections that need adjustment. This ensures consistency throughout the document with minimal user input.

Multi-document Transformation: The system 500 and method 600 allow users to apply transformations across different documents effortlessly. A user can select a source text from one document and then apply the transformation to text in multiple other documents by simply selecting the destination text in each document. This cross-document functionality significantly reduces the effort required for maintaining consistency across multiple related documents.

Benefits of such minimal-input workflows include:

Time Efficiency: Users can apply complex transformations quickly, reducing the time spent on repetitive formatting or style adjustments.

Consistency: The invention ensures that the same transformation is applied consistently across multiple text selections, reducing errors and inconsistencies.

Reduced Cognitive Load: Users don't need to remember and manually apply complex formatting rules or style guidelines; they can simply "paint" the desired transformation.

Flexibility: The system allows for easy experimentation with different styles or tones by quickly applying and comparing transformations.

Improved Workflow: The minimal input required allows users to focus on content creation and high-level editing rather than getting bogged down in formatting details.

These use cases demonstrate how embodiments of the system 500 and method 600 empower users to perform sophisticated text transformations with minimal effort, significantly enhancing productivity and document quality.

Embodiments of the system 500 and method 600 provide users with extensive control and flexibility over text transformations, allowing for powerful and customized transformations through various user inputs. Here are some use cases demonstrating this capability:

Multi-stage Transformation Workflow: Users can apply a series of transformations to achieve complex text modifications. For example:
Select source text with a specific writing style
Choose a painting configuration to change the tone (e.g., formal to informal)
Apply this transformation to destination text
Select new source text with desired formatting
Choose a painting configuration for formatting
Apply this second transformation to the same destination text This workflow allows users to combine style, tone, and formatting changes in a customized sequence.

Context-aware Transformations: The system can adapt transformations based on the context of the destination document:
User selects source text and destination text
System analyzes the destination document's context
User chooses from suggested painting configurations tailored to the context
System applies the selected configuration, considering both the source text style and destination context This process enables more nuanced and appropriate transformations.

Custom Action Definition Creation: Users can create highly specific transformation rules:

Define custom prompts or scripts for unique transformation needs
Combine multiple existing action definitions to create a new, complex transformation
Apply the custom action definition to selected text This allows for highly specialized transformations tailored to specific document types or industry requirements.

Interactive Transformation Refinement: Users can iteratively refine transformations:
Apply an initial transformation
Review the result and adjust parameters of the painting configuration
Reapply the modified transformation
Repeat until the desired outcome is achieved This process allows for fine-tuning transformations to meet exact specifications.

Cross-document Style Transfer: Users can apply complex styles across multiple documents:
Select multiple source texts from different documents
Create a composite painting configuration based on these sources
Apply this configuration to destination text in a new document This enables sophisticated style transfer across diverse document types.

Language Model Selection and Configuration: Advanced users can customize the underlying language model used for transformations:
Select from multiple available language models
Adjust model parameters (e.g., temperature, top-k sampling)
Apply transformations using the customized model settings This level of control allows for fine-tuning the AI's output to match specific requirements.

These use cases demonstrate how embodiments of the system 500 and method 600 provide users with powerful tools for applying highly customized and context-aware transformations, balancing ease of use with the ability to exert precise control over the text transformation process.

Several innovative user interface enhancements that extend and improve upon the core generative text transformation capabilities of the other embodiments disclosed herein will now be described. These enhancements are designed to make the application of text transformations more intuitive, efficient, and flexible for users. These new features include:

Generative Drag: This feature extends the existing generative cut and paste functionality to drag operations in a graphical user interface. It allows users to apply action definitions dynamically as they drag text across a document, with the transformed output inserted at the destination.

Dynamic Action Selection: Building on the generative drag capability, the system can intelligently select and apply different action definitions in real-time based on the context of where the text is being dragged. This enables highly context-aware transformations.

Enhanced Touch Gestures: A suite of touch-based interactions to facilitate text transformations on touch-enabled devices. These include pinch and spread gestures, directional swipes, and multi-finger gestures, each mapped to specific types of text transformations.

Real-time Preview and Application: Users can see and evaluate the effects of different generative actions on text in real-time as they interact with the document. This includes the ability to compare multiple transformations simultaneously in different views.

These enhancements seamlessly integrate advanced text manipulation capabilities (such as those driven by large language models and other forms of generative AI) into familiar document editing workflows. By leveraging intuitive gestures and providing immediate visual feedback, these features aim to reduce the cognitive load on users while dramatically expanding the range and sophistication of text transformations they can easily apply.

These user interface enhancements may be used in concert with other features disclosed herein, such as the existing generative cut and paste functionality and action definition framework described earlier in this specification. Together, they represent a significant leap forward in making AI-assisted document editing more accessible, powerful, and adaptable to individual user needs and preferences.

Embodiments of the present invention may implement a feature that is referred to herein as "generative drag." Generative drag represents an extension or particular implementation of the generative cut and paste functionality previously disclosed herein. At its core, the generative drag feature allows users to apply any of the text transformations disclosed herein, using any of the action definitions disclosed herein, during the process of dragging text from one location to another within a document or between different documents. Unlike traditional drag operations that simply move or copy text, this feature applies an action definition to the dragged text, resulting in transformed content being inserted at the destination, rather than the original selected source text. Although the term "generative" is used in connection with embodiments of the generative drag feature as a shorthand, it should be understood that particular embodiments of the generative drag feature need not use generative AI, but may instead apply any kind of action definition disclosed herein to the original (selected) content to generate the destination content, whether or not that action definition uses generative AI.

The basic workflow of the generative drag Feature is as follows:

User Selection: The user selects text in a document using any selection method.

Drag Initiation: Instead of a standard drag, the user initiates a "generative drag" operation. This may, for example, be done through a modified drag gesture, by selecting a specific option, or by default.

Action Definition Selection: Before, during, or after the drag operation, the system selects an action definition to apply to the dragged text. This may be done, for example, in any of the ways disclosed herein in connection with generative cut and paste.

Text Processing: The system applies the selected action definition to the dragged text, generating new content based on the original text and the action definition.

Destination Insertion: When the user releases the drag at the destination location, the system inserts the generated text rather than the original dragged text. More generally, when the user releases the drag at the destination location, the system may perform any of the actions disclosed herein in connection with a generative paste operation, such as providing the user with the ability to review and approve of the generated text before that text is inserted at the destination location.

Although the generative drag feature may include many of the features of embodiments of the generative cut and paste invention disclosed herein, the generative drag feature may build upon and extends the generative cut and paste functionality in any of a variety of ways, such as the following:

Seamless Integration: While generative cut and paste may include separate cut and paste actions, the generative drag feature combines these operations into a single, fluid interaction.

Real-time Processing: The feature enables the application of generative transformations in real-time as the user drags the text, providing immediate visual feedback.

Context-Aware Transformations: By leveraging the drag operation's spatial context, the system may dynamically select and apply different action definitions based on the current position of the dragged text within the document.

Enhanced User Experience: The feature makes complex text transformations more intuitive and accessible by integrating them into the familiar drag-and-drop paradigm.

By extending the generative cut and paste functionality in this manner, the generative drag feature represents a significant advancement in how users can interact with and manipulate text using AI-driven transformations within familiar document editing workflows.

The generative drag feature incorporates an innovative capability for dynamic action selection based on the context of the current drag location. This advanced functionality enables the system to intelligently adapt text transformations in real-time as the user drags selected text across different parts of a document. Key aspects of this dynamic action selection include:

Context-Aware Processing: As the user drags the selected text across the document, the system analyzes the context of the potential destination areas, such as the current location of the cursor while dragging. This context awareness allows for more intelligent and relevant transformations based on the surrounding content.

Real-Time Action Definition Selection: The system dynamically selects different action definitions to apply to the dragged text based on the changing context. This selection process may occur continuously during the drag operation, allowing for adaptive transformations.

Continuous Processing: The system may apply these dynamically selected action definitions to the dragged text in real-time. This ongoing processing enables the system to adapt its transformations as the potential destination changes throughout the drag operation.

Preview Mode: The results of these real-time transformations may be displayed in a preview mode, allowing the user to see how the dragged text would be transformed if dropped at the current cursor location. This preview may update in real-time as the drag operation continues across different parts of the document.

This dynamic action selection feature leverages the system's existing capabilities for contextual awareness and real-time processing, applying them in a novel way to the drag-and-drop paradigm. It combines the ability to consider the context of both source and destination documents with real-time content processing capabilities to create a highly dynamic and interactive content transformation experience.

The feature significantly enhances the user experience by providing immediate visual feedback on potential content transformations. This allows users to make more informed decisions about where to place transformed content within their documents. It also demonstrates the system's ability to perform complex, context-aware operations seamlessly within familiar user interface paradigms, further integrating advanced AI capabilities into standard document editing workflows.

The following are some examples of how the dynamic action selection would work in practice as a user drags text across different document sections:

Varying Complexity Levels: As a user drags a complex technical explanation across different sections of a document:
  When dragged over an introductory section, the system might select an action definition for simplifying technical content. The preview would show the dragged text transformed into a more accessible explanation, with technical jargon replaced by simpler terms.
  Moving to a mid-level section, the system could select a different action definition. The preview would show the original text slightly simplified, retaining some technical details but explaining them more thoroughly.
  When dragged over an advanced section, the system might select an action definition for expanding and detailing technical content. The preview would show the original text enhanced with additional technical details and perhaps relevant equations or diagrams.

Language Translation: When dragging text across multilingual sections of a document: The system could dynamically translate the content to match the language of each section. This would be particularly useful for creating multilingual documents or localizing content.

Tone and Style Adaptation: As the user drags text between formal and informal sections of a document: The system could adjust the tone and style accordingly. For example, dragging text from a technical report into a marketing brochure could result in a preview showing a more engaging, customer-friendly version of the content.

Data Visualization: When dragging numerical data across different sections: The system could dynamically generate appropriate charts or graphs based on the context of the destination. For instance, dragging sales figures into an executive summary might produce a preview showing a concise bar chart, while dragging the same data into a detailed analysis section could generate a preview of a more comprehensive line graph.

Citation and Reference Management: In academic writing, as the user drags text from source materials across the document: The system could automatically generate properly formatted citations based on the citation style of the destination section (e.g., APA, MLA, Chicago), with the preview updating accordingly.

These examples demonstrate how the dynamic action selection feature can intelligently transform content based on document context, enhancing document coherence and user productivity throughout the drag operation.

The system may use any of a variety of types of context to dynamically select action definitions as the user drags text across different sections of a document. Some examples include:

Document Structure: The system may analyze the structure of the document, such as headings, subheadings, and section types (e.g., introduction, methodology, conclusion) to select appropriate action definitions.

Content Complexity: The system may assess the complexity level of the surrounding text to determine whether to simplify or elaborate on the dragged content.

Writing Style and Tone: The context of formal versus informal sections may trigger different action definitions to adjust the style and tone of the dragged text accordingly.

Target Audience: The system may consider the intended audience for different sections of the document (e.g., technical experts vs. general readers) to select appropriate transformations.

Language and Localization: In multilingual documents, the system may detect the language of different sections to apply appropriate translation or localization action definitions.

Data Presentation: When dragging numerical data, the context of surrounding visual elements or data presentation styles may inform the selection of appropriate data visualization action definitions.

Citation Styles: In academic or legal documents, the system may detect different citation styles used in various sections to apply appropriate formatting to dragged references.

Technical Jargon: The presence or absence of technical terminology in the surrounding text may trigger action definitions to either introduce or simplify technical concepts.

Emotional Tone: The system may analyze the emotional context of different sections to adjust the tone of the dragged text (e.g., more empathetic, more assertive).

Time-based Context: In documents discussing historical or future events, the system may consider the temporal context to adjust tenses or add relevant time-based information to the dragged text.

These context-aware selections enable the system to provide highly relevant and adaptive transformations as users interact with their documents through the generative drag feature.

The following is a detailed walkthrough of a specific sequence of steps the system may perform during a particular instance of a generative drag and drop operation:

Initial Text Selection: The user selects a complex technical explanation within a document using standard GUI selection methods.

Drag Initiation: The user initiates a "generative drag" operation, perhaps by holding a specific key while dragging or selecting a "generative drag" option from a context menu.

First Intermediate Location—Introductory Section: As the user drags the selected text over an introductory section of the document:
  a. Context Analysis: The system analyzes the surrounding text and determines it's an introductory section aimed at a general audience.
  b. Action Definition Selection: Based on this context, the system selects an action definition for simplifying technical content.
  c. Text Processing: The system applies the selected action definition to the dragged text, generating a simplified version.
  d. Preview Display: The system displays a preview showing the dragged text transformed into a more accessible explanation, with technical jargon replaced by simpler terms.

Second Intermediate Location—Mid-level Section: As the user continues dragging to a mid-level section:
  a. Context Analysis: The system detects that this section contains moderately complex content.
  b. Action Definition Selection: The system selects a different action definition suitable for maintaining some technical details while providing thorough explanations.
  c. Text Processing: The system applies this new action definition to the original dragged text.
  d. Preview Update: The preview updates to show the original text slightly simplified, retaining some technical details but explaining them more thoroughly.

Final Destination—Advanced Section: The user finally drags the text to an advanced section of the document:
  a. Context Analysis: The system recognizes this as a highly technical section based on the surrounding content.
  b. Action Definition Selection: The system selects an action definition for expanding and detailing technical content.
  c. Text Processing: The system applies this action definition to the original dragged text.
  d. Preview Update: The preview now shows the original text enhanced with additional technical details and perhaps relevant equations or diagrams.

Drop Operation: When the user releases the drag in the advanced section:
  a. Final Processing: The system performs a final application of the currently selected action definition (for expanding and detailing technical content).
  b. Insertion: The system inserts the final transformed text at the drop location, replacing the original dragged text with the expanded and detailed version.

Throughout this process, the system continuously performs context analysis, action definition selection, text processing, and preview updating in real-time as the user drags the text across different sections of the document. This dynamic, context-aware transformation allows users to see how their content would be adapted to different parts of the document, enabling them to make informed decisions about content placement and transformation.

Embodiments of the present invention system incorporate one or more gesture-based interactions designed specifically for touch-enabled devices. These intuitive gestures enhance the user experience by providing efficient and natural ways to apply sophisticated text transformations. The gesture-based interactions may seamlessly integrate with the generative text transformation capabilities disclosed herein, allowing users to manipulate content with greater ease and precision.

The touch-based gestures described in herein may be utilized to initiate, terminate, or control various features of embodiments of the invention. These gestures provide an intuitive and efficient means of interaction for users on touch-enabled devices, enhancing the overall user experience and productivity. Touch-based gestures may be employed to control a wide range of features within embodiments of the invention, including but not limited to:

Selecting Source Text: Users can employ gestures such as double-tap and drag or long-press and select to choose source text for transformation.

Selecting Destination Text: Similar gestures may be used to designate destination text, with the added capability of multi-finger gestures for non-contiguous selection.

Selecting Action Definitions: Users can access and choose action definitions through gestures like circular motions or multi-finger swipes, potentially bringing up context-sensitive menus for more precise selection.

Applying Action Definitions: Pinch and spread gestures, as well as directional swipes, may be used to apply selected action definitions to text, with the intensity or distance of the gesture potentially controlling the degree of transformation.

Initiating Generative Drag Operations: A modified drag gesture, such as a two-finger drag, could be used to initiate a generative drag operation, distinguishing it from standard text movement.

Controlling Real-time Previews: During a generative drag operation, users could use gestures like pinch and spread to adjust the level of transformation preview in real-time.

Navigating Through Transformation History: Swipe gestures could be employed to move back and forth through the history of applied transformations, similar to undo and redo functionalities.

Adjusting Context Sensitivity: Multi-finger rotate gestures could be used to fine-tune the context sensitivity of dynamic action selection during drag operations.

Switching Between Painting Configurations: Users could employ specific gestures to quickly switch between different painting configurations, enhancing the flexibility of the generative text painter feature.

Initiating and Terminating Painting Mode: A designated gesture, such as a three-finger tap, could be used to enter or exit the painting mode.

By mapping these core functionalities to intuitive touch gestures, embodiments of the invention provide a seamless and efficient interface for users to interact with complex text transformation features. This gesture-based control system integrates smoothly with the existing generative cut and paste and text painting capabilities, further enhancing the user's ability to manipulate and transform text in sophisticated ways using touch-enabled devices.

The touch-based gestures described herein may be replaced or complemented by camera-captured movements (e.g., hand signs) and gestures detected through computer vision systems. Such vision-based input methods may include one or more of the following:

Hand signs and gestures captured by device cameras
Motion tracking of hand movements in three-dimensional space
Finger position and orientation detection
Dynamic gesture recognition
Combined hand and arm movement tracking These camera-captured inputs may be used to control the same functions as touch gestures, including but not limited to:

Selecting source and destination text through spatial hand movements
Choosing action definitions via specific hand signs
Controlling real-time previews through gesture-based manipulation
Navigating through transformation options using hand motions
Approving or rejecting generated content through defined hand signals The system may implement vision-based gesture recognition through:

Real-time camera feed processing
Computer vision algorithms for hand tracking
Machine learning models for gesture classification
Multi-camera setups for improved accuracy
Integration with existing device camera systems Examples of specific categories and types of gestures that may be implemented within embodiments of the present invention include the following:

Pinch and Spread Gestures: Pinch and spread gestures provide an intuitive way for users to perform opposing or contrary actions, such as summarizing or expand text content.
  High-Level Application: These gestures may, for example, metaphorically represent the compression or expansion of information, making them naturally suited for summarization and elaboration tasks.
  Specific Examples:
    Pinch: Triggers a summarization action, compressing the selected text into a shorter form.
    Spread: Initiates an expansion action, adding more detail or elaboration to the selected text.
  Additional Applications:
    Abstraction and Concretization: Pinching could make the selected text more abstract or general, while spreading could make it more concrete with specific examples or details.
    Compression and Decompression: Pinching could compress technical jargon into simpler terms, while spreading could decompress simplified explanations into more detailed, technical versions.

Swipe Gestures: Swipe gestures in different directions may be used to adjust various aspects of the text, such as formality, complexity, and perspective.
  High-Level Application: Directional swipes provide a natural mapping for adjusting text along various spectrums or dimensions of style and content.
  Specific Examples:
    Swipe Up: Increases the formality or complexity of the text, metaphorically "elevating" the language.
    Swipe Down: Simplifies or makes the text more casual, "bringing it down" to a more accessible level.
    Swipe Left and Right: Can be used for perspective shifts or time navigation within the content.
  Additional Applications:
    Emotional Intensity: Swiping up could intensify the emotional tone of the text, while swiping down could tone down the emotional content for a more neutral presentation.
    Temporal Scale: For time-based content, swiping up could extend the timeframe discussed (e.g., from years to decades), while swiping down could narrow the timeframe (e.g., from years to months).

Circular Motions: Circular gestures may be used, for example, for rephrasing text or cycling through different versions of content.
  High-Level Application: The circular motion intuitively represents cycling or rotation, making it suitable, for example, for iterating through variations or versions of text.
  Specific Examples:
    Clockwise: Triggers an action to rephrase or rewrite the selected text.
    Counterclockwise: Reverts the text to its original form.
  Additional Applications:
    Version Cycling: A circular motion could cycle through different versions or iterations of the text, allowing users to quickly compare alternatives.
    Style Rotation: Circular gestures could be used to cycle through different writing styles (e.g., formal, casual, technical, creative) for the selected text.

Multi-finger Gestures: Multi-finger gestures enable more complex or significant transformations of text content.

High-Level Application: By using multiple fingers, users can access a wider range of transformations or more nuanced controls over text modifications.

Specific Examples:

Two-Finger Rotate: Adjusts the tone or style of the text more precisely. For example, rotating clockwise could gradually increase formality, while counterclockwise rotation could make the text more casual.

Three-Finger Swipe: Used for more significant transformations, such as complete genre changes or format conversions.

Additional Applications:

Contextual Zooming: A multi-finger pinch or spread could "zoom out" to provide a high-level overview of a concept or "zoom in" to explore intricate details or sub-components.

Perspective Shifting: Multi-finger swipes in different directions could shift the text's perspective (e.g., from first-person to third-person, or from a local to a global viewpoint).

These gesture categories provide users with intuitive and efficient ways to apply sophisticated text transformations using touch-enabled devices. By mapping complex operations to simple gestures, the system enhances user experience and productivity in document editing environments.

The particular gesture categories, and their uses, described herein are merely examples. More generally, any gesture or gesture category may be mapped to and used to perform any action.

In the context of action definitions, a "parameter" refers to a variable or placeholder within the action definition may can be customized or adjusted to modify the behavior of the text transformation. Parameters allow for greater flexibility and fine-tuning of the generative processes. (Note that any description herein of parameters in action definitions is equally applicable to parameters in paint configurations.) Here are various examples of a "parameter" of an action definition:

Complexity Level: A parameter that controls the level of complexity in the transformed text. This may, for example, range from simple language for general audiences to highly technical jargon for specialists.

Formality Scale: A parameter that adjusts the formality of the language, ranging from casual to highly formal tones.

Summarization Ratio: A parameter that determines the degree of text compression when summarizing, such as reducing the text to 25%, 50%, or 75% of its original length.

Emotional Intensity: A parameter that controls the emotional tone of the text, from neutral to highly emotive language.

Time Frame Adjustment: For content discussing events or trends, a parameter may, for example, adjust the time scale, such as expanding a discussion from years to decades or narrowing it from years to months.

Perspective Shift: A parameter that alters the point of view in the text, such as switching between first-person, second-person, or third-person perspectives.

Cultural Context: A parameter that adapts the content for different cultural contexts, adjusting references, idioms, or examples to be more relevant to specific cultural backgrounds.

Technical Detail Level: For technical documents, a parameter may, for example, control the depth of technical information included, from high-level overviews to in-depth explanations.

Language Model: A parameter that specifies the language model or language model family to process the action definition and data (e.g., a processed prompt) generated based on the action definition.

Language Model Temperature: A parameter that adjusts the randomness or creativity of the language model's output, affecting how conventional or unique the generated text appears.

Citation Style: In academic or legal writing, a parameter may, for example, specify the desired citation style (e.g., APA, MLA, Chicago) for automatic formatting of references.

Data Visualization Type: For text containing numerical data, a parameter may, for example, specify the type of chart or graph to be generated (e.g., bar chart, line graph, pie chart).

Argument Emphasis: A parameter that controls which aspects of an argument are emphasized, such as focusing on supporting evidence, addressing counterarguments, or highlighting limitations.

The values of these parameters may, for example, be adjusted using the gesture-based interactions described herein, allowing users to fine-tune the text transformations according to their specific needs and preferences.

Specific examples of using gestures to select parameter values include:

Swiping left and right: Swiping left may decrease a parameter value, while swiping right may increase it. For instance, when adjusting the level of text simplification, a left swipe may, for example, make the text more complex, while a right swipe may, for example, further simplify it.

Pinch and spread gestures: Pinching may, for example, reduce a parameter value, while spreading may, for example, increase it. This may, for example, be used to adjust the level of detail in a summary, with pinching creating a more concise summary and spreading expanding it.

Circular motions: Clockwise circular motions may, for example, incrementally increase a parameter value, while counterclockwise motions may, for example, decrease it. This may, for example, be used to fine-tune the formality level of text, with clockwise motions increasing formality and counterclockwise motions decreasing it.

Multi-finger gestures: Two-finger rotate gestures may, for example, be used for more precise parameter adjustments. For example, rotating clockwise with two fingers may, for example, gradually increase the emotional intensity of the text, while counterclockwise rotation may, for example, decrease it.

The benefits of using gesture input for user-selectable parameter values include:

Intuitive control: Gestures provide a natural and intuitive way for users to adjust parameters, making the interface more user-friendly and reducing the learning curve.

Fine-grained adjustments: Continuous gestures like circular motions or two-finger rotations allow for precise control over parameter values, enabling users to fine-tune transformations to their exact specifications.

Rapid experimentation: Gesture-based parameter adjustment allows users to quickly try different values and see the results in real-time, facilitating efficient exploration of various text transformations.

Contextual adaptation: When combined with the dynamic action selection feature, gesture-based parameter adjustment enables users to quickly adapt transformations to different document contexts as they work.

Enhanced accessibility: Gesture-based parameter selection can be particularly beneficial for users with certain motor impairments who may find traditional input methods challenging.

Seamless workflow integration: By incorporating parameter adjustment into the existing gesture-based interaction system, users can modify action definitions without interrupting their editing workflow.

This gesture-based approach to parameter value selection further enhances the system's ability to provide sophisticated, customizable text transformations while maintaining an intuitive and efficient user interface.

While gesture-based input provides an intuitive way to set action definition parameter values, it is important to note that embodiments of the present invention may enable users to set these values through various other input methods as well. As a result, any use disclosed herein of gesture-based input to perform a particular function (such as setting a parameter value) may alternatively be implemented using a non-gesture-based input. Examples of non-gesture input methods for setting action definition parameter values include:

Slider controls: Users may, for example, adjust parameter values using graphical slider controls in the user interface, allowing for precise numerical adjustments.

Dropdown menus: For parameters with discrete options, dropdown menus may, for example, provide a list of pre-defined values for users to select from.

Text input fields: Users may, for example, directly enter numerical or textual values for parameters, offering maximum precision and flexibility.

Radio buttons or checkboxes: For binary or multi-choice parameters, radio buttons or checkboxes may, for example, allow users to quickly toggle between options.

Voice commands: In systems with voice recognition capabilities, users may, for example, adjust parameter values through spoken instructions.

Keyboard shortcuts: Power users may, for example, use keyboard combinations to incrementally adjust parameter values or cycle through preset options.

Context menus: Right-clicking on selected text may, for example, bring up a context menu with options to adjust relevant parameter values.

Toolbar or ribbon interface: Dedicated controls for common parameter adjustments may, for example, be integrated into the application's main toolbar or ribbon interface.

The ability to set parameter values in response to user input aligns with the overarching benefit of certain embodiments of the present invention of providing users with precise control over text transformations. This feature enhances the user's ability to fine-tune transformations beyond what may be achievable (or easily achievable) through text selection and action definition choice alone.

By incorporating user input-based (e.g., gesture-based) parameter adjustments, embodiments of the present invention may offer users a more granular level of control over the transformation process. This fine-grained control allows users to tailor the output more precisely to their specific needs and preferences, resulting in more accurate and contextually appropriate transformations.

The user input-based approach to parameter adjustment provides several benefits that reinforce the following:

Intuitive Control: Users can make nuanced adjustments to transformations using various input methods, maintaining a seamless and user-friendly interface.

Real-time Feedback: As users adjust parameters through their chosen input method, they can immediately see the effects on the transformed text, allowing for rapid experimentation and refinement.

Contextual Adaptation: When combined with the dynamic action selection feature, user input-based parameter adjustment enables users to quickly adapt transformations to different document contexts as they work, providing even greater control over the final output.

Workflow Integration: By incorporating parameter adjustments into the existing interaction system, users can modify action definitions without interrupting their editing workflow, further enhancing their control over the transformation process.

This additional layer of control through user input-based parameter adjustment reinforces the invention's commitment to providing users with powerful, flexible, and intuitive tools for AI-assisted document editing.

The user interface enhancements described herein may complement and extend other features disclosed herein, such as the generative cut and paste functionality previously disclosed herein. These enhancements may seamlessly integrate text manipulation capabilities (such as those using LLMs and/or other forms of generative AI) into familiar document editing workflows, making the application of sophisticated text transformations more intuitive, efficient, and flexible for users.

Key ways these enhancements complement other functionality disclosed herein include:

Generative Drag Feature: This feature may extend the generative cut and paste functionality to drag operations in a graphical user interface. It allows users to apply action definitions dynamically as they drag text across a document, with the transformed output inserted at the destination. This provides a more fluid and intuitive way to apply transformations compared to separate copy and paste actions.

Dynamic Action Selection: Building on the generative drag capability, the system may intelligently select and apply different action definitions in real-time based on the context of where the text is being dragged. This enables highly context-aware transformations that adapt to different sections of a document, enhancing the flexibility and power of the existing generative capabilities.

Enhanced Touch Gestures: The suite of touch-based interactions implemented for touch-enabled devices provides new ways to access and control the generative text transformation capabilities. These gestures, such as pinch and spread, directional swipes, and multi-finger gestures, make it easier and more intuitive for users to apply transformations, especially on mobile devices.

Real-time Preview and Application: The ability to see and evaluate the effects of different generative actions on text in real-time as users interact with the document enhances the usability of the existing generative features. This includes the ability to compare multiple transformations simultaneously in different views, allowing for more informed decision-making when applying transformations.

The new user interface enhancements may create synergies with the existing action definitions and painting configurations in several ways, such as:

Expanded Accessibility: The gesture-based interactions and generative drag feature make it easier for users to access and apply existing action definitions and painting configurations. For example, users may apply these transformations through intuitive touch gestures or by dragging text across different document sections.

Context-Aware Application: The dynamic action selection feature allows the system to automatically choose appropriate action definitions or painting configurations based on the context of the document (e.g., the document text at or surrounding the current cursor location). This creates a synergy where the existing library of transformations may be applied more intelligently and contextually.

Enhanced Customization: The user interface enhancements disclosed herein allow for more nuanced control over how action definitions and painting configurations are applied. For instance, the intensity or distance of a gesture may control the degree of transformation, allowing for finer adjustments to existing transformations.

Workflow Integration: The generative drag feature and touch gestures integrate seamlessly with the existing painting mode, allowing users to switch between different painting configurations or enter/exit the painting mode using specific gestures. This creates a more cohesive and efficient workflow for applying text transformations.

Real-time Adaptation: The real-time preview capabilities synergize with existing action definitions by allowing users to see how different transformations would affect their text before committing to changes. This can help users make more informed decisions about which action definitions or painting configurations to apply.

By integrating these new interface enhancements with the existing generative cut and paste functionality, action definitions, and painting configurations, the system provides a more powerful, flexible, and user-friendly platform for AI-assisted document editing. These synergies enhance the overall capability of the system to perform complex, context-aware operations seamlessly within familiar user interface paradigms.

The user interface enhancements disclosed herein may be used to significantly improve workflow efficiency for users engaging in document editing. These improvements may include any one or more of the following features:

Generative Drag Feature: This feature streamlines the process of applying text transformations by combining the selection, transformation, and placement of text into a single, fluid interaction. Users may apply complex transformations as they move text within a document, reducing the number of steps required and increasing overall efficiency.

Dynamic Action Selection: By automatically selecting and applying appropriate action definitions based on the document context during drag operations, this feature reduces the cognitive load on users. They no longer need to manually choose the most suitable transformation for each section of the document, allowing for faster and more intuitive content adaptation.

Gesture-Based Interactions: The implementation of intuitive touch gestures for common text transformation tasks allows users to quickly apply sophisticated changes without navigating through menus or selecting multiple options. This direct manipulation approach can significantly speed up the editing process, especially on touch-enabled devices.

Real-time Preview and Application: The ability to see immediate previews of text transformations as they are being applied allows users to make quick decisions about content placement and modification. This real-time feedback reduces the need for trial-and-error approaches, streamlining the editing process.

Seamless Integration with Existing Features: By integrating these new enhancements with the existing generative cut and paste functionality and painting configurations, the system provides a cohesive and efficient workflow for applying text transformations. Users can smoothly transition between different editing modes and techniques, reducing context switching and improving overall productivity.

The user interface enhancements disclosed herein may also address several accessibility considerations, making the system more inclusive and usable for a wider range of users:

Touch-Based Interactions: The implementation of gesture-based controls provides an alternative input method for users who may have difficulty with traditional mouse and keyboard interfaces. This can be particularly beneficial for users with certain motor impairments.

Customizable Gesture Sensitivity: The system may allow users to adjust the sensitivity of gesture-based interactions, accommodating users with different levels of motor control or touch accuracy.

Multi-Modal Interaction: By offering multiple ways to perform text transformations (e.g., through gestures, drag operations, or traditional menu selections), the system may cater to users with different preferences and abilities.

Visual Feedback: The real-time preview feature provides immediate visual feedback on text transformations, which can be particularly helpful for users who rely on visual cues for understanding system behavior.

Reduced Cognitive Load: Features like dynamic action selection and context-aware transformations can reduce the cognitive effort required to use the system effectively. This can be beneficial for users with cognitive impairments or those who find complex interfaces challenging.

Voice Integration: The system's flexible architecture may accommodate voice commands for text transformation, further improving accessibility for users with visual or motor impairments.

By improving workflow efficiency and considering accessibility, these user interface enhancements make the AI-assisted document editing system more effective, intuitive, and inclusive for a diverse range of users.

In some embodiments, the techniques described herein relate to a method performed by at least one computer processor executing computer program instructions stored on at least one non-transitory computer-readable medium, the method including: (A) receiving a selection of source text within a source document; (B) identifying a source action definition, wherein the source action definition is associated with a source action definition prompt; (C) applying the source action definition to the source text, including applying a large language model to the source action definition prompt and the source text to produce source text language model output; (D) receiving a selection of first destination text within a destination document; (E) in response to receiving the selection of the first destination text: (E)(1) identifying a first paint action definition based on the source text language model output; (E)(2) applying the first paint action definition to the first destination text to generate first painted text; and (E)(3) replacing the first destination text within the destination document with the first painted text.

Identifying the first paint action definition may include: selecting the first paint action definition from a plurality of stored paint action definitions based on the source text language model output.

Identifying the first paint action definition may include generating the first paint action definition by: selecting a base template from a plurality of stored templates; applying a second large language model to the base template and the source text language model output to generate a refined template; and generating the first paint action definition using the refined template.

Identifying the first paint action definition may include: generating a processed prompt by combining the source text language model output with the first destination text; wherein the first paint action definition includes the processed prompt.

The first paint action definition may include a first paint action definition prompt, and applying the first paint action definition to the first destination text to generate the first painted text may include providing the first paint action definition prompt and the first destination text to the large language model to generate the first painted text.

Receiving the selection of the source text within the source document may include receiving a user input dragging across the source text within a graphical user interface displaying the source document.

Receiving the selection of the first destination text may include receiving a user input dragging across the first destination text within a graphical user interface displaying the destination document.

A single graphical user interface may be both the graphical user interface displaying the source document and the graphical user interface displaying the destination document.

A single document may be both the source document and the destination document.

Applying the large language model to the source action definition prompt and the source text may include: generating a processed prompt based on the source action definition prompt and the source text; and providing the processed prompt as an input to the large language model.

The first paint action definition may be associated with a first paint action definition prompt; and (E)(2) may include: (E)(2)(a) applying the large language model to the first paint action definition prompt and the first destination text to produce first painted text language model output; and (E)(2)(b) generating the first painted text based on the first painted text language model output.

Applying the large language model to the first paint action definition prompt and the first destination text may include: generating a processed prompt based on the first paint action definition prompt and the first destination text; and providing the processed prompt as an input to the large language model.

Identifying the source action definition may include: presenting a user interface displaying manifestations of a plurality of source action definitions; and receiving a user input selecting one of the manifestations which corresponds to the source action definition.

Identifying the first paint action definition may include: presenting a user interface displaying manifestations of a plurality of paint action definitions; and receiving a user input selecting one of the manifestations which corresponds to the first paint action definition.

The method may further include: (F) receiving a user input to enter a painting mode; and (G) entering the painting mode in response to the user input to enter the painting mode; wherein (A), (B), (C), (D), and (E) are performed while in the painting mode.

Receiving the user input to enter the painting mode may include receiving a user input selecting a graphical user interface element associated with entering the painting mode.

The method may further include, while in the painting mode, and after (A), (B), (C), (D), (E), (F), and (G): (H) receiving a selection of second destination text within the destination document; (I) in response to receiving the selection of the second destination text: (I)(1) applying the first paint action definition to the second destination text to generate second painted text; and (I)(2) replacing the second destination text within the destination document with the second painted text.

The method may further include: (F) receiving a selection of second destination text within the destination document; (G) in response to receiving the selection of the second destination text: (G)(1) identifying a second paint action definition based on the source text language model output, wherein the first paint action definition differs from the second paint action definition; (G)(2) applying the second paint action definition to the second destination text to generate second painted text; and (G)(3) replacing the second destination text within the destination document with the second painted text.

In some embodiments, the techniques described herein relate to a non-transitory computer-readable medium having computer program instructions stored thereon, the computer program instructions being executable by at least one computer processor to perform a method, the method including: (A) receiving a selection of source text within a source document; (B) identifying a source action definition, wherein the source action definition is associated with a source action definition prompt; (C) applying the source action definition to the source text, including applying a large language model to the source action definition prompt and the source text to produce source text language model output; (D) receiving a selection of first destination text within a destination document; (E) in response to receiving the selection of the first destination text: (E)(1) identifying a first paint action definition based on the source text language model output; (E)(2) applying the first paint action definition to the first destination text to generate first painted text; and (E)(3) replacing the first destination text within the destination document with the first painted text.

In some embodiments, the techniques described herein relate to a computer-implemented method including: (A) receiving a user input to enter a painting mode; (B) entering the painting mode in response to the user input to enter the painting mode; (C) while in the painting mode: (C)(1) receiving a selection of source text within a document by receiving a user input dragging across the source text within a graphical user interface displaying the document; (C)(2) identifying a source action definition, wherein the source action definition is associated with a source action definition prompt; (C)(3) applying the source action definition to the source text, including applying a large language model to the source action definition prompt and the source text to produce source text language model output; (C)(4) receiving a selection of destination text within the document by receiving a user input dragging across the destination text within a graphical user interface displaying the document; (C)(5) in response to receiving the selection of the destination text: (C)(5)(a) identifying a paint action definition based on the source text language model output, wherein the paint action definition includes a paint action definition prompt; (C)(5)(b) applying the paint action definition to the destination text to generate painted text, including providing the paint action definition prompt and the destination text to the large language model to generate the painted text; and (C)(5)(c) replacing the destination text within the document with the painted text.

In some embodiments, the techniques described herein relate to a non-transitory computer-readable medium having computer program instructions stored thereon, the computer program instructions being executable by at least one computer processor to perform a method, the method including: (A) receiving a user input to enter a painting mode; (B) entering the painting mode in response to the user input to enter the painting mode; (C) while in the painting mode: (C)(1) receiving a selection of source text within a document by receiving a user input dragging across the source text within a graphical user interface displaying the document; (C)(2) identifying a source action definition, wherein the source action definition is associated with a source action definition prompt; (C)(3) applying the source action definition to the source text, including applying a large language model to the source action definition prompt and the source text to produce source text language model output; (C)(4) receiving a selection of destination text within the document by receiving a user input dragging across the destination text within a graphical user interface displaying the document; (C)(5) in response to receiving the selection of the destination text: (C)(5)(a) identifying a paint action definition based on the source text language model output, wherein the paint action definition includes a paint action definition prompt; (C)(5)(b) applying the paint action definition to the destination text to generate painted text, including providing the paint action definition prompt and the destination text to the large language model to generate the painted text; and (C)(5)(c) replacing the destination text within the document with the painted text.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may provide input to a language model, such as a large language model (LLM), to generate output. Such a function is inherently rooted in computer technology and cannot be performed mentally or manually. As another example, embodiments of the present invention may be used to automatically generate output using a language model, such as an LLM, and then to automatically update a computer-implemented document based on the output of the language model. As yet another example, embodiments of the present invention may be used to execute arbitrary scripts including conditional statements and loops. All of these functions are inherently rooted in computer technology, are inherently technical in nature, and cannot be performed mentally or manually. Furthermore, embodiments of the present invention constitute improvements to computer technology for using language models, such as LLMs, to generate improved output, and to generate such improved output more efficiently than state-of-the-art technology for the reasons provided herein.

The generative cut and paste features of embodiments of the present invention are necessarily rooted in computer technology, as they leverage computational capabilities to transform and manipulate digital content in ways that would be impossible or impractical to achieve through manual means. Key aspects that demonstrate the generative cut and paste features' inherent reliance on computer technology include:

Integration with Language Models: The generative cut and paste features may utilize large language models (LLMs) to process and generate text. These models, which can contain billions of parameters, require significant computational resources and are fundamentally tied to computer systems.

Real-time Content Processing: The generative cut and paste features perform complex text transformations during copy and paste operations in real-time, a feat that is only achievable through the use of advanced computer processing capabilities.

Dynamic Action Definitions: The generative cut and paste features support various types of action definitions, including tokenized prompts, compound prompts, and scripted prompts. These dynamic, programmable instructions are inherently computational in nature and rely on computer systems for execution and management.

Contextual Awareness: The generative cut and paste features' ability to consider the context of both source and destination documents during content transformation requires sophisticated data analysis and processing that can only be performed by computer systems.

Two-stage Processing: The generative cut and paste features' capability to perform separate generative processing during both copy and paste operations involves complex data handling and transformation that is uniquely suited to computer systems.

User Interface Integration: The seamless integration of AI-driven content manipulation within existing document editing interfaces requires intricate software engineering and is inherently tied to computer-based user interfaces.

Clipboard Management: The generative cut and paste features' ability to store and manage multiple versions of copied content (original and processed) in the clipboard is a function that relies on computer memory and data management systems.

Event-based Processing: The generative cut and paste features' ability to respond to various user inputs and trigger appropriate actions in real-time is rooted in event-driven programming paradigms specific to computer systems.

These features collectively demonstrate that the generative cut and paste features are not merely an automation of manual processes, but rather a novel system that is necessarily rooted in computer technology.

Furthermore, the generative cut and paste features of embodiments of the present invention represent a significant improvement to computer technology in several key aspects:

Enhanced Efficiency in Content Manipulation: The generative cut and paste features streamline the process of content transformation by integrating AI-driven processing directly into the familiar copy-paste workflow. This integration allows for complex content manipulations to be performed with minimal user input, significantly reducing the time and effort required compared to traditional methods.

Advanced Contextual Processing: The generative cut and paste features' ability to consider the context of both source and destination documents during content transformation represents a leap forward in intelligent content handling. This contextual awareness enables more relevant and coherent transformations, improving the quality of generated content in ways that were not previously possible with conventional copy-paste operations.

Flexible Two-Stage Processing: The generative cut and paste features' capability to perform separate generative processing during both copy and paste operations introduces a new level of flexibility in content manipulation. This two-stage approach allows for more sophisticated and nuanced transformations that can adapt to changing contexts between the source and destination documents.

Customizable AI Interactions: By supporting user-defined action definitions, ranging from simple prompts to complex scripted operations, the generative cut and paste features provide a level of customization in AI-assisted content manipulation that goes beyond what is typically available in existing technologies. This allows users to tailor the system's behavior to their specific needs and workflows.

Improved User Interface for AI Integration: The generative cut and paste features seamlessly integrate advanced AI capabilities into existing document editing interfaces, representing an improvement in how users interact with AI-assisted tools. This integration reduces the learning curve and cognitive load associated with adopting new AI technologies.

Enhanced Content Version Management: The generative cut and paste features' ability to maintain both original and processed versions of copied content in the clipboard represents an improvement in content version control within the copy-paste paradigm. This feature provides users with greater flexibility and safety in content manipulation.

Real-time Complex Text Transformations: The generative cut and paste features enable real-time processing of complex text transformations during copy and paste operations, leveraging advanced computational capabilities to perform tasks that would be impractical or impossible to achieve manually.

Scalable AI Integration: By building upon familiar copy-paste operations, the generative cut and paste features provide a scalable approach to integrating AI capabilities into document editing. This allows for gradual adoption of AI-assisted features, from simple transformations to complex, multi-step operations.

These improvements collectively enhance the capabilities of computer-based document editing systems, enabling more efficient, context-aware, and flexible content manipulation. The generative cut and paste features represent a significant step forward in integrating advanced AI technologies into everyday computing tasks, improving productivity and expanding the possibilities of digital content creation and editing.

The generative cut and paste features of embodiments of the present invention bring about a transformation of subject matter into a different state or thing in several significant ways:

Text Transformation: The generative cut and paste features transform selected text from its original form into a new, processed form through the application of AI-driven generative processing. This transformation may, for example, involve changes in content, style, tone, or structure of the text, effectively converting it from one state to another.

Clipboard Content Transformation: The generative cut and paste features transform the conventional clipboard content into processed clipboard content during the copy operation. This represents a change in the state of the clipboard data, from its original form to an AI-processed form.

Document Content Transformation: When the processed content is pasted into a document, it transforms the destination document's content, potentially altering its meaning, structure, or overall composition. This represents a transformation of the document from one state to another.

Multi-stage Transformation: The generative cut and paste features' two-stage processing capability allows for sequential transformations of content. The first transformation occurs during the copy operation, and a second transformation can occur during the paste operation. This multi-stage process can result in content that is significantly different from its original state.

Context-based Transformation: The generative cut and paste features' ability to consider the context of both source and destination documents during content transformation can result in adaptive changes to the text. This contextual transformation can produce content that is fundamentally different from the original, tailored to fit seamlessly into its new environment.

Non-contiguous Text Transformation: The generative cut and paste features allow for the selection and transformation of multiple non-contiguous blocks of text. This capability can result in the creation of new, coherent content from disparate parts of a document, effectively transforming disconnected text into a unified whole.

Format and Style Transformation: Through the use of custom action definitions, the generative cut and paste features can transform not only the content of the text but also its format and style. This can include changes in tone, formality, or even the conversion of text into different formats (e.g., from prose to bullet points).

These transformations demonstrate that the generative cut and paste features of embodiments of the present invention go beyond mere information transfer or simple text editing. Instead, they enable the creation of new content states and forms, representing a true transformation of subject matter from one state or thing into another.

Embodiments of the system 500 and method 600 transform subject matter into a different state or thing. For example, embodiments of the system 500 and method 600:

Text Transformation: The system transforms selected text from its original form into a new, processed form through AI-driven generative processing. This transformation may involve changes in content, style, tone, or structure of the text, effectively converting it from one state to another.

Document Content Transformation: When the processed content is pasted into a document, it transforms the destination document's content, potentially altering its meaning, structure, or overall composition. This represents a transformation of the document from one state to another.

Multi-stage Transformation: The system's two-stage processing capability allows for sequential transformations of content. The first transformation occurs during the copy operation, and a second transformation can occur during the paste operation. This multi-stage process can result in content that is significantly different from its original state.

Context-based Transformation: The system's ability to consider the context of both source and destination documents during content transformation can result in adaptive changes to the text. This contextual transformation can produce content that is fundamentally different from the original, tailored to fit seamlessly into its new environment.

These transformations demonstrate that embodiments of the system 500 and method 600 go beyond mere information transfer or simple text editing, enabling the creation of new content states and forms.

Embodiments of the system 500 and method 600 also solve problems necessarily rooted in computer technology and improves computer technology in several ways, such as:

Enhanced Efficiency in Content Manipulation: The system streamlines the process of content transformation by integrating AI-driven processing directly into the familiar copy-paste workflow. This integration allows for complex content manipulations to be performed with minimal user input, significantly reducing the time and effort required compared to traditional methods.

Advanced Contextual Processing: The system's ability to consider the context of both source and destination documents during content transformation represents a leap forward in intelligent content handling. This contextual awareness enables more relevant and coherent transformations, improving the quality of generated content in ways that were not previously possible with conventional copy-paste operations.

Flexible Two-Stage Processing: The capability to perform separate generative processing during both copy and paste operations introduces a new level of flexibility in content manipulation. This two-stage approach allows for more sophisticated and nuanced transformations that can adapt to changing contexts between the source and destination documents.

Customizable AI Interactions: By supporting user-defined action definitions, ranging from simple prompts to complex scripted operations, the system provides a level of customization in AI-assisted content manipulation that goes beyond what is typically available in existing technologies.

Improved User Interface for AI Integration: The system seamlessly integrates advanced AI capabilities into existing document editing interfaces, representing an improvement in how users interact with AI-assisted tools. This integration reduces the learning curve and cognitive load associated with adopting new AI technologies.

Real-time Complex Text Transformations: The system enables real-time processing of complex text transformations during copy and paste operations, leveraging advanced computational capabilities to perform tasks that would be impractical or impossible to achieve manually.

These improvements collectively enhance the capabilities of computer-based document editing systems, enabling more efficient, context-aware, and flexible content manipulation.

The generative drag operation disclosed herein may include one or more of the following features:

Improvement to Computer Technology: The generative drag operation may enhance existing drag-and-drop functionality in computer systems by incorporating real-time, context-aware text transformations. This represents a significant improvement over traditional drag-and-drop operations, which typically only move or copy content without modification.

Necessarily Rooted in Computer Technology: The operation may leverage advanced computational capabilities, such as real-time processing of complex text transformations and integration with large language models, which are inherently tied to computer technology. These features cannot be performed manually or mentally, making the generative drag feature necessarily rooted in computer technology.

Transformation of Subject Matter: The generative drag operation transforms the selected text from its original form into a new, processed form, such as by using AI-driven generative processing. This transformation may involve changes in content, style, tone, or structure of the text, effectively converting it from one state to another.

Real-time Processing and Feedback: The system's ability to perform complex text transformations in real-time during the drag operation and provide immediate visual feedback through previews demonstrates a level of processing speed and interactivity that is only achievable through advanced computer technology.

Context-aware Adaptations: The generative drag operation's ability to consider the context of both the current drag location and the final destination for selecting and applying appropriate transformations represents a sophisticated level of analysis and decision-making that goes beyond well-understood, routine, and conventional computer functions.

Integration of AI Capabilities: By seamlessly incorporating generative AI capabilities into familiar user interface paradigms, the generative drag operation represents a novel approach to human-computer interaction in document editing workflows.

Dynamic Multi-stage Processing: The generative drag operation's ability to perform separate generative processing during both the drag operation and at the final destination introduces a new level of flexibility in content manipulation that is uniquely suited to computer systems.

These features collectively demonstrate that the generative drag operation is not merely an abstract idea implemented on a computer, but a technological innovation that leverages advanced computational capabilities to provide a novel and useful tool for document editing. The operation's ability to dynamically transform content based on context, provide real-time feedback, and seamlessly integrate AI-driven processes into familiar user interactions represents a significant advancement in the field of computer-assisted document editing.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method performed by at least one computer processor executing computer program instructions stored on at least one non-transitory computer-readable medium, the method comprising:
    (A) receiving a selection of source text within a source document;
    (B) identifying a source action definition, wherein the source action definition is associated with a source action definition prompt;
    (C) applying the source action definition to the source text, comprising applying an autoregressive large language model to the source action definition prompt and the source text to produce source text language model output;
    (D) receiving a selection of first destination text within a destination document;

(E) in response to receiving the selection of the first destination text:
(E) (1) identifying a first paint action definition based on the source text language model output;
applying the first paint action definition to (E) (2) the first destination text to generate first painted text; and
(E) (3) replacing the first destination text within the destination document with the first painted text.

2. The method of claim 1, wherein identifying the first paint action definition comprises:
selecting the first paint action definition from a plurality of stored paint action definitions based on the source text language model output.

3. The method of claim 1, wherein identifying the first paint action definition comprises generating the first paint action definition by:
selecting a base template from a plurality of stored templates;
applying a second large language model to the base template and the source text language model output to generate a refined template; and
generating the first paint action definition using the refined template.

4. The method of claim 1, wherein identifying the first paint action definition comprises:
generating a processed prompt by combining the source text language model output with the first destination text;
wherein the first paint action definition comprises the processed prompt.

5. The method of claim 1:
wherein the first paint action definition comprises a first paint action definition prompt, and
wherein applying the first paint action definition to the first destination text to generate the first painted text comprises providing the first paint action definition prompt and the first destination text to the large language model to generate the first painted text.

6. The method of claim 1, wherein receiving the selection of the source text within the source document comprises receiving a user input dragging across the source text within a graphical user interface displaying the source document.

7. The method of claim 1, wherein receiving the selection of the first destination text comprises receiving a user input dragging across the first destination text within a graphical user interface displaying the destination document.

8. The method of claim 7, wherein a single graphical user interface is both the graphical user interface displaying the source document and the graphical user interface displaying the destination document.

9. The method of claim 1, wherein a single document is both the source document and the destination document.

10. The method of claim 1, wherein applying the large language model to the source action definition prompt and the source text comprises:
generating a processed prompt based on the source action definition prompt and the source text; and
providing the processed prompt as an input to the large language model.

11. The method of claim 1:
wherein the first paint action definition is associated with a first paint action definition prompt; and
wherein (E) (2) comprises:
(E) (2) (a) applying the large language model to the first paint action definition prompt and the first destination text to produce first painted text language model output; and
(E) (2) (b) generating the first painted text based on the first painted text language model output.

12. The method of claim 11, wherein applying the large language model to the first paint action definition prompt and the first destination text comprises:
generating a processed prompt based on the first paint action definition prompt and the first destination text; and
providing the processed prompt as an input to the large language model.

13. The method of claim 1, wherein identifying the source action definition comprises:
presenting a user interface displaying manifestations of a plurality of source action definitions; and
receiving a user input selecting one of the manifestations which corresponds to the source action definition.

14. The method of claim 1, wherein identifying the first paint action definition comprises:
presenting a user interface displaying manifestations of a plurality of paint action definitions; and
receiving a user input selecting one of the manifestations which corresponds to the first paint action definition.

15. The method of claim 1, further comprising:
(F) receiving a user input to enter a painting mode; and
(G) entering the painting mode in response to the user input to enter the painting mode;
wherein (A), (B), (C), (D), and (E) are performed while in the painting mode.

16. The method of claim 15, wherein receiving the user input to enter the painting mode comprises receiving a user input selecting a graphical user interface element associated with entering the painting mode.

17. The method of claim 15, further comprising, while in the painting mode, and after (A), (B), (C), (D), (E), (F), and (G):
(H) receiving a selection of second destination text within the destination document;
(I) in response to receiving the selection of the second destination text:
(I) (1) applying the first paint action definition to the second destination text to generate second painted text; and
(I) (2) replacing the second destination text within the destination document with the second painted text.

18. The method of claim 1, further comprising:
(F) receiving a selection of second destination text within the destination document;
(G) in response to receiving the selection of the second destination text:
(G) (1) identifying a second paint action definition based on the source text language model output, wherein the first paint action definition differs from the second paint action definition;
(G) (2) applying the second paint action definition to the second destination text to generate second painted text; and
(G) (3) replacing the second destination text within the destination document with the second painted text.

19. A non-transitory computer-readable medium having computer program instructions stored thereon, the computer program instructions being executable by at least one computer processor to perform a method, the method comprising:
(A) receiving a selection of source text within a source document;

(B) identifying a source action definition, wherein the source action definition is associated with a source action definition prompt;
(C) applying the source action definition to the source text, comprising applying an autoregressive large language model to the source action definition prompt and the source text to produce source text language model output;
(D) receiving a selection of first destination text within a destination document;
(E) in response to receiving the selection of the first destination text:
  (E) (1) identifying a first paint action definition based on the source text language model output;
  (E) (2) applying the first paint action definition to the first destination text to generate first painted text; and
  (E) (3) replacing the first destination text within the destination document with the first painted text.

* * * * *